(12) United States Patent
Söntjens et al.

(10) Patent No.: US 10,556,994 B2
(45) Date of Patent: Feb. 11, 2020

(54) STRICTLY SEGMENTED THERMOPLASTIC ELASTOMERS AS BIODEGRADABLE BIOMATERIALS

(71) Applicants: SyMO-Chem B.V., Eindhoven (NL); SupraPolix B.V., Eindhoven (NL)

(72) Inventors: Serge Hendrikus Mathijs Söntjens, Eindhoven (NL); Michel Henri Chrétien Joseph Van Houtem, Eindhoven (NL); Tristan Mes, Eindhoven (NL); Anton Willem Bosman, Eindhoven (NL); Henricus Marie Janssen, Eindhoven (NL)

(73) Assignee: SYMO-CHEM B.V., Eindhoven (NL)

( * ) Notice: Subject to any disclaimer, the term of this patent is extended or adjusted under 35 U.S.C. 154(b) by 235 days.

(21) Appl. No.: 15/530,264

(22) PCT Filed: Jun. 19, 2015

(86) PCT No.: PCT/NL2015/050454
§ 371 (c)(1),
(2) Date: Dec. 16, 2016

(87) PCT Pub. No.: WO2015/194961
PCT Pub. Date: Dec. 23, 2015

(65) Prior Publication Data
US 2018/0334543 A1  Nov. 22, 2018

(30) Foreign Application Priority Data

Jun. 19, 2014 (EP) ................................. 14173126

(51) Int. Cl.
*C08G 81/00* (2006.01)

(52) U.S. Cl.
CPC .................................... *C08G 81/00* (2013.01)

(58) Field of Classification Search
CPC .......... C08G 81/00; C08G 18/42; C08G 64/42
See application file for complete search history.

(56) References Cited

U.S. PATENT DOCUMENTS

| | | | |
|---|---|---|---|
| 3,900,688 A * | 8/1975 | Thoma | C08G 18/10 442/71 |
| 4,532,317 A | 7/1985 | Rasshofer | |
| 4,569,982 A | 2/1986 | Grogler et al. | |
| 4,851,567 A | 7/1989 | Ruckes et al. | |
| 2005/0234215 A1 | 10/2005 | Gaymans et al. | |
| 2006/0217500 A1 | 9/2006 | Gaymans et al. | |
| 2008/0009830 A1 | 1/2008 | Fujimoto et al. | |
| 2008/0109070 A1 | 5/2008 | Wagner et al. | |

FOREIGN PATENT DOCUMENTS

| | | | |
|---|---|---|---|
| EP | 0 325 115 A2 | 7/1989 | |
| EP | 1 985 319 | 10/2008 | |
| WO | WO-2011/087650 | 7/2011 | |
| WO | WO-2011/150328 | 12/2011 | |
| WO | WO-2014/007631 | 1/2014 | |

OTHER PUBLICATIONS

Hong, Biomaterials, 31 (2010) p. 4249-4258 (Year: 2010).*
Chau, Journal of Polymer Sciences: Polymer Chemistry Edition, vol. 19, p. 1279-1282 (1981) (Year: 1981).*
Anelli et al., "Fast and selective oxidation of primary alcohols to aldehydes or to carboxylic acids and of secondary alcohols to ketones mediated by oxoammonium salts under two-phase conditions", J. Org. Chem., 1987, vol. 52, No. 12, pp. 2559-2562.
Arakaki et al., "Efficient production of polyrotaxanes from alpha-cyclodextrin and poly(ethylene glycol)", Macromolecules, 2005, vol. 38, pp. 7524-7527.
Bragd et al., "TEMPO-mediated oxidation of polysaccharides: survey of methods and applications", Topics in Catalysis, Feb. 2004, vol. 27, Nos. 1-4, pp. 49-66.
Gaymans et al., "Segmented copolymers with monidisperse crystallizable hard segments: Novel semi-crystalline materials", Progress in Polymer Science, 2011, vol. 36, pp. 713-748.
Hong et al., "Tailoring the degradation kinetics of poly(ester carbonate urethane) urea thermoplastic elastomers for tissue engineering scaffolds", Biomaterials, 2010, vol. 31, pp. 4249-4258.
International Search Report issued in International Patent Application No. PCT/NL2015/050454 dated Sep. 10, 2015.
Keul et al., "Poly(amide urethane)s with functional/reactive side groups based on a bis-cyclic bio-based monomer/coupling agent", European Polymer Journal, 2013, vol. 49, pp. 853-864.
Ma et al., "Biodegradable polyurethane ureas with variable polyester or polycarbonate soft segments: effects of crystallinity, molecular weight, and composition on mechanical properties", Biomacromolecules, 2011, vol. 12, pp. 3265-3274.
Masson et al., "2,2,6,6-Tetramethyl-1-piperidinyl-oxyl/[Bis(acetoxy)-iodo]benzene-mediated oxidation: a versatile and convenient route to poly(ethylene glycol) aldehyde or carboxylic acid derivatives", Journal of Polymer Science, 2001, vol. 39, pp. 4022-4024.
Sijbrandi et al., "Synthesis, morphology and properties of segmented poly(either ester amide)s comprising uniform glycine or beta-alanine extended bisoxalamide hard segments", Polymer, 2012, vol. 53, pp. 4033-4044.

(Continued)

*Primary Examiner* — Robert C Boyle

(74) *Attorney, Agent, or Firm* — Gilberto M. Villacorta; Sunit Talapatra; Foley & Lardner LLP

(57) ABSTRACT

The present invention relates to a thermoplastic elastomer according to the formula $[AB]_n$, wherein A represents a soft block and B represents a hard block. The present invention further relates to a process for the preparation of the thermoplastic elastomer. The thermoplastic material is in particular suited for biomaterial applications, for example for implants and tissue engineering applications and for purposes including scaffolding material applications, e.g. for tissue engineering purposes.

22 Claims, No Drawings

(56) References Cited

OTHER PUBLICATIONS

Sijbrandi et al., "Synthesis, morphology, and properties of segmented poly(ether amide)s with uniform oxalamide-based hard segments", Macromolecules, 2012, vol. 45, pp. 3948-3961.

Sontjens et al., "Thermoplastic elastomers based on strong and well-defined hydrogen-bonding interactions"; Macromolecules, 2008, vol. 41, pp. 5703-5708.

Stankus et al., "Fabrication of biodegradable elastomeric scaffolds with sub-micron morphologies", J. Biomed. Mater. A, 2004, pp. 603-614.

Sunder et al., "Hyperbranched polyether polyols: a modular approach to complex polymer architectures", Advanced Materials, 2000, vol. 12, No. 3, pp. 235-239.

Versteegen et al., "Synthesis and characterization of segmented copoly(ether urea)s with uniform hard segments", Macromolecules, 2005, vol. 38, pp. 3176-3184.

Wisse et al., "Molecular recognition in poly(-caprolactone)-based thermoplastic elastomers", Biomacromolecules, 2006, vol. 7, pp. 3385-3395.

Wisse et al., "Unusual tuning of mechanical properties of thermoplastic elastomers using supramolecular fillers", Macromolecules, 2006, vol. 39, pp. 7425-7432.

Yilgor et al., "Comparison of hydrogen bonding in polydimethylsiloxane and polyether based urethane and urea copolymers", Polymer, 2000, vol. 41, pp. 849-857.

\* cited by examiner

STRICTLY SEGMENTED THERMOPLASTIC ELASTOMERS AS BIODEGRADABLE BIOMATERIALS

CROSS-REFERENCE TO RELATED APPLICATIONS

This application is the National Phase of International Patent Application No. PCT/NL2015/050454, filed Jun. 19, 2015, published on Dec. 23, 2015 as WO 2015/194961 A1, which claims priority to European Patent Application No. 14173126.5, filed Jun. 19, 2014. The contents of these applications are herein incorporated by reference in their entirety.

FIELD OF THE INVENTION

The invention relates to biodegradable segmented thermoplastic elastomer (TPE) materials that show properties that are highly favourable for application and use as biomedical implants in challenging in vivo applications. Particularly, the TPE materials according to the invention are tough and (highly) elastic, so that they are suitable in applications where materials are put under demanding conditions, with respect to mechanical forces, pressures or strains being at play (e.g. enduring irregular pressures, loads or forces; enduring repetitive strains) and/or with respect to the physical surroundings (e.g. enzymes, oxidative species, blood). The TPE materials according to the invention are biocompatible and biodegradable, and the (bio)degradation rate may be tuned, and may for example be tailored such that degradation only takes place slowly. The TPE materials according to the invention can be prepared by a controlled synthesis process. Furthermore, the TPE materials according to the invention can be easily processed, so that any shape or form can be created in a simple way. The TPE materials according to the invention can be processed from the melt, from the solid (powder form) as well as from solution, and may even be molded and (re)shaped at slightly elevated temperatures, as the materials of the invention can exhibit self healing properties.

BACKGROUND OF THE INVENTION

A biomaterial can be defined as any matter, surface, or construct that interacts with biological systems, such as e.g. cells, tissue, organs and blood. Especially, when biomaterials are used in in vivo applications, for example as implants, these materials need to fulfil to a list of demands with respect to e.g. non-toxicity, biocompatibility, biodegradability, mechanical performance, processability, synthetic accessibility and production control. In particular demanding in vivo applications, the materials may be required to degrade at a controlled (slow) rate, while the materials should still perform mechanically.

Biomaterials can be prepared from natural or synthetic resources. Biomaterials from natural resources (polyamide fibres such as silk or collagen and polysaccharides such as chitosan and cellulose) are often difficult to control in terms of their exact composition and in terms of their properties and processing.

Biomaterials from synthetic resources (polyesters such as poly-ε-caprolactone, polyglycolides, polylactides and copolymers of these polyesters) have frequently been used for implants and for scaffolds for tissue engineering. These polymers, however, are limited in their mechanical behaviour, as they are hard, brittle and virtually not elastic. Upon cross-linking, the mechanical properties of these polymers may become better, but after cross-linking these materials can no longer be processed.

Several of these polymers are (semi)crystalline, for example poly-ε-caprolactone is a semi-crystalline material (i.e. they melt at about 60°-65° C.). This is disadvantageous because the properties of semi-crystalline materials may change in time due to prolonged (re)crystallization processes taking place in the material, e.g. while being used at about 37° C. as implant. Finally, synthetic polyesters usually degrade relatively fast in vivo.

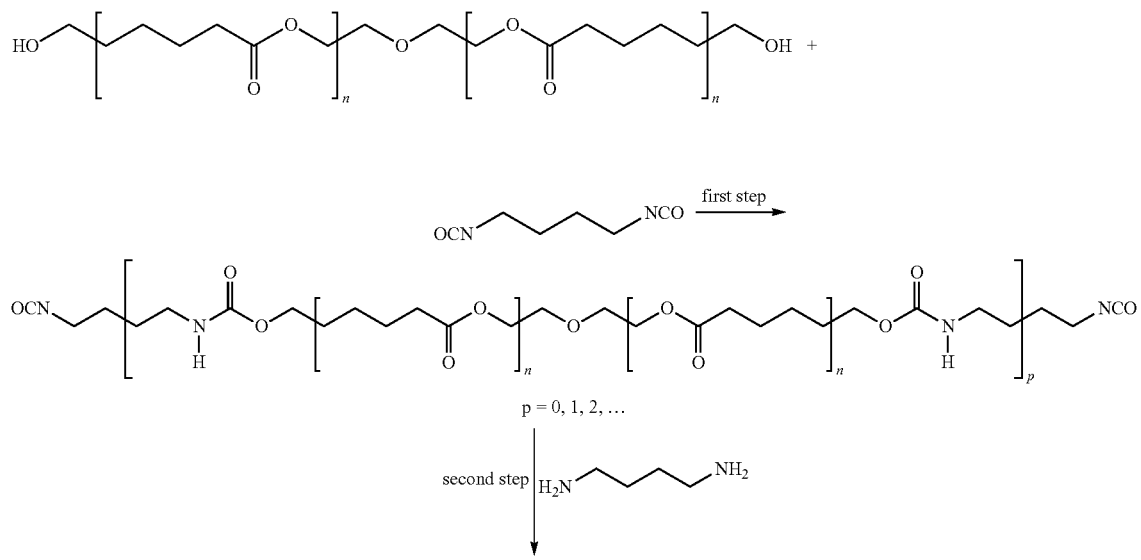

Scheme A

-continued

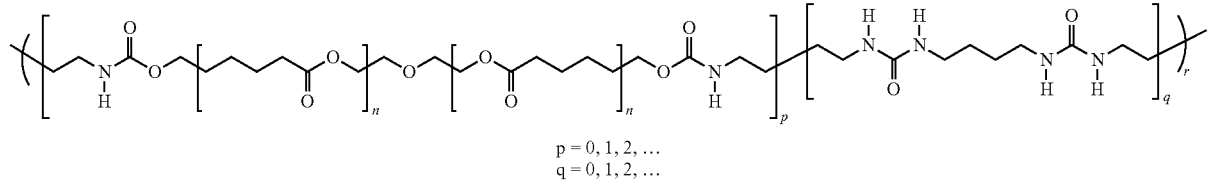

p = 0, 1, 2, ...
q = 0, 1, 2, ...

One class of synthetic biomaterials are polyester urethane ureas (PEUUs). These biomaterials are usually described as thermoplastic elastomers (TPEs), as they contain phase separated soft blocks A (i.e. the polyester main chain) and hard blocks B (the aggregated hydrogen bonded urea and/or urethane segments). In a typical synthesis process (cf. Scheme A) of PEUUs, a prepolymer polyester diol (used for the soft block) is reacted in a first step with a diisocyanate thereby forming a prepolymer with isocyanate functions. The latter is chain extended with a diamine in a second step thereby forming a polyester with urethane and bisurea hydrogen bonding units in its main chain (the hard blocks). PEUUs formed by such a process are, however, not strictly segmented polymers, but statistically segmented polymers. They contain hard blocks and soft blocks of various nature and degree of polymerisation, so that these PEUUs have main chain structures with a limited molecular definition, because the first step gives a statistical mixture of products, so that in the second step not two, but actually a range of species react with one another. As a result, the prepared material will be a segmented material that can be represented by the formula $[(A)_p(B)_q]_n$, as every soft block A and every hard block B in one polymer chain can be of a different nature (p and q can be 0, 1, 2, etc. throughout the polymer chain; n represents the number of repeats of the $(A)_p(B)_q$ segments). Accordingly, the material will be composed of a wide variety of macromolecular architectures. Reference is further made to Comparative Example 42 of this patent application.

Wagner et al. (J. Biomed. Mater. A, 603-614, 2004; incorporated by reference) discloses a polycaprolactone urethane urea which is prepared according to the process described above. This polymer does not have monodisperse hard blocks and has a limited molecular definition. It is a segmented $[(A)_p(B)_q]_n$ material.

Hong et al. (Biomaterials 31, 4249-4258, 2010) and Ma et al. Biomacromolecules 12, 3265-3274, 2011; both incorporated by reference), disclose other polymers which are prepared by the same synthetic approach. A (mixture of a) polycaprolactone diol and/or a polycarbonate diol are reacted with a diisocyanate, after which the obtained prepolymer in situ (i.e. no purification) is chain extended with a diamine. Again, the final polymer does not have monodispersed hard blocks and has a limited molecular definition. Moreover, the highly toxic fluorinated solvent hexafluoroisopropanol (HFIP) is used as processing solvent for the prepared materials, but e.g. electrospinning data are not shown. Materials with melting transitions as high as 40° C. have been reported, and all polycaprolactone based materials display accelerated degradation.

US 2008/009830, incorporated by reference, discloses a biodegradable elastomeric patch comprising a polymer composition comprising a PEUU, a polyether ester urethane urea (PEEUU) or a combination thereof. According to [0047] and [0048], these polymers are preferably prepared by the process disclosed above.

US 2008/109070, incorporated by reference, discloses a biodegradable elastomeric scaffold comprising a linear segmented PEUU and PEEUU. According to [0048], and [0067], these polymers are preferably prepared by the process disclosed above.

WO 2011/150328, incorporated by reference, discloses an implantable matrix comprising a biodegradable elastomeric polymer, preferably a PEUU, a PEEUU, a polyester carbonate urethane urea (PECUU) or a polycarbonate urethane urea (PCUU). According to page 6, line 18—page 7, line 2 and page 10, lines 4-23, the PEUU and the PEEUU may be prepared by the process disclosed above.

Segmented TPEs with monodisperse hard blocks and non-biodegradable soft blocks are known. For example, non-biodegradable polysiloxanes are disclosed in Yilgor et al., Polymer 41, 849-857, 2000. Polyether TPEs are disclosed in Versteegen et al., Macromolecules 38, 3176-3184, 2005; Gaymans et al., Progress in Polymer Science 36, 713-748, 2011; Sijbrandi et al., Macromolecules 45, 3948-3961, 2012; and Sijbrandi et al., Polymer 53, 4033-4044, 2012, and WO 2011/087650 (all incorporated by reference), and these non-biodegradable polyethers are in most cases incorporated into the TPE products by using high polymerisation (polycondensation) or processing temperatures (>190° C.). Such higher temperatures are not ideally suited to be used with e.g. biodegradable polyesters, as these polymers may degrade at these high temperatures.

US 2005/234215, incorporated by reference, discloses copolymers comprising amide segments, said copolymers having a glass transition temperature $T_g$ lower than 0° C.

US 2006/217500, incorporated by reference, discloses copolymers comprising amide segments, said copolymers having a glass transition temperature $T_g$ higher than 120° C.

In some cases, segmented TPEs with monodisperse crystallisable hard blocks have been reported, where the soft block is a polyester.

Wisse et al., Macromolecules 39, 7425-7432, 2006, Wisse et al., Biomacromolecules 6, 3385-3395, 2006; and EP 1985319 (all incorporated by reference) disclose bisurea polycaprolactone (PCL) polymers, where the polycaprolactone soft blocks are prone to crystallize. Materials displaying melting transitions of the soft block as high as 42° C. are reported, and these are therefore not considered as soft blocks anymore.

Sontjens et al., Macromolecules 41, 5703-5708, 2008, incorporated by reference, discloses amorphous propylene-adipate TPEs with (aromatic, non-aliphatic) UPy groups (Upy means 2-ureido-[1H]-pyrimidin-4-one) in the main chain. The HDI (n-hexylene diisocyanate) based material shows a hard block melt at a relatively low temperature (78° C.), and slow hard block crystallization as none is observed in DSC experiments. No melting point is observed for the material with the (isomeric mixture) isophorone diisocyanate (IPDI) based hard block. The materials show rather low Young's moduli (ca. 1-8 MPa) and tensile strengths (below 3 MPa).

WO 2014/007631, incorporated by reference, discloses implants comprising a matrix material, wherein the matrix material comprises polyesters with UPy or urea groups in their structure. For the urea polyester in vivo data beyond 7 days are not reported.

U.S. Pat. No. 4,851,567, incorporated by reference, discloses in Example 3 a cast polymerisation process wherein a polyester amine (prepared from a NCO prepolymer made from 1 molar equivalent of a polyester based on adipic acid and ethylene glycol and 2 molar equivalents of 2,4-diisocyanate toluene (TDI) followed by hydrolysis of the NCO prepolymer) is reacted with naphthalene-1,5-diisocyanate. The reaction of prepolyester diol and TDI is a reaction that produces a range of prepolymer diisocyanate species (statistical process). Furthermore, a too large drop is observed when comparing the OH-number of the prepolyester alcohol and the NH-number of the prepolyester amine indicating that side reactions have taken place. Accordingly, materials with a limited molecular definition wee prepared.

U.S. Pat. No. 4,569,982, incorporated by reference, discloses in Example 3 a polymerisation process wherein a polyester amine (prepared from a NCO prepolymer made from a polyester based on adipic acid, ethylene glycol and butane-1,4-diol) and 2,4-diisocyanate toluene followed by hydrolysis of the NCO prepolymer) is reacted with 2,4-diisocyanate toluene.

U.S. Pat. No. 4,532,317, incorporated by reference, discloses in Example 8 the preparation of a polyester amine by hydrolysis of a NCO prepolymer made from a polyester based on adipic acid, ethylene glycol and butane-1,4-diol and 2,4-diisocyanate toluene. Examples 39 and 40 disclose a polymerisation process of similar polyester amines, butane-1,4-diol and 4,4'-diisocyanate diphenylmethane (MDI).

There is, however, still a need in the art for biodegradable materials that have improved durable mechanical properties (elastic properties, toughness) which can be easily moulded and/or easily processed from either the melt or from solution.

The objective of the present invention is to provide such biodegradable materials.

SUMMARY OF THE INVENTION

The biodegradable materials according to the present invention have the properties mentioned above. Additionally, the (rate of the) biodegradation of these materials can be tuned. The preparation of these materials can be conducted in a limited number of steps and in a controlled manner. The structure of the materials is well defined (high molecular definition). The biodegradable materials according to the present invention are useful for in vivo applications.

The present invention therefore relates to strictly segmented thermoplastic elastomers according to the formula $[AB]_n$, wherein:

n represents the number of repeats of the AB segment and is an integer of 2 to 100;

A represents a soft block according to formula (I):

(I)
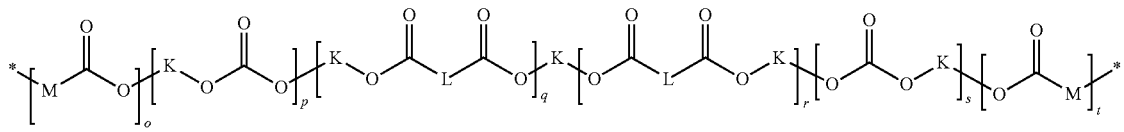

B represents a hard block according to formula (II-A) or formula (II-B):

(II-A)
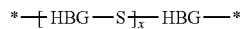

(II-B)
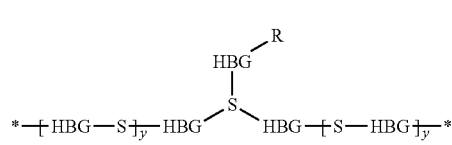

wherein:

K is a $C_1$-$C_{36}$ alkylene group, a $C_6$-$C_{24}$ arylene group, a $C_7$-$C_{24}$ alkarylene group or a $C_7$-$C_{24}$ arylalkylene group;

L is a $C_1$-$C_{36}$ alkylene group, a $C_6$-$C_{24}$ arylene group, a $C_7$-$C_{24}$ alkarylene group or a $C_7$-$C_{24}$ arylalkylene group or L is absent;

M is a $C_1$-$C_{36}$ alkylene group, a $C_6$-$C_{24}$ arylene group, a $C_7$-$C_{24}$ alkarylene group or a $C_7$-$C_{24}$ arylalkylene group or M is absent;

o, p, q, r, s and t are independently 0-50;

provided that:

(a) when o, q, r and t are 0, then p and s are independently 1-50;

(b) when p and s are 0, then o, q, r and t are independently 1-50;

(c) when o and t are 0, then p, q, r and s are independently 1-50;

(d) when q and r are 0, then o, p, s and t are independently 1-50;

HBG is a simple hydrogen bonding unit independently selected from the group consisting of amide, urea and urethane groups;

S is a $C_1$-$C_{36}$ alkylene group, a $C_6$-$C_{24}$ arylene group, a $C_7$-$C_{24}$ alkarylene group or a $C_7$-$C_{24}$ arylalkylene group or S is absent;

R is hydrogen, a $C_1$-$C_{24}$ alkyl group, a $C_6$-$C_{24}$ aryl group, a $C_7$-$C_{24}$ alkaryl group or a $C_7$-$C_{24}$ arylalkyl group;

x is 1, 2 or 3; and y is 0 or 1.

The present invention also relates to a process for the preparation of strictly segmented thermoplastic elastomers according to the formula $[AB]_n$, wherein:

a prepolymer according to formula (III-A) or (III-B):

(III-A)

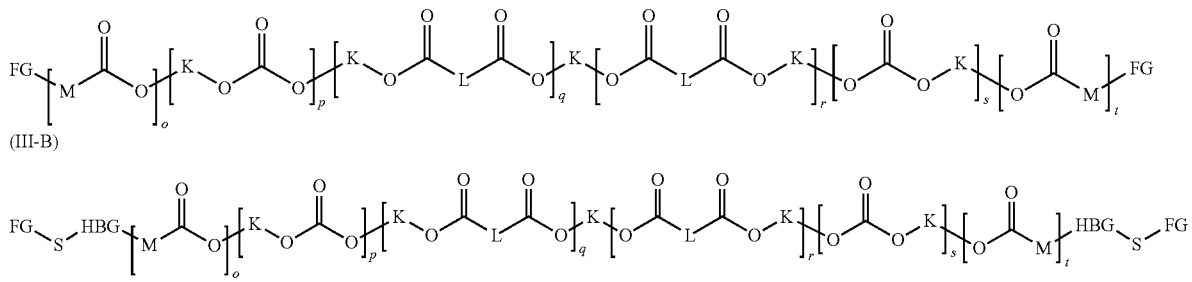

(III-B)

is reacted with a reactive compound according to formula (IV-A) or (IV-B):

(IV-A)

(IV-B)

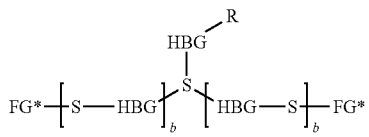

wherein n, K, L, M, o, p, q, r, s, t, S, R, and HBG have the meaning indicated above;
FG is a functional group selected from the group consisting of hydroxy, azide, activated hydroxy, carboxylic acid, activated carboxylic acid, isocyanate, activated amine, ester, alkenyl, alkynyl and amine;
FG* is a complementary functional group selected from the group consisting of isocyanate, amine, activated amine, carboxylic acid, activated carboxylic acid, ester, hydroxy, activated hydroxy, azide, alkenyl and alkynyl;
a is 0, 1, 2, 3 or 4;
b is 0 or 1; and
c is 0 or 1.

DETAILED DESCRIPTION OF THE INVENTION

In this description and in its claims, the verb "to comprise" and its conjugations is used in its non-limiting sense to mean that items following the word are included, but items not specifically mentioned are not excluded. In addition, reference to an element by the indefinite article "a" or "an" does not exclude the possibility that more than one of the element is present, unless the context clearly requires that there is one and only one of the elements. The indefinite article "a" or "an" thus usually means "at least one".

Definitions

Alkyl and alkylene groups may be cyclic, linear or branched. Alkyl and alkylene groups optionally, but not preferably, comprise one or more C=C bonds and/or C≡C bonds. Alkyl and alkylene groups optionally, but not preferably, comprise heteroatoms selected from the group consisting of O, N and S, preferably 1-5 heteroatoms selected from the group consisting of O, N and S, more preferably selected from O and N, and most preferably O. Alkyl and alkylene groups optionally, but not preferably, comprise fluoro atoms, preferably 1-20 fluoro atoms, more preferably 2-12 fluoro-atoms. When not specified, alkyl and alkylene groups comprise 1 to 36 carbon atoms.

Aryl, arylene, alkylaryl, alkylarylene, arylalkyl and arylalkylene groups optionally, but not preferably, comprise heteroatoms selected from the group consisting of O, N and S, preferably 1-5 heteroatoms selected from the group consisting of O, N and S, more preferably selected from O and N, and most preferably O. Alkyl and alkylene groups optionally, but not preferably, comprise fluoro atoms, preferably 1-20 fluoro atoms, more preferably 2-12 fluoro-atoms. When not specified, aryl and arylene groups comprise 6 to 24 carbon atoms. When not specified, alkylaryl, alkylarylene, arylalkyl and arylalkylene groups comprise 7 to 24 carbon atoms.

Urea, urethane, amide, ester, carbonate, carboxylic acid, ketone, aldehyde, ether, isocyanate, amine, alcohol and thiol moieties or groups are defined below, where X represents O or S, more preferably O, and $R_a$ represents a hydrogen atom or a cyclic, linear or branched $C_1$-$C_{12}$ alkyl group, preferably a hydrogen atom or a cyclic, linear or branched $C_1$-$C_6$ alkyl group, most preferably a hydrogen atom. In groups that contain more than one X and/or more than one $R_a$ element, then these X and $R_a$ elements can be independently selected.

A urea moiety or group as indicated in this document is to be understood as a moiety or group according to the formula: —$NR_a$—C(X)—$NR_a$—.

An amide moiety or group as indicated in this document is to be understood as a moiety or group according to the formula: —$NR_a$—C(X)—.

A urethane moiety or group as indicated in this document is to be understood as a moiety or group according to the formula: —$NR_a$—C(X)—X—.

An ester moiety or group as indicated in this document is to be understood as a moiety or group according to the formula: —C(X)—X—.

A carbonate moiety or group as indicated in this document is to be understood as a moiety or group according to the formula: —X—C(X)—X—.

A carboxylic acid moiety or group as indicated in this document is to be understood as a moiety or group according to the formula: —C(X)XH.

A ketone moiety or group as indicated in this document is to be understood as a moiety or group according to the formula: —C(X)—.

An aldehyde moiety or group as indicated in this document is to be understood as a moiety or group according to the formula: —C(X)H.

An ether moiety or group as indicated in this document is to be understood as a moiety or group according to the formula: —X—.

An isocyanate moiety or group as indicated in this document is to be understood as a moiety or group according to the formula: —NCX.

An amine moiety or group as indicated in this document is to be understood as a moiety or group according to the formulas: —N(R$_a$)$_2$ or —NR$_a$—.

An alcohol (or hydroxy) moiety or group as indicated in this document is to be understood as a moiety or group according to the formula: —XH.

Oxalic acid is considered a dicarboxylic acid where the two carboxylic acid groups are spaced by a radical, and hydrazine is considered a diamine, where the two amines are spaced by a radical. The derivatives of oxalic acid and hydrazine are treated accordingly, so e.g. diethyl oxalate is a diester, where both esters are spaced by a radical, and adipic acid dihydrazide is a diamide with two terminal amine groups.

In this document, the terms "Functional group FG" and "Complementary functional group FG*" are used interchangeably to indicate reactive groups that are capable to form a covalent bond with each other under conventional reaction conditions as will be apparent to a person skilled in the art. For example, carboxylic acid groups and hydroxy groups can form an ester group —C(O)—O—.

Hydroxy, isocyanate and carboxylic acid functional groups FG or complementary functional groups FG* are as defined above for hydroxy, isocyanate and carboxylic acid moieties or groups, respectively.

An azide functional group FG or a complementary functional group FG* is represented by the formula —N$_3$.

An alkenyl functional group FG or a complementary functional group FG* is represented by the formula —CR$_a$=C(R$_a$)$_2$, where preferably R$_a$ is hydrogen.

An alkynyl functional group FG or a complementary functional group FG* is represented by the formula —CCR$_a$, where CC denotes a triple bonded carbon-carbon bond, and where preferably R$_a$ is hydrogen.

An amine functional group FG or a complementary functional group FG* is represented by the formula —NHR$_a$ or by the formula —NH$_2$, preferably by —NH$_2$.

An ester functional group FG or a complementary functional group FG* is represented by the formula —C(X)—XR$_a$.

An activated hydroxy functional group FG or a complementary functional group FG* is represented by the formula —X—C(X)—XR$_a$, by the formula —X—C(X)—N(R$_a$)$_2$, or by the formula —X—C(X)—Cl. Accordingly, activated hydroxy FG or FG* groups can be carbonates, urethanes or chloroformates. Vide infra for examples.

An activated carboxylic acid (or: 'active ester') functional group FG or a complementary functional group FG* is represented by the formula —C(X)—XR$_a$, by the formula —C(X)—N(R$_a$)$_2$ or by the formula —C(X)—Cl. Accordingly, activated carboxylic acid FG or FG* groups can be esters, amides or acid chlorides.

An activated amine functional group FG or a complementary functional group FG* is represented by the formula —NR$_a$—C(X)—XR$_a$ or by the formula —NR$_a$—C(X)—N(R$_a$)$_2$. Accordingly, activated amine FG or FG* groups can be carbonates, urethanes or chloroformates.

A (co)polycarbonate is a (co)polymer wherein the (co)monomers are linked by carbonate moieties.

A (co)polyester is a (co)polymer wherein the (co)monomers are linked by ester moieties.

A copoly(ester-carbonate) is a (co)polymer wherein the (co)monomers are linked by ester moieties and carbonate moieties.

The Strictly Segmented Thermoplastic Elastomer [AB]$_n$

The strictly segmented thermoplastic elastomer (TPE) according to the invention is characterized by the formula [AB]$_n$, wherein n represents the number of repeats of the AB segment. Preferably, n is about 2 to about 100, more preferably about 4 to about 80, even more preferably about 6 to about 60, and most preferably about 8 to about 40. Preferably, n is greater than 6, more preferably greater than 10, most preferably greater than 15.

Block A represents a soft block, which is preferably a (co)polycarbonate, a (co)polyester or a copoly(ester-carbonate) according to formula (I):

(I)

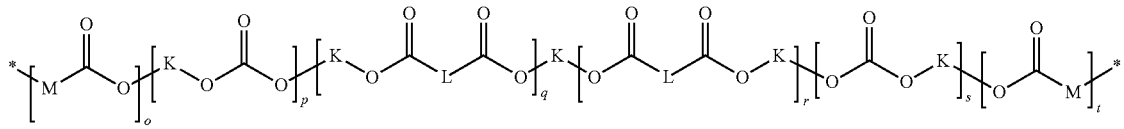

wherein K, L, M, o, p, q, r, s and t have the meaning as defined above.

Block B represents a hard block according to formula (II-A) or formula (II-B), wherein the simple hydrogen bonding groups (HBG) are independently selected from the group consisting of amide, urea and urethane groups, and wherein these HBG groups are separated by a spacer S, wherein S has the meaning as defined above, and wherein also x, y and R have the meaning as defined above.

(II-A)

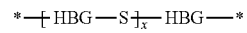

(II-B)

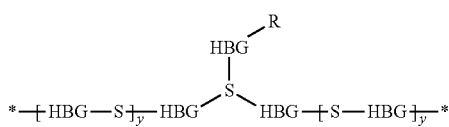

It is to be understood that preferably every A block in the [AB]$_n$ polymer chain is the same A block, i.e. it preferably has the same prepolymer precursor origin (it stems from the same prepolymer precursor), and is therefore preferably not independently selected along the [AB]$_n$ polymer chain. Additionally, every B block in the [AB]$_n$ polymer chain is the same and is therefore not independently selected along the [AB]$_n$ polymer chain.

The soft block A is of a relatively apolar nature, and is highly or completely amorphous at the operating temperature of the material.

The hard block B is monodisperse, and may crystallize.

The blocks A and B are directly linked to each other, as indicated by the asterisks.

The $[AB]_n$ polymer has end group residues (EGR) at both ends of the polymer chain, where these end group residues are determined by the particular chemistry that is used for the preparation of the $[AB]_n$ polymer. The $[AB]_n$ polymer according to the invention can thus actually be described by the formula EGR-$[AB]_n$-EGR, where the two EGRs are independently formed or can independently be selected. The end group residues EGR may be any kind of residue, and typical end group residues are hydrogen, hydroxyl, amine, carboxylic acid or carboxylic acid derivative residues. Other end group residues may be a complete or an incomplete A or B block. In a specific embodiment of this invention; the EGR may be used to impart a function to the $[AB]_n$ polymer, or a fitness for a particular use. Here, one of the two EGRs or both EGRs may be used to do so. For the sake of simplicity the materials of this invention are throughout referred to as $[AB]_n$ or $[AB]_n$ polymer, $[AB]_n$ material or $[AB]_n$ biomaterial.

The Soft Block A

In formula (I), K represents a spacer, and K can independently be selected for every K in the polymer chain of the soft block A. K may originate from a diol building block, but in case it is positioned adjacent to the hard block B, it may also originate from a hydroxy-carboxylic acid building block or from a hydroxy-amine building block.

Preferably, K is selected from alkylene, alkylarylene and arylalkylene groups, more preferably from alkylene groups. More preferably, K is an alkylene group selected from the group consisting of cyclic, linear or branched $C_2$-$C_{18}$ alkylene groups, optionally, but not preferably, comprising 1-3 heteroatoms selected from the group consisting of O, N and S, more preferably O and N, most preferably O. Even more preferably, K is a $C_2$-$C_{12}$ linear or branched, preferably linear, alkylene group, optionally, but not preferably, containing 1 or 2 oxygen heteroatoms. Most preferred for K are linear or branched, preferably linear, $C_4$-$C_{10}$ alkylene groups, optionally, but not preferably, containing 1 oxygen heteroatom.

In formula (I), L represents a spacer, and L can independently be selected for every L in the polymer chain of the soft block A. L preferably originates from a dicarboxylic acid building block.

L is selected from the group of alkylene, arylene, alkylarylene and arylalkylene groups or is absent, i.e. L may be a radical, so that it represents a connection between two ester groups and the monomeric unit containing L is then derived from oxalic acid or a derivative thereof. Preferably, L is absent or L selected from alkylene, alkylarylene and arylalkylene groups. More preferably, L is absent or an alkylene group. More preferably, L is absent or an alkylene selected from the group of cyclic, linear or branched $C_2$-$C_{18}$ alkylene groups, optionally, but not preferably, comprising 1-3 heteroatoms selected from the group consisting of O, N and S, more preferably O and N, most preferably O. More preferably, L is a $C_2$-$C_{12}$ linear or branched, preferably linear, alkylene group, optionally, but not preferably, containing 1-3 oxygen heteroatoms. Most preferred for L are linear $C_4$-$C_{10}$ alkylenes, optionally, but not preferably, containing 1 or 2 oxygen heteroatoms.

In formula (I), M represents a spacer, and M can independently be selected for every M in the polymer chain of soft block A. M preferably originates from a hydroxy-carboxylic acid building block. When M is positioned adjacent to a hard block B, M may also originate from an amine-carboxylic acid building block or from a dicarboxylic acid building block.

M is selected from the group of alkylene, arylene, alkylarylene and arylalkylene groups or is absent, i.e. M may be a radical, so that it represents a connection between an ester group and another group. Preferably, M is selected from a radical, or alkylene, alkylarylene and arylalkylene groups, more preferably M is a radical or an alkylene group. Even more preferably, M is alkylene selected from the group of cyclic, linear or branched $C_1$-$C_{17}$ alkylene groups, optionally, but not preferably, comprising 1-3 heteroatoms selected from the group consisting of O, N and S, more preferably O and N, most preferably O. More preferably, M is a $C_1$-$C_{11}$ linear or branched, preferably linear, alkylene group, optionally, but not preferably, containing 1-3 oxygen heteroatoms. Most preferred for M are linear $C_4$-$C_{11}$ alkylenes, optionally, but not preferably, containing 1 or 2 oxygen heteroatom.

As the M, K and L spacers are preferably linear, branched or cyclic alkylene groups (or L and/or M are absent), the soft block A preferably represents an aliphatic (co)polycarbonate, (co)polyester or (co)poly(ester-carbonate).

In formula (I), o and t, p and s, and q and r represent the number of repeats or the average number of repeats of the respective monomeric units. The cumulative value of o, t, p, s, q and r, as well as the molecular structure of the various monomeric units, determine the average molecular weight of the soft block A.

In formula (I), where o, q, r and t are 0, then soft block A is a polycarbonate. When p and s are 0, then soft block A is a polyester. For other cases, the polymer chain of soft block A is a co-poly(ester-carbonate): e.g. none of o, p, q, r, s and t are 0; or o and t are 0; or q and r are 0.

In case the soft block A is a co-poly(carbonate-ester), the average percentage of carbonyl groups in this soft block being carbonate is more than 1%, preferably more than about 30%, more preferably more than about 60%, and most preferably more than about 75%, with the remainder of the carbonyl groups then being esters. Average ester percentages are preferably higher than about 1% in poly(carbonate-ester)s, and preferably higher than about 5%.

In formula (I), the M-ester (i.e. the o and t monomers), the K-carbonate (i.e. the p and s monomers), and the K/L-ester (i.e. the q and r monomers) monomer groups may be arranged in any order or sequence in soft block A, where all M, K and L spacers can be selected independently for every M, K and L spacer in every monomer group. Accordingly, the o, p and q monomeric units may be arranged in any order or sequence, and also the r, s and t monomeric units may be arranged in any order or sequence in soft block A. For example, these sequences may be homo, random, alternate, block or combinations of these sequences.

In formula (I), (i) the value of o, p, q, r, s and t, (ii) the sequence of the ester and carbonate monomeric units, and (iii) the variation in the molecular identity of the K, L and M spacers determine what type of (co)polymer the soft block A is. The soft block is therefore preferably a polycarbonate, a polyester or a co-poly(ester-carbonate). The polycarbonate is preferably a homo-polycarbonate, a random co-polycarbonate or a block co-polycarbonate. The polyester is preferably a homo-polyester, a random co-polyester or a block co-polyester. The co-poly(ester-carbonate) is preferably a random co-poly(ester-carbonate) or a block co-poly(ester-carbonate).

Preferred polycarbonates are random co-polycarbonates or block co-polycarbonates. Most preferred polycarbonates are random co-polycarbonates.

Preferred polyesters are random co-polyesters.

Preferred co-poly(ester-carbonate)s are block co-poly(ester-carbonate)s.

Particularly, polycarbonate and co-poly(carbonate-ester) soft blocks A as given in the formula (V) are preferred:

(V)

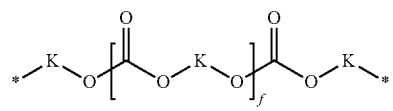
(A)

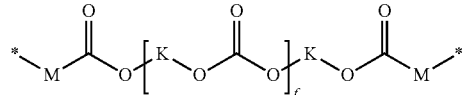
(B)

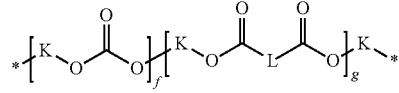
(C)

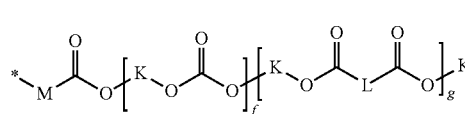
(D)

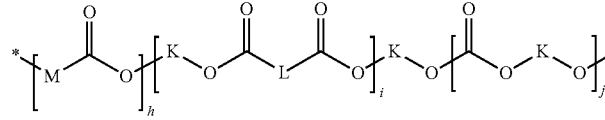

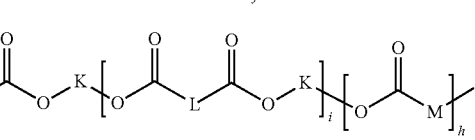
(E)

wherein f, g and j are independently in the range of 1-500; and h is 0 (then i is 1) or 2 (then i is 0).

Preferably, f, g and j are independently in the range of 1-100, more preferably in the range of 1-50, most preferably in the range of 1-25.

Formula (V-A) represents a polycarbonate and formula (V-B) represents a polycarbonate with ester terminal groups. For these two formulas (V-A) and (V-B), the K and M spacers may be independently selected for every K and M in the soft block A and are alkylene, arylene, alkylarylene or arylalkylene groups. The M-spacer may also be a radical. Preferably, K is a linear, branched or cyclic $C_3$-$C_{12}$ alkylene, optionally comprising 1-3 heteroatoms selected from the group O, N and S, more preferably O. Preferably, the two M-spacers in formula (V-B) are identical and are selected from $C_1$-$C_{12}$ linear, branched or cyclic alkylenes, optionally comprising 1-3 heteroatoms selected from the group O, N and S, more preferably O.

In the first particular case for formula (V-A), all K groups are the same, and in this case (V-A) represents a homo-polycarbonate. Then K is preferably selected from the group of linear, branched or cyclic $C_4$-$C_{12}$ alkylenes, more preferably from $C_4$-$C_7$ and $C_9$ linear alkylenes or $C_5$-$C_{10}$ branched alkylenes that are derived from primary diols. Most preferably K is then selected from $C_4$-$C_7$ linear alkylenes.

In the second particular case for formula (V-A), K is independently selected for every K in the soft block A, and in this case (V-A) represents a co-polycarbonate, preferably a random co-polycarbonate. Spacer K is then preferably selected from the group of linear, branched or cyclic $C_3$-$C_{12}$ alkylenes, optionally comprising 1 or 2 oxygen atoms, more preferably from $C_3$-$C_{10}$ linear alkylenes, optionally comprising 1 oxygen atom. Most preferably for this case, two different K groups are employed, one that is relatively apolar and that is selected from the group of $C_5$-$C_{10}$ linear alkylenes, and one that is relatively polar and that is selected from the group of $C_3$-$C_4$ linear alkylenes and diethylene-ether (—$CH_2$—$CH_2$—O—$CH_2$—$CH_2$—). The polar K group is then used for less than about 80%, preferably less than about 40 mol %, most preferably less than about 20%, where these percentages are the employed average molar percentages of the polar K-spacer as calculated relative to the total of the polar and the apolar K-spacer being used. Another option is to combine two different K spacers, where one is selected from branched alkylenes, and one is selected from linear alkylenes; the branched alkylene is then preferably used for less than about 40 mol %, more preferably for less than about 20 mol %. Yet another option is to mix the sketched polar/apolar approach and the linear/branched approach, for example by combining an apolar branched K-group and a polar linear K group; the branched and/or polar alkylene is then preferably used for less than about 80 mol %, more preferably for less than about 40 mol %, most preferably for less than about 20%.

In the third particular case for formula (V-A), the terminal K spacers (i.e. the spacers adjacent to the hard block B) are specifically created as the terminal groups, and these two terminal K groups are then identical to each other and are preferably $C_4$-$C_{12}$ linear alkylenes, more preferably $C_6$-$C_{12}$ linear alkylenes. Accordingly, formula (V-A) may for this case be seen as a block-co-polycarbonate, as the terminal carbonates and spacers K are different from the other (middle) carbonates and spacers K in the soft block. The rest of the soft block (so the middle part) may be a homo-polycarbonate or a co-polycarbonate, where these two poly-carbonate options are described already for the first and the second particular case for formula (V-A), respectively, and can be described in the same way for this third particular case for formula (V-A) also.

Formula (V-B) represents a block-co-poly(carbonate-ester), as the terminal carbonyl moieties are esters and not carbonates. Preferred are terminal M spacers (i.e. the spacers adjacent to the hard block B) that are identical to each other and these are then preferably $C_1$-$C_{12}$ linear alkylenes, optionally comprising 1 oxygen atom, more preferably $C_3$-$C_{11}$ linear alkylenes. The rest of the soft block (so the middle part) is a polycarbonate, and this may be a homo-polycarbonate or a co-polycarbonate, where these two poly-carbonate options have been described already for formula (V-A), for the first and the second particular case for formula (V-A), respectively, and can be described in the same way for this Formula (V-B) also.

Formula (V-C) represents a poly(carbonate-ester) or a polyester. Formula (V-D) represents a poly(carbonate-ester). For these two formulas (V-C) and (V-D), the K, L and M spacers may be independently selected for every K, L and M in the soft block A and are alkylene, arylene, alkylarylene or arylalkylene groups. L and M may also be a radical. Preferably, K and L are linear, branched or cyclic $C_2$-$C_{12}$ alkylenes, optionally, but not preferably, comprising 1-3 heteroatoms selected from the group O, N and S, more preferably O. Preferably, the two M-spacers in formula (V-D) are identical and are selected from $C_1$-$C_{12}$ linear, branched or cyclic alkylenes, optionally comprising 1-3 heteroatoms selected from the group O, N and S, more preferably O.

In the first particular case for formula (V-C), K and L are independently selected for every K and L in the soft block A. Formula (V-C) then preferably represents a co-poly (carbonate-ester), preferably a random co-poly(carbonate-ester). Spacers K and L are then preferably selected from the group of linear, branched or cyclic $C_2$-$C_{10}$ alkylenes, optionally comprising 1 or 2 oxygen atoms, more preferably from $C_2$-$C_{10}$ linear alkylenes, optionally comprising 1 oxygen atom. Most preferably for this case, two different K groups are employed (or two different L groups), most preferably two different K groups. One employed K (or L) group is relatively apolar and is selected from the group of $C_5$-$C_{10}$ linear or branched alkylenes, and one that is relatively polar and that is selected from the group of $C_2$-$C_4$ linear or branched alkylenes and diethylene-ether (—$CH_2$—$CH_2$—O—$CH_2$—$CH_2$—), more preferably from $C_3$-$C_4$ linear alkylenes and diethylene-ether (—$CH_2$—$CH_2$—O—$CH_2$—$CH_2$—). The polar K group (or L-group) is then used for less than about 80%, preferably less than about 40 mol %, most preferably less than about 20%, where these percentages are the employed average molar percentages of the polar K-spacer (or polar L-spacer) as calculated relative to the total of the polar and the apolar K-spacers (or L-spacers) being used. Another option is to combine two different K groups (or two different L groups), where one is selected from branched alkylenes, and one is selected from linear alkylenes; the branched alkylene is then preferably used for less than about 40 mol %, more preferably for less than about 20 mol %. Yet another option is to mix the sketched polar/apolar approach and the linear/branched approach, for example by combining one apolar branched K-group and one polar linear K group; the branched and/or polar alkylene is then preferably used for less than about 80 mol %, more preferably for less than about 40 mol %, most preferably for less than about 20%. Finally, formula (V-C) gives the freedom to incorporate different levels of carbonates and esters, where this can be expressed as the average molar percentage of carbonates in the soft block A being present with respect to the total number of carbonyl moieties (carbonates plus esters) in the soft block A being present. Any percentage may be used here (0% represents a polyester soft block A), but carbonate percentages between about 1% and about 95% are preferred, while carbonate percentages higher than about 30% are more preferred, those higher than about 60% are even more preferred, and those higher than about 75% are most preferred.

In the second particular case for formula (V-C), the terminal carbonyl groups are carbonates and the terminal spacers are K groups (i.e. these are the carbonyls and K groups that are adjacent to the hard block B), where these are then specifically created as the terminal groups, and where the two terminal K groups are identical to each other and are preferably $C_4$-$C_{12}$ linear alkylenes, more preferably $C_6$-$C_{12}$ linear alkylenes. Accordingly, formula (V-C) may for this case be viewed as a block-co-poly(ester-carbonate), as the terminal block is different from the rest of the soft block. The rest of the soft block (so the middle part) is then a co-poly (carbonate-ester), preferably a random co-poly(carbonate-ester), where such a polymer has been described already for the first particular case for formula (V-C), see immediately above this paragraph, and can be described in the same way for this second particular case for formula (V-C) also.

Formula (V-D) represents a co-poly(carbonate-ester) with two terminal ester groups, so it may be viewed as a block-co-poly(carbonate-ester). The terminal M spacers (i.e. the spacers adjacent to the hard block B) are identical to each other and are preferably $C_1$-$C_{12}$ linear alkylenes, optionally comprising 1 oxygen heteroatom, more preferably $C_3$-$C_{11}$ linear alkylenes. The rest of the soft block (so the middle part) is then a co-poly(carbonate-ester), preferably a random co-poly(carbonate-ester), where such a polymer has been described already for formula (V-C), the first particular case for formula (V-C), and can be described in the same way for this formula (V-D) also.

Furthermore, formula (V-D) gives the freedom to incorporate different levels of carbonates and esters, where this can be expressed as the average molar percentage of carbonates in the soft block A being present with respect to the total number of carbonyl moieties (carbonates plus esters) in the soft block A being present. Any percentage may be used here (0% represents a polyester), but carbonate percentages between about 1% and about 95% are preferred, while carbonate percentages higher than about 30% are more preferred, those higher than about 60% are even more preferred, and those higher than about 75% are most preferred.

Formula (V-E) represents a co-poly(carbonate-ester) with two terminal groups both having two ester groups, so it may be viewed as a block-co-poly(carbonate-ester) with diester terminal blocks. Preferably, the two K, the two L and the two M groups, with respect to each of the two terminal ends, are identical to each other (but K and L, and both M spacers at one terminal end may be different from one another), and are preferably $C_1$-$C_{12}$ linear alkylenes, optionally comprising 1 oxygen heteroatom, more preferably $C_3$-$C_{11}$ linear alkylenes. The rest of the soft block (so the middle part) may be a homo-polycarbonate or a co-polycarbonate, preferably a homo-polycarbonate, where such a polymer has been described already for formula (V-A), for the first and second particular case for formula (V-A), respectively, and can be described in the same way for this formula (V-E) also.

Further soft blocks A are given in the formulas (VI):

(VI)

(A)

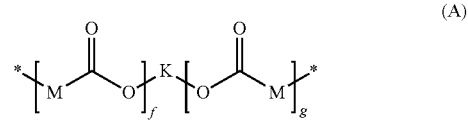

(B)

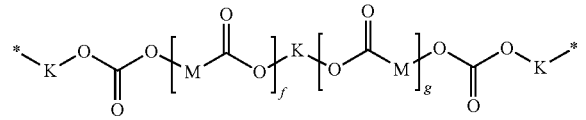

wherein f and g are independently in the range of 1-500, preferably in the range of 1-100, more preferably in the range of 1-50, most preferably in the range of 1-25.

Formula (VI-A) represents a polyester, and formula (VI-B) represents a polyester with carbonate terminal groups. For these two formulas (VI-A) and (VI-B), the K and M spacers may be independently selected for every K and M in the soft block A and are alkylene, arylene, alkylarylene or arylalkylene groups. M may also be a radical. Preferably, M spacers are selected from the group of $C_1$-$C_{12}$ linear, branched or cyclic alkylenes, optionally, but not preferably, comprising 1-3 oxygen heteroatoms, more preferably from $C_3$-$C_{11}$ linear alkylenes. Spacer K is preferably a $C_3$-$C_{12}$ linear or branched alkylene, optionally, containing 1-2 oxygen heteroatoms.

In the first particular case for formula (VI-A), all M groups are the same, and in this case (VI-A) represents a homo-polyester. Then M is preferably selected from the group of linear, branched or cyclic $C_4$-$C_{12}$ alkylenes, more preferably from $C_5$-$C_{11}$ linear alkylenes or $C_5$-$C_{10}$ branched alkylenes. Spacer K is then preferably a $C_3$-$C_{12}$ branched alkylene, optionally containing 1 or 2 oxygen atoms.

In a second particular case for formula (VI-A), M is independently selected for every M in the soft block A, and in this case (VI-A) represents a co-polyester, preferably a random co-polyester. Spacer M is then preferably selected from the group of linear, branched or cyclic $C_1$-$C_{12}$ alkylenes, optionally comprising 1-2 oxygen atoms, more preferably from $C_5$-$C_{11}$ linear alkylenes, optionally comprising 1 oxygen atom. One preferably employs two different M groups, one that is relative apolar and that is selected from the group of $C_5$-$C_{11}$ linear alkylenes and one that is relatively polar and that is selected from the group of $C_1$-$C_4$ linear or branched alkylenes. The polar M groups are then preferably used for less than 50 molar %, preferably less than 20 molar %. Another option is to combine two different M groups, one that is selected from branched alkylenes, and one that is selected from linear alkylenes; the branched alkylene is then preferably used for less than 40 mol %, more preferably for less than 20 mol %. Yet another option is to mix the sketched polar/apolar approach and the linear/branched approach, for example by combining one apolar branched M-group and one polar linear M group.

Formula (VI-B) represents a block-co-poly(carbonate-ester), as the terminal carbonyl moieties are carbonates and not esters. The terminal K spacers (i.e. the spacers adjacent to the hard block B) are identical to each other and are preferably $C_4$-$C_{12}$ linear alkylenes, optionally comprising 1 oxygen heteroatom, more preferably $C_6$-$C_{12}$ linear alkylenes. The rest of the soft block (so the middle part) is a polyester, and this may be a homo-polyester or a co-polyester, where these two polyester options have been described already for formula (VI-A), the first and the second particular case for formula (VI-A), respectively, and can be described in the same way for this Formula (VI-B) also.

In formulas (V) and (VI), f, g and j can be used in any sequence, where this may be with respect to the K, L and M spacers that can be selected independently, and with respect to the sequence of carbonate and ester monomeric units (for V-C and V-D).

The Hard Block B (II-A)

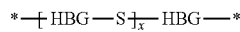

(II-B)

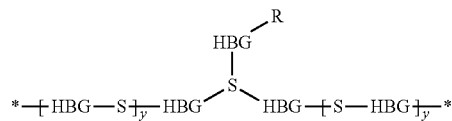

Formula (II) represents the hard block B. In this document, the hard block B is interchangeably referred as a hydrogen bonding unit (HBU). In Formula (II-A), x may be 1, 2 or 3. Preferably, x is 1 or 2. Accordingly, formula (II-A) represents a HBU that can be HBG-S-HBG, an HBG-S-HBG-S-HBG or an HBG-S-HBG-S-HBG-S-HBG. Formula (II-B) shows a HBU with three or five hydrogen bonding groups, as y can be 0 or 1. HBUs according to formula (II-A) are preferred over those of formula (II-B).

In Formulas (II), HBG represents a hydrogen bonding group, and HBG can independently be selected for every HBG in the hard block B (i.e. in the HBU), where it can independently be selected from the group of amide, urethane and urea. Preferred HBGs are urea and amide. More preferred are ureas or combinations of ureas and amides. Accordingly, and herein, other groups such as e.g. esters, carbonates and ethers are not HBGs.

For the HBU, so for the combination of hydrogen bonding groups, bis-ureas, bis-amides, tri-amides, mono-urea-bis-amides, bis-urethane bis-amides, and tetra-amides are preferred, more preferred are bisureas, bis-amides, tri-amides and mono-urea-bisamides, most preferred are bis-amides, tri-amides and mono-urea-bisamides.

The HBU is monodisperse, so it has a single molecular weight. Preferably, the molecular structure of the HBU is isomerically pure, so the connectivity of the atoms in the HBU is such that the HBU is one isomer. Furthermore, the mirror image of the HBU is preferably the same HBU, i.e. the HBU is preferably stereomerically pure, so the connectivity and the spatial arrangement of the atoms in the HBU is defined.

In Formulas (II), S represents a spacer that connects the HBGs, and S can independently be selected for every S in the hard block B (i.e. in the HBU).

Spacer S is selected from the group of alkylene, arylene, alkylarylene and arylalkylene groups. S may also be absent (i.e. it represents a radical), so that it merely represents a connection between two HBGs. Preferably, S is a radical, 1,3,5-phenylene or an alkylene selected from the group of cyclic, linear or branched $C_1$-$C_{12}$ alkylene groups, optionally, but not preferably, comprising 1-3 heteroatoms selected from the group consisting of O, N and S, more preferably O and N. More preferably, S is a radical or a $C_2$-$C_8$ cyclic, linear or branched, preferably linear or cyclic, alkylene group, optionally, but not preferably, containing 1 or 2 heteroatoms. Most preferred for S are linear or cyclic $C_2$-$C_6$ alkylenes that do not contain heteroatoms, where then ethylene, n-propylene, n-butylene, n-pentylene, n-hexylene, and 1,4-trans-cyclohexylene spacers are more preferred. Most preferred are the linear $C_3$-$C_6$ alkylene spacers.

Accordingly, it is preferred that HBU only contains linear or cyclic alkylene spacers S for formula (II-A), and these spacers are then preferably saturated. Nevertheless, from the aromatic spacers that can be considered for (II-A), 1,4-phenylene, 1,4-bismethylenebenzene and 1,3-bismethylenebenzene are preferred. For Formula (II-B), the spacer S that connects the three hydrogen bonding groups HBG, is preferably a spacer derived from 1,3,5-cyclohexyl or 1,3,5-phenylene, more preferably it is 1,3,5-phenylene. Use of any aromatic spacer S in any HBU is thus preferred for formula (II-B).

HBUs are preferred wherein intramolecular hydrogen bonds within the HBU are less likely to be formed. These are HBUs wherein hydrogen bonding groups HBG are spaced such that the distance between the H of an NH bond of one HBG and the O of the CO bond of the adjacent HBG is 8, 9, 10 or 11 covalent bonds, preferably 8, 9 or 10 covalent bonds. For example in the HBU n-butylene-bisurea group 1B (see hereunder), these distances are 9 and 11 covalent bonds. HBUs having such distances of 6 covalent bonds are less preferred.

The HBUs according to formula (II) may be symmetrical or asymmetrical, where it is symmetrical when the HBU is the same when its molecular structure is considered either from the first asterisk end to the second asterisk end, or from the second to the first. Asymmetrical HBUs may, independently, be incorporated into the [AB]$_n$ polymer chain in either of the two ways that are possible (from one asterisk end to the other, or vice versa, i.e. from head to tail or from tail to head). The HBU is preferably symmetrical.

Preferably, the adjacent groups immediately flanking the hard block HBUs, where these are K or M groups from the soft block A, are non-aromatic groups, and are preferably a radical or $C_1$-$C_{20}$ linear, cyclic or branched alkylene groups optionally containing 1-3 heteroatoms from the group N or O, and are more preferably $C_2$-$C_{18}$ linear alkylene groups without heteroatoms, more preferably $C_3$-$C_{15}$ and most preferably $C_5$-$C_{12}$ linear alkylene groups.

HBUs may be derived from, i.e. may contain fragments that are derived from, hydrazine, n-ethylene diamine, n-propylene diamine, n-butylene diamine, n-hexylene diamine, trans 1,4-cyclohexylene diamine, oxalic acid, succinnic acid, glutaric acid, adipic acid, 1,3,5-benzene tricarboxylic acid, cis,cis-1,3,5-cyclohexane tricarboxylic acid, glycine, beta-alanine, 4-amino-butyric acid, 5-amino-valeric acid, 6-amino-caproic acid, D-lysine or L-lysine. From this list, HBUs derived from oxalic acid are less preferred, and those derived from hydrazine are even less preferred, while those from the list derived from n-propylene diamine, n-butylene diamine, n-hexylene diamine, trans 1,4-cyclohexylene diamine, adipic acid and 6-amino-caproic acid are more preferred.

The following drawings show preferred HBU hard block B examples. Again, the asterisks represent the radical connections between these hard blocks B and the soft block A (or they represent an end group residue EGR), but they do not represent anything else.

HBUs 1

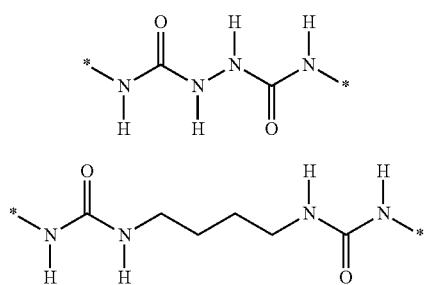

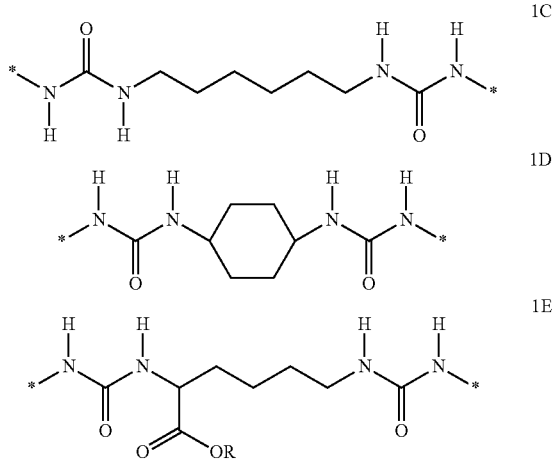

HBUs series 1 are bisurea (or di-urea) hard blocks B. HBU 1A has a radical (i.e. no) spacer between the two ureas, HBUs 1B and 1C have n-butylene and n-hexylene S spacers, respectively. HBU 1D is derived from trans 1,4-cyclohexylene diamine, and is therefore not a mixture of isomers, but is of a single isomeric form. HBU 1E may either be derived from L-lysine or D-lysine, preferably L-lysine, and not from the racemate or other mixtures of lysine, while the R group in HBU 1E may be methyl or ethyl, preferably ethyl. HBU 1E is therefore also of 1 isomeric form. From the bisurea HBU series 1, preferred are HBUs 1B, 1C and 1D, and the most preferred HBU is 1B.

HBUs 2

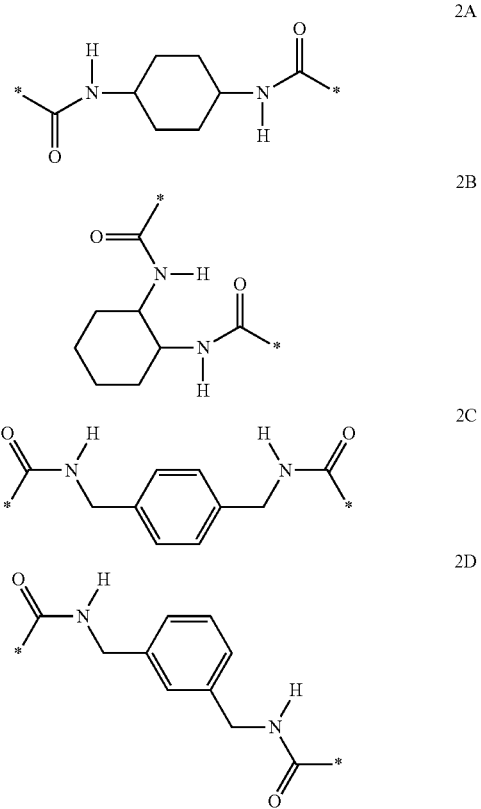

2E

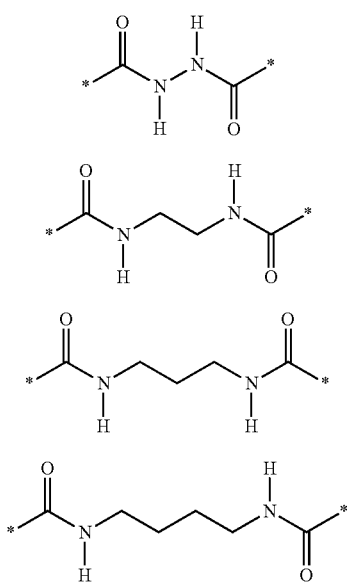

2F

2G

2H

HBUs series 2 are bis-amide (or di-amide) hard blocks B. HBU 2A is derived from trans 1,4-cyclohexylene diamine, and is therefore not a mixture of isomers, but is a single isomeric form. HBU 2B may either be derived from trans 1,2-cyclohexylene diamine or from cis 1,2-cyclohexylene diamine, not from both, and is therefore a single isomeric form. HBU 2E has a radical (i.e. no) spacer between the two amides, HBUs 2F, 2G and 2H have n-ethylene, n-propylene and n-butylene S spacers, respectively. From this diamide HBU series 2, preferred HBUs are 2A, 2C, 2D and 2H and the most preferred HBU is 2A.

HBUs 3

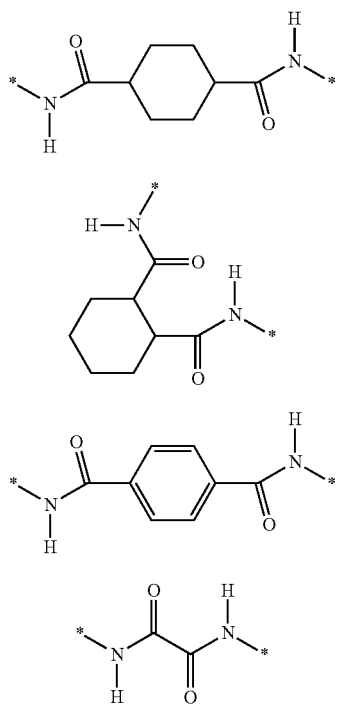

3A

3B

3C

3D

3E

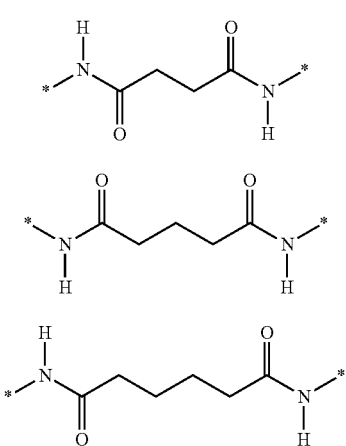

3F

3G

HBUs series 3 are bis-amide (or di-amide) hard blocks B. HBU 3A is derived from trans 1,4-cyclohexylene dicarboxylic acid, and is therefore not a mixture of isomers, but is a single isomeric form. HBU 3B is derived from trans 1,2-cyclohexylene dicarboxylic acid, and is therefore a single isomeric form; HBU 3D is derived from oxalic acid, and herein the two amides are spaced by a radical (i.e. are not spaced); HBU 3E, 3F and 3G are derived from succinic acid, from glutaric acid and from adipic acid, respectively. From this diamide HBU series 3, preferred HBUs are 3A, 3C, and 3G, more preferred are 3C and 3G, most preferred is 3G.

For the bis-amide hard blocks in general, and for those of the HBU series 2 and HBU series 3 in particular, it is preferred that the adjacent groups immediately flanking these bis-amide HBUs, where these are K or M groups from the soft block A, are preferably a radical or are selected from $C_6$-$C_{20}$ linear or cyclic alkylene groups without heteroatoms, more preferably these are a radical or $C_6$-$C_{12}$ linear alkylene groups, most preferably $C_8$-$C_{12}$ linear alkylene groups.

HBUs 4

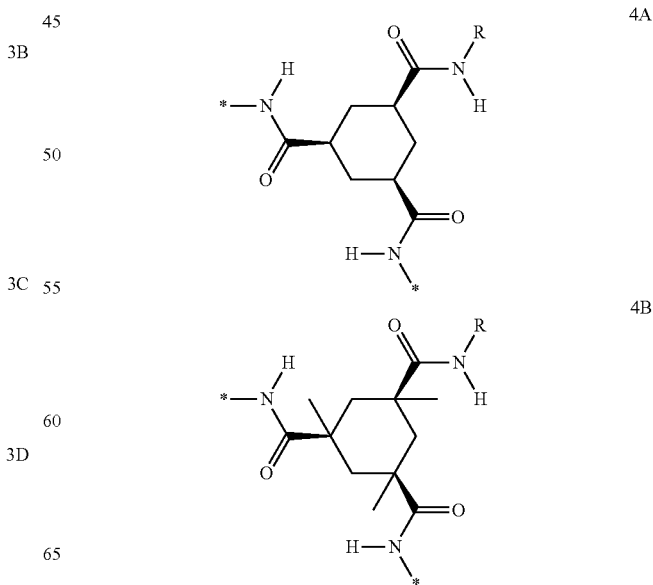

4A

4B

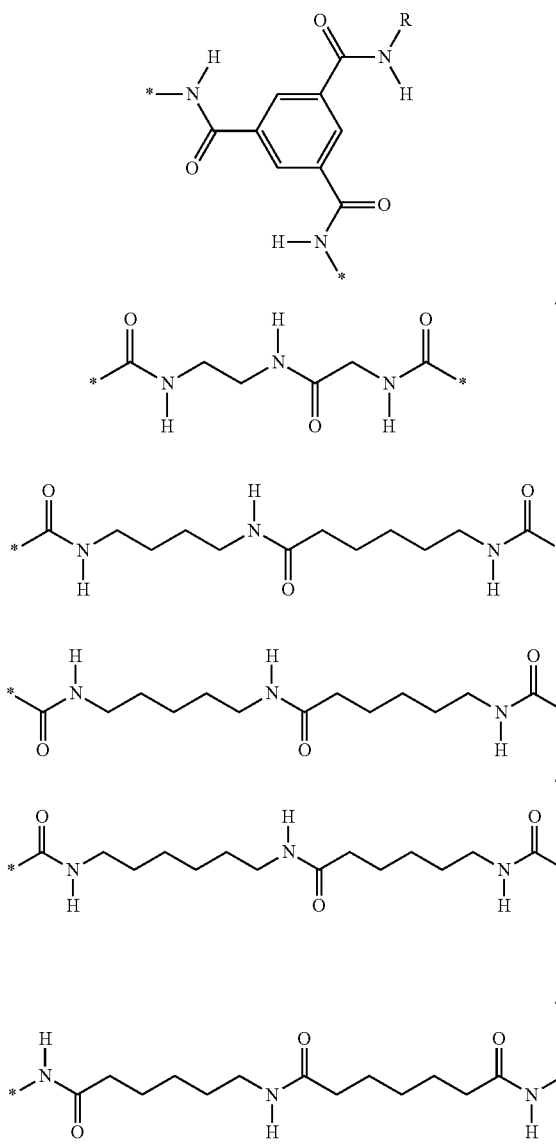

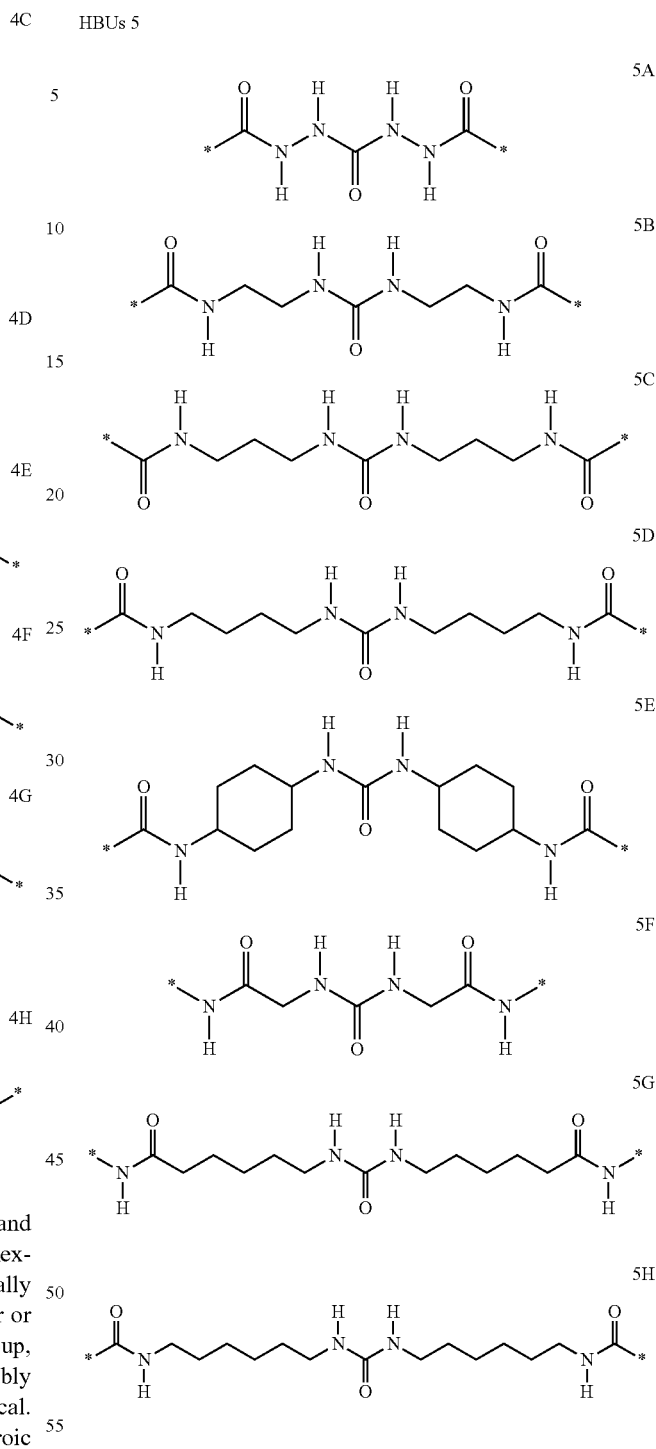

HBUs series 4 are tri-amide hard blocks B. HBUs 4A and 4B are as drawn and derived from cis,cis 1,3,5-cyclohexylenetricarboxylic acid, and are therefore both isomerically pure. In HBUs 4A, 4B and 4C, the R residue is a linear or branched $C_1$-$C_{12}$ alkyl, aryl, alkylaryl or arylalkyl group, preferably a linear or branched $C_1$-$C_8$ alkyl, most preferably a linear $C_4$-$C_8$ alkyl. HBUs 4D to 4H are asymmetrical. HBUs 4E, 4F, 4G and 4H are derived from 6-amino-caproic acid. From this tri-amide HBU series 4, preferred HBUs are 4A, 4C and 4F, more preferred are 4C and 4F, most preferred is 4F. Apart from these tri-amide HBUs, those HBUs derived from the amino acids L-lysine, L-glutamic acid and L-aspartic acid are preferred. Amidation of all $NH_2$ and COOH groups in these amino acids produces tri-amide HBUs. One of the three amides is capped, so that bifunctional tri-amide HBUs are acquired. See Examples 25A, 25B, 26C and 26D for examples of corresponding reactive compounds as according to the invention.

HBUs series 5 are mono-urea-bisamide hard blocks B. HBU 5A has two radical spacers between the urea and the two amides. HBUs 5B, 5C, 5D and 5H are derived from n-ethylene, n-propylene, n-butylene and n-hexylene diamine, respectively, while 5E is derived from trans 1,4-cyclohexylene diamine (single isomeric form). HBU 5G is derived from 6-amino-caproic acid. From this mono-urea-di-amide HBU series 5, preferred HBUs are 5B, 5C, 5D, 5G and 5H, more preferred are 5C, 5D and 5H, most preferred is 5D.

HBUs 6

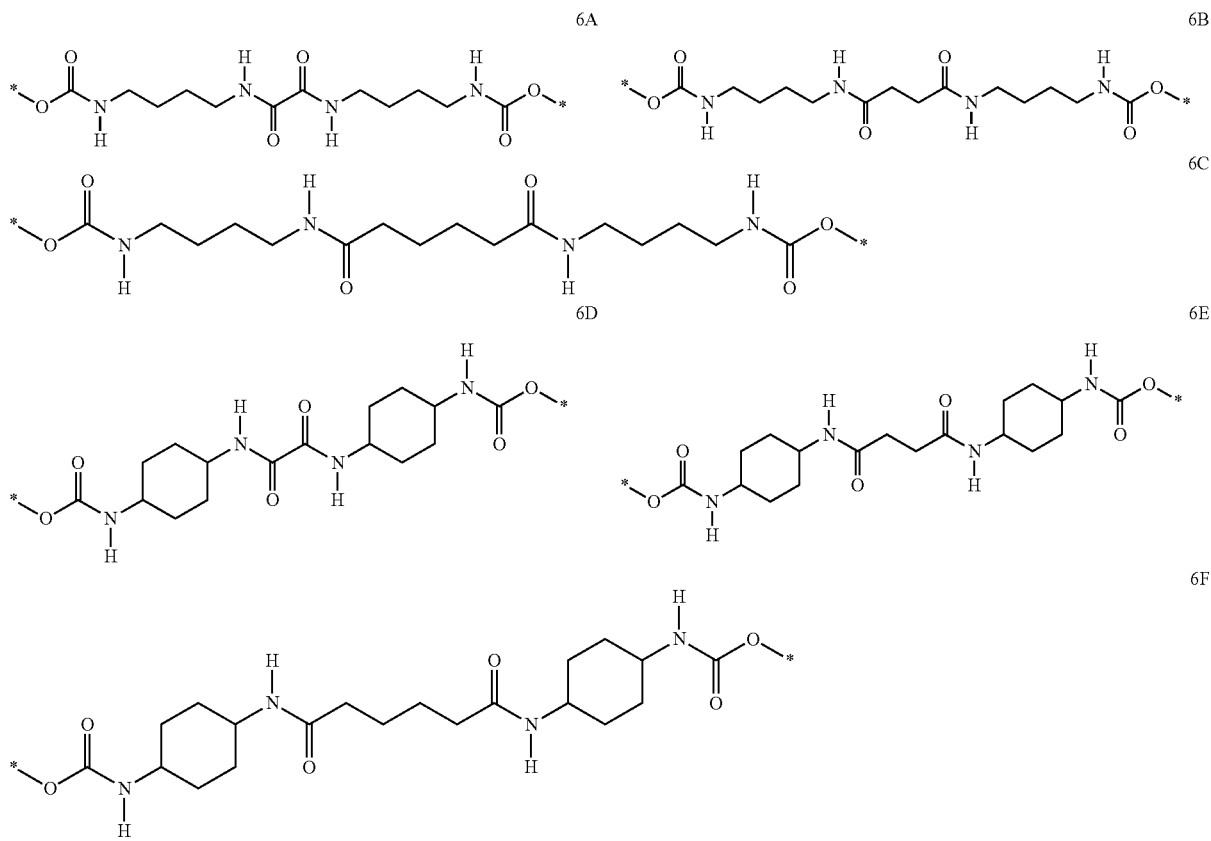

HBUs series 6 are bis-urethane-bisamide hard blocks B. HBU 6A, 6B and 6C are derived from n-butylene diamine, while 6D, 6E and 6F are derived from trans 1,4-cyclohexylene diamine (all three are therefore a single isomeric form). The diamide middle parts of these HBUs are derived from oxalic, succinic and adipic acid. From this HBU series 6, preferred HBUs are 6A, 6B and 6C, more preferred are 6B and 6C, most preferred is 6C.

HBUs 7 and HBUs 8

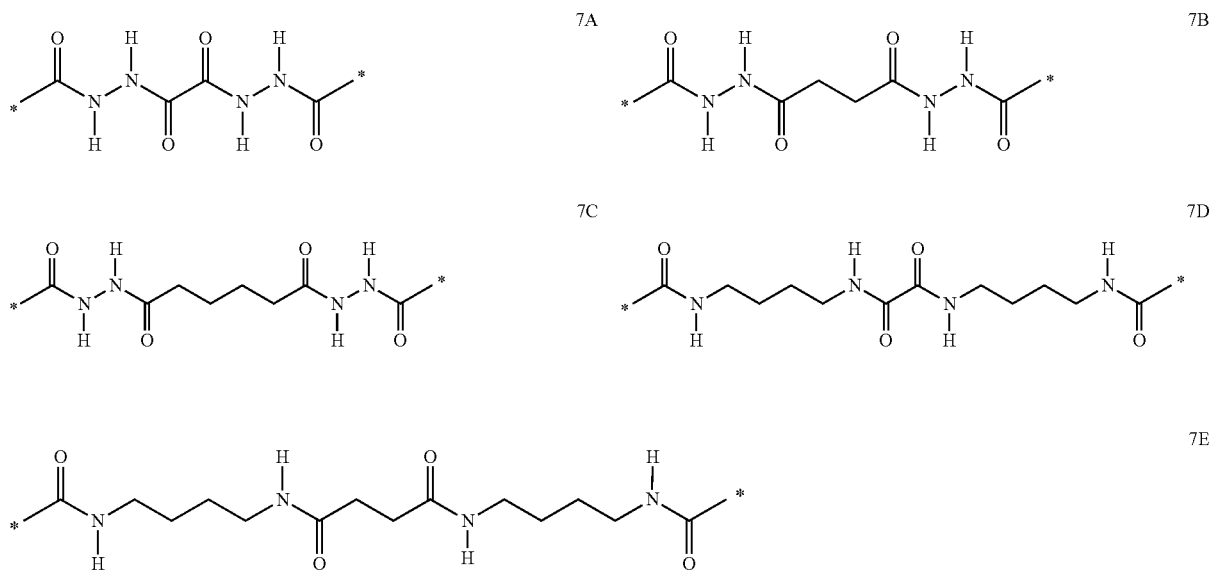

-continued
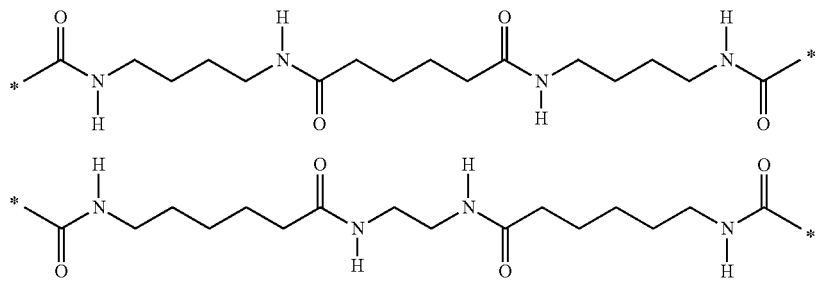
7F
7G
7H
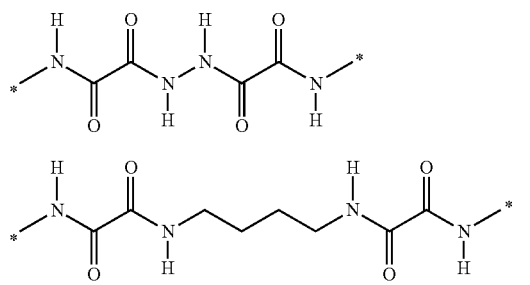
8A
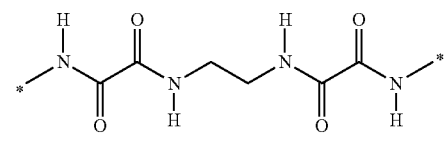
8B
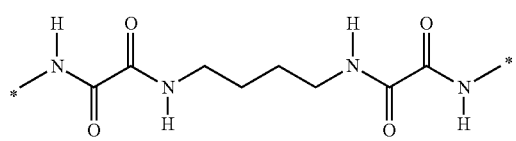
8C
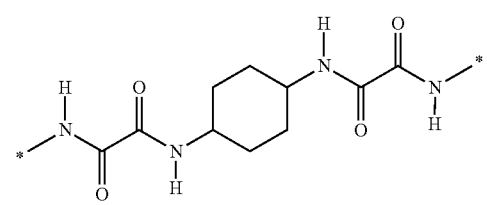
8D
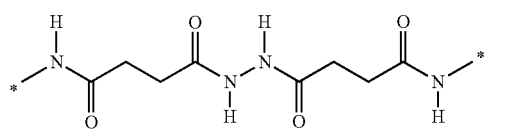
8E
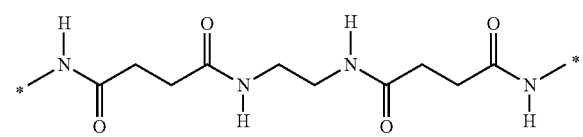
8F
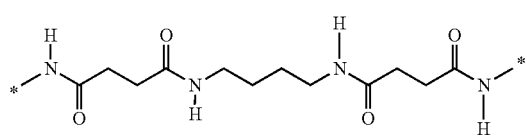
8G
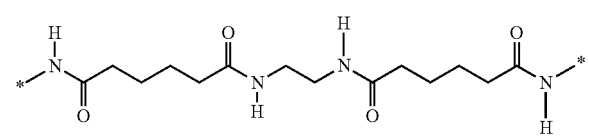
8H
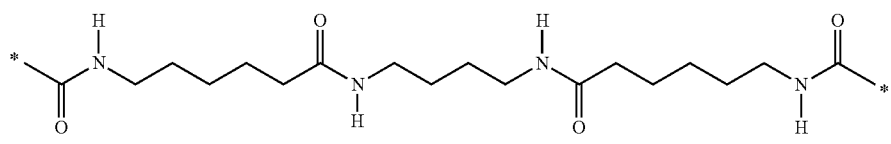
8I
8J
8K HBU series 7 and 8 are tetra-amide HBUs. Preferred from the 7 series are 7C, 7E, 7F, 7G and 7H, more preferred are 7F and 7H. Preferred from the 8 series are 8C and 8D. In HBU 8D, a trans 1,4-cyclohexylene spacer is used, so this HBU is of one isomeric form.

HBUs 9

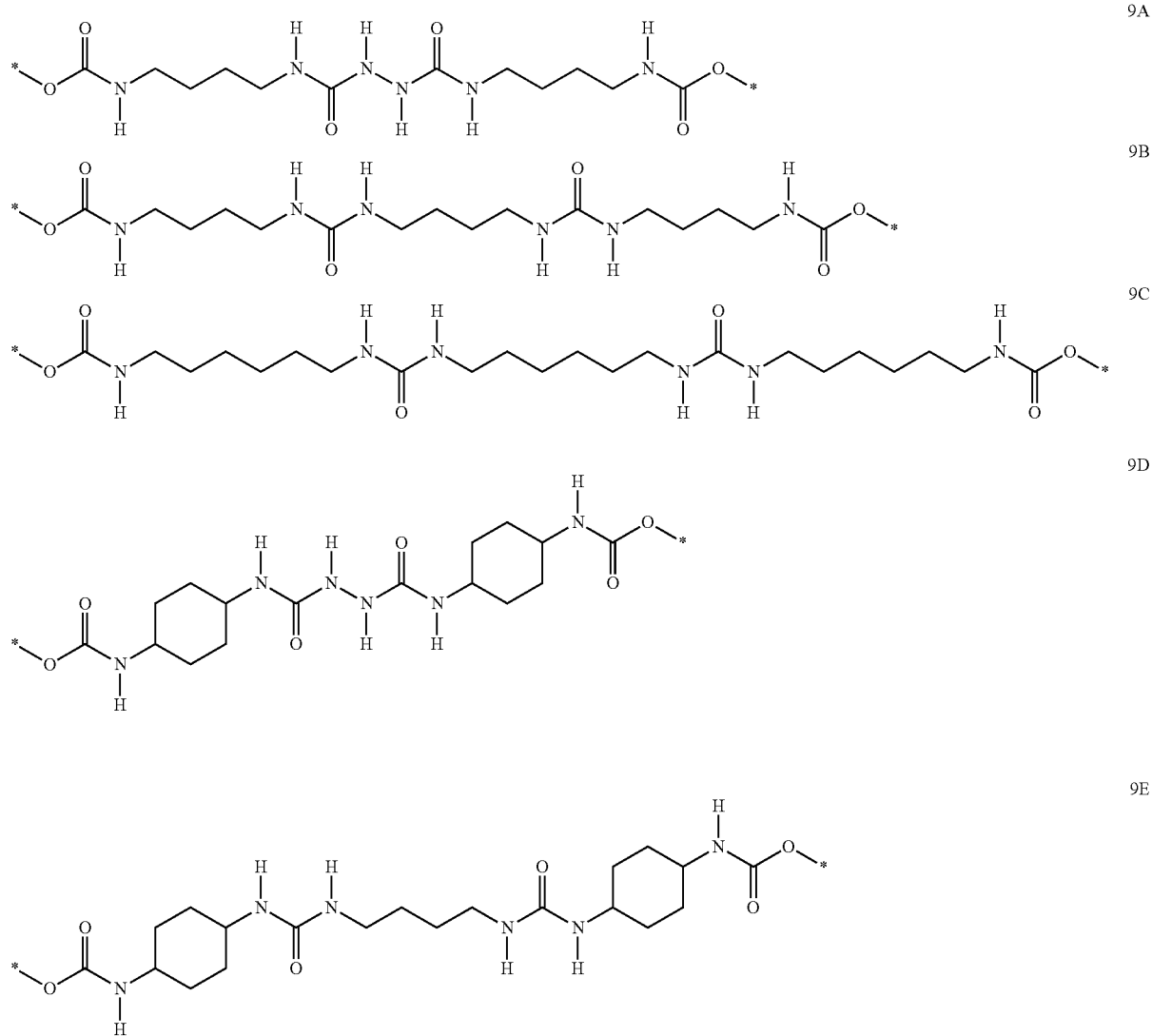

HBU series 9 are diurethane-diurea HBUs. Preferred from the 9 series are 9B and 9E. In HBUs 9D and 9E, a trans 1,4-cyclohexylene spacer is used, so these HBUs are both of one isomeric form.

HBUs 10

-continued

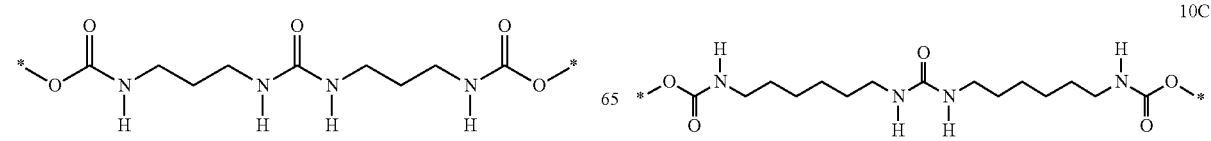

10D

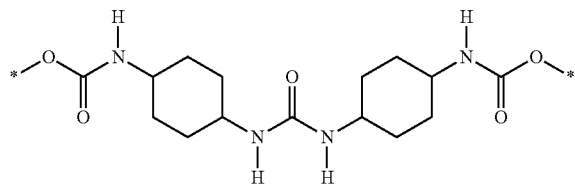

Finally, the HBU series 10 can be employed, where these are diurethane-mono-urea HBUs. Preferred examples are 10B and 10D.

From the various presented HBU series, the HBUs containing urethane HBGs, and bis-amides 3 are less preferred. HBU series bis-ureas 1, bis-amides 2, tri-amides 4, mono-urea-bisamides 5, and tetra-amides 7 are preferred, more preferred are bisureas 1, tri-amides 4, mono-urea-bisamides 5 and tetra-amides 7, even more preferred are bisureas 1, tri-amides 4 and mono-urea-bisamides 5, most preferred are tri-amides 4 and mono-urea-bisamides 5.

Regarding the above preferences for the composition of the soft block A and the hard block B, the [AB]$_n$ polymers are preferably all-aliphatic, where all alkylene groups are preferably saturated. When considering an aromatic group for [AB]$_n$ the 1,3,5-benzene-tri-carboxamide group is then preferred (see HBU 4C for an example wherein this group is used), where it then is incorporated into an [AB]$_n$ material that has no further aromatic groups or unsaturated alkylene groups.

The Chemical and Physical Properties of the [AB]$_n$ Material

The average molecular weight M$_n$ of the [AB]$_n$ polymer according to the invention is preferably between about 500 and about 500.000 Dalton, more preferably between about 2.000 and about 250.000 Dalton, even more preferably between about 5.000 and about 150.000, and most preferably between about 10.000 and about 80.000 Dalton. Preferably, the molecular weight M$_n$ is above about 10.000 Dalton, more preferably above about 15.000 Dalton, and most preferably above about 25.000 Dalton. The dispersity Đ of the [AB]$_n$ material is preferably lower than about 4, more preferably lower than about 3 and most preferably it is between about 1.4 and about 2.5.

The average molecular weight (M$_n$) of the soft block A of the [AB]$_n$ polymer of the invention is preferably between about 250 and about 50.000 Dalton, more preferably between about 500 and about 20.000 Dalton, even more preferably between about 800 and about 10.000, and most preferably between about 1.500 and about 5.000 Dalton.

The molecular weight of the hard block (the hydrogen bonding unit (HBU) is an exact molecular weight and not an average molecular weight. This formula molecular weight (FW) of the HBU is preferably between about 85 and about 1000 Dalton, more preferably between about 85 and about 530, even more preferably between about 105 and about 350, and most preferably between 115 and about 270 Dalton. Preferably, the formula weight of the HBU is not too high, and preferably it is lower than about 530 Dalton, more preferably it is lower than about 300 Dalton.

The weight percentage of the hydrogen bonding unit (HBU) in the [AB]$_n$ polymer according to the invention is preferably between about 1 and about 60 w/w %, based on the total weight of the [AB]$_n$ polymer. More preferably, it is between about 2 and about 25 w/w %, even more preferably between about 3 and about 16 w/w %, yet even more preferably between about 4 and about 12 w/w % and most preferably between about 5 and about 10 w/w %.

The hard block B in material [AB]$_n$ is a hydrogen bonding unit (HBU) that is monodisperse, i.e. it is one type of unit with a defined molecular structure. The purity (or uniformity, or molecular integrity) of the HBU in the [AB]$_n$ polymer, disregarding the end group residues EGRs (see above), is preferably higher than 85%, more preferably it is higher than 90%, even more preferably higher than 95%.

Within the [AB]$_n$ polymer, the soft block A is preferably not too polar. The level of (a) polarity of soft block A is controlled by the applied K, L and/or M spacers (see Formula (I)), and can be assessed by considering these spacers. Preferably, these spacers on average should contain more than 3.0 carbons from alkylene, arylalkylene, alkylarylene or arylene groups, wherein these carbons may therefore be quarternary (C), tertiary (CH), secondary methylene (CH$_2$) or primary methyl CH$_3$ carbons. More preferably, the K, L and/or M spacers on average contain 4.0 or more carbon atoms, most preferably 5.0 or more carbon atoms. The higher the number, the more apolar the soft block A will be. One may also use an alternative second definition for the level of (a)polarity of the soft block A, so as to account for N, O and/or S heteroatoms that may be present in the K, L and/or M spacers. Here, one divides the cumulative carbons in the K, L and/or M spacers of soft block A by the summation of the number of ester carbonyl and carbonate carbonyl moieties in soft block A and the number of heteroatoms N, O and S in the K, L and/or M spacers in soft block A. Preferably, the determined ratio should then be higher than about 2.6, more preferably higher than about 3.4, even more preferably higher than about 4.2, and most preferably about 5.0 or higher. For example, see formula (I), one may consider a soft block A wherein all M and L spacers are C$_{10}$ decylene spacers, and wherein all K spacers are derived from diethylene glycol (i.e. these are then C$_2$—O—C$_2$ spacers), and wherein o, p, q, r, s and t are all on average 1. Then, according to the first definition, the K, L and M spacers contain on average 60/9=6.67 carbons. According to the second definition, the ratio is calculated to be 60/(8+5)=4.62. These two calculations to determine the level of (a)polarity of soft block A is based on compositional information on soft block A. Such compositional information may be provided by the commercial source of the building blocks for soft block A, by the used ratios of building blocks and monomers that are employed to prepare soft block A or by analysis of the average composition of soft block A.

The [AB]$_n$ materials according to the invention have a specific morphology, where, particularly, the soft block A of the [AB]$_n$ material is highly or completely amorphous, and where the hard blocks B melt on heating and crystallize upon cooling, as can be assessed by DSC (differential scanning calorimetry). The morphology of materials can be characterized by DSC, as this technique records thermal transitions in materials, such as glass transition temperatures (T$_g$'s), melting transitions (T$_m$) and crystallization transitions (T$_c$). To describe the invention, T$_g$'s are recorded in the heating run at a scan rate of 40° C./min at the inflection point, while T$_c$'s are recorded in the cooling run at a scan rate of 10° C./min, and T$_m$'s are thereafter recorded in the heating run at a scan rate of 10° C./min. Accordingly, the reported DSC data are all collected from the melt, i.e. the reported T$_g$'s, T$_m$'s and T$_c$'s are recorded after the DSC sample has first been in the melt; data from the second heating run or following heating runs have been used, while data from the first heating run are not used. The reported T$_m$'s and T$_c$'s are the peaks (maxima or minima) of endotherms or exotherms, respectively, where these endotherms or exotherms may be broad (e.g. about 20 to about 60° C.). Using DSC, one can also record the enthalpies of crystallization ($\Delta H_{cr}$) and of melting (or fusion; $\Delta H_m$) that correspond to the $T_c$ and $T_m$ transitions, respectively, and these are recorded in Joules per gram of $[AB]_n$ material, where both are here considered as being positive, and not negative.

First, the morphology of the materials $[AB]_n$ of the invention is characterized by displaying a $T_g$ for the soft block A. The $T_g$ of the $[AB]_n$ material as assessed by DSC is preferably lower than about 0° C., more preferably lower than about −20° C., and most preferably lower than about −30° C.

Second, the morphology of the materials $[AB]_n$ is such that the soft block A preferably does not display a melting transition. If it nevertheless does display a melting transition, then this transition should be well below the operating temperature of the material. Accordingly, the $T_m$ of the soft block A is preferably lower than about 50° C., more preferably lower than about 15° C., even more preferably lower than about 10° C., and most preferably lower than about 5° C. Thus, according to the most preferred embodiment of this invention, the $T_m$ of the soft block is more than about 32° C. lower than the preferred operating temperature of 37° C. for $[AB]_n$. See hereunder, for more on the preferred operating temperatures of the material $[AB]_n$. Furthermore, if $[AB]_n$ displays a crystallization of the soft block A, this $T_c$ is preferably lower than about 30° C., more preferably lower than about −5° C., even more preferably lower than about −10° C., and most preferably lower than about −15° C. The enthalpies of crystallization ($\Delta H_{cr}$) for the crystallization of the soft block A are preferably lower than about 25 J/g, more preferably lower than about 15 J/g, and most preferably lower than about 10 J/g.

Finally, the morphology of the materials $[AB]_n$ is such that the hard block B preferably displays a melting transition $T_m$. This $T_m$ of the hard block B is then preferably higher than about 90° C., more preferably it is higher than about 105° C., most preferably it is higher than about 115° C. However, the $T_m$ of the hard block is preferably lower than about 200° C., more preferably lower than about 180° C., and most preferably it is lower than about 160° C. The material $[AB]_n$ preferably also shows a $T_c$ of the hard block, where this is preferably higher than about 60° C., more preferably higher than about 90° C. The enthalpy of crystallization ($\Delta H_{cr}$) for the hard block B is preferably higher than about 1 J/g, more preferably higher than about 3 J/g, and most preferably higher than about 6 J/g, and it is preferably lower than about 40 J/g, more preferably lower than about 25 J/g, and most preferably lower than about 15 J/g.

Processability

The materials of the invention may be processed in the melt, preferably at temperatures lower than 230° C., preferably lower than 200° C., more preferably lower than 180° C.

The $[AB]_n$ materials of the invention may be processed or reshaped at temperatures lower than the melting transition of the hard block. Preferably, this involves a heat treatment for a certain time period (preferably lower than about 24 hours, more preferably lower than about 5 hours, most preferably lower than about 1 hour) at temperatures between about 5° to about 60° C. below the $T_m$ of the material. During the heat treatment of the material (or of an object that is (partly) prepared from the material), the material (or the object) may be (re)-processed into the right shape using mechanical action (shear, pressure, molding, etc.), or the material may reshape or self heal spontaneously.

The materials of the invention may be solubilised in a wide range of organic solvents, such as e.g. acetonitrile, chloroform, dichloromethane, ortho-dichlorobenzene, THF, methyl-THF, dioxane, ethyl acetate, butyl acetate, ethyl lactate, DMSO, DMAc, toluene, and/or combinations thereof. The solutions are clear, homogeneous and stable, and can be acquired at room temperature (about 20° C.) upon standing of material and solvent or by stirring of material and solvent. Flowing solutions with suitable viscosities can be obtained, and gel formation can be avoided. Protic solvents such as methanol, ethanol, methoxy-ethanol, acetic acid, or even water may be added to reduce the viscosity of the solution, where these alcohols are generally used at volume percentages lower than or well below about 50 (v/v) %, preferably lower than about 25 (v/v) %, more preferably lower than about 10 (v/v) %, and most preferably lower than about 3 (v/v) %. Preferred are solvents or solvent combinations that are non-toxic. Accordingly, the use of the toxic fluorinated solvent hexafluoroisopropanol (HFIP) is not preferred. If it is applied, it is preferably applied in combination with other solvents, where use of HFIP is then preferably 20 (v/v) % or less (volume of HFIP per total volume), more preferably 10 (v/v) % HFIP or less, even more preferably 3 (v/v) % or less, yet even more preferably 2 (v/v) % or less, and most preferably 1 (v/v) % or less.

The $[AB]_n$ materials of the invention may be solubilized at room temperature in chloroform/methanol (10 v/v % methanol) at a concentration of at least 1 (w/v) %, preferably at a concentration of at least 5 (w/v) %, most preferably at a concentration of at least 10 (w/v) %, thereby producing homogeneous, clear and free flowing solutions (viscous or low viscous solutions). Accordingly, the formation of gels or jellies or inhomogeneities is avoided. More preferably, homogeneous, clear and free flowing solutions are acquired at room temperature in chloroform/methanol (1 v/v % methanol) using a concentration of the $[AB]_n$ material of at least 1 (w/v) %, preferably using a concentration of at least 5 (w/v) %, and most preferably using a concentration of at least 10 (w/v) %.

Concentrated but flowing solution samples can be made at room temperature by using a suitable solvent (combination), where concentrations of at least as high as about 40 (w/v) % (weight material per volume of solvent) can be attained, preferably higher than about 50 (w/v) %, more preferably higher than about 60 (w/v) %, thereby preferably excluding the use of HFIP.

In another preferred embodiment of this invention, a 10 (w/v) % solution of the $[AB]_n$ material in a mixture of chloroform and methanol (10/1 v/v) has a dynamic viscosity at 25° C. that is lower than about 5 Pa·s, preferably lower than about 2 Pa·s, more preferably lower than about 1 Pa·s, and most preferably lower than about 0.5 Pa·s. The viscosity of solutions of $[AB]_n$ can be tailored by changing the concentration of the solution, where viscosities between about 0.5 to about 10 Pa·s can be obtained, more preferably in between 0.8 and 5 Pa·s, preferably excluding the use of HFIP.

In yet another embodiment of this invention, solutions of the $[AB]_n$ material with HFIP levels of about 5 (v/v) % or less, preferably 1 (v/v) % or less, and concentrations of about 10 (w/v) % are homogeneous and clear and have dynamic viscosities at 25° C. lower than about 1 Pa·s, preferably lower than about 0.4 Pa·s, most preferably lower than about 0.2 Pa·s.

The given viscosities are measured with a rotation viscometer. Other techniques known in the art may also be used to characterize the viscosity of solutions of the $[AB]_n$ materials.

The materials of the invention combine elastic properties with toughness. The $[AB]_n$ materials of the invention have E-moduli in between about 0.1 MPa and about 200 MPa, preferably in between about 1 MPa and about 100 MPa. Preferably the E-modulus is higher than about 5 MPa, more preferably higher than about 10 MPa. Ultimate tensile strengths (UTS) as determined at the maximum of the stress-strain curve can be assessed, and preferably the UTS for the $[AB]_n$ material is higher than about 1 MPa, more preferably it is higher than about 10 MPa, and most preferably it is higher than about 20 MPa. The $[AB]_n$ materials preferably have toughnesses ($U_T$) higher than about 40 kJ/kg, more preferably higher than about 80 kJ/kg and most preferably than about 125 kJ/kg.

Mechanical testing is performed using uniaxial stress-strain tensile tests, as is known in the art, and have been performed on dog-bone shaped samples (l=22 mm, w=5 mm) at ambient temperature (about 20° C.-25° C.), using a crosshead speed of 20 mm/min. Stresses and strains are engineering stresses and strains. The Young's moduli (E-moduli), UTS and $U_T$ can thus be determined, where the Young's modulus is determined between 0.25% and 2.5% strain. The resulting engineering stress/strain curves of the $[AB]_n$ materials preferably show a monotonous increase of the stress versus strain and no distinct yield point (σ-yield). In another preferred embodiment of this invention, the elongation at which the ultimate tensile strength occurs coincides with the elongation at which the sample fails during tensile testing.

DMTA (dynamical mechanical thermal analysis) is another technique to characterize polymer materials. Preferably, the storage modulus (E') of the $[AB]_n$ materials as determined with DMTA at 37° C. is between about 0.2 MPa and about 200 MPa, and more preferably between about 1 MPa and about 100 MPa. This modulus is preferably higher than about 5 MPa, more preferably it is higher than about 10 MPa, and most preferably it is higher than about 15 MPa. Moreover, this storage modulus shows little dependence on temperature between about 20° C. and about 80° C. Specifically, the storage modulus E' at 80° C. has a value that is at least about 75%, more preferably at least about 90% and most preferably at least about 95% of the E' storage modulus as recorded at 20° C. Similarly, the storage modulus E' at 50° C. preferably has decreased with less than about 15%, more preferably with less than about 10%, and most preferably with less than about 5%, as compared to the storage E'-modulus as measured at 30° C.

In another preferred embodiment, the tan(δ) as determined with DMTA at 37° C., is lower than about 1. Preferably, this tan (δ) is lower than about 0.2, more preferably, the tan(δ) is lower than about 0.1, even more preferably it is about 0.06 or lower, and most preferably it is about 0.04 or lower. Additionally, the tan(δ) as a function of temperature preferably displays a minimum and this minimum preferably lies between about 20° C. and about 100° C., more preferably between about 30° C. and about 80° C., and most preferably between about 40° C. and about 70° C., so it is most preferably close to, but somewhat above 37° C.

DMTA can also be used to determine the flow temperature (T-flow) of a material, where this is the temperature at which the storage E'-modulus suddenly decreases, and here it is defined as the temperature at which the E'-modulus has fallen below about 0.1 MPa. The T-flow of the materials according to the invention is preferably higher than about 100° C., more preferably higher than about 115° C. and most preferably higher than about 125° C. Furthermore, the T-flow is preferably lower than about 200° C., more preferably lower than about 180° C., and most preferably it is lower than about 160° C. Moreover, the temperature at which the E' modulus has fallen below 1 MPa is preferably higher than about 100° C.

DMTA is measured in extension at 1 Hz scanning from −100° C. to flow of the material, at a rate of 3° C./min on solvent cast films. The storage (E'), the loss modulus (E") and the tan(δ) are determined as a function of temperature.

Other mechanical tests known in the art to characterize the $[AB]_n$ materials of the invention may also be used, such as cyclic tensile tests including the determination of the tensile set.

The materials according to the invention may be tested and characterized with toxicity tests that are known in the art. Cell viability tests, such as MTT assays, cell proliferations assays, lactate dehydrogenase assays and other tests may be employed.

The materials according to the invention $[AB]_n$ may be tested using augmented in vitro degradation tests, as is known in the art. One may use hydrolysis tests using water or PBS or solutions of bases such as NaOH. One may also use water or PBS solutions containing enzymes that mimic in vivo enzymatic hydrolysis, or solutions that mimic in vivo oxidation. These tests may be executed at room temperature or at 37° C. or at higher temperatures. The degradation may be followed by monitoring e.g. the weight, the molecular weight, and/or the viscosity (of solutions of) test samples. Test sample constructs may e.g. be thin films. In vitro degradation data may be used to anticipate in-vivo behavior.

Use and Applications of the Materials $[AB]_n$

The materials of the invention are preferably used in biomedical applications. The materials may for example be used as replacement for or in soft tissue, where it may be exposed to loads, pressures and strains, and where their combined elastic and toughness properties may act favorably. The materials may also be exposed to blood, so that its degradative properties and/or its stability may be employed.

The $[AB]_n$ polymers according to the invention are especially suitable for use as biomaterials or in compositions used as biomaterials, for example for implants and tissue engineering applications and purposes.

In a preferred embodiment according to this invention, the $[AB]_n$ polymers are used as scaffolding material for tissue engineering purposes.

The $[AB]_n$ polymers according to the invention may also be used as scaffolding material for in vivo tissue engineering purposes.

In a more preferred embodiment according to the invention, the $[AB]_n$ polymers are used for in situ tissue engineering.

In the preferred embodiment of the invention, the operating temperature of the biomaterials of the invention is about 37° C., so from about 34° C. to about 42° C., but it may also be ambient temperature, about 15° to about 25° C. In other embodiments, higher operating temperatures are used, where these may e.g. be from about 50° C. to about 130° C.

The scaffolding material implant can be a solid structure or an open porous structure, and can be fabricated using the various processing techniques that are available in the art, or combinations thereof, such as (injection) moulding, melt pressing, melt spinning, fibre spinning, electrospinning, cryospinning, salt or sugar leaching, thermally induced phase separation (TIPS; e.g. from DMSO), extrusion techniques, stereo lithography, 3D printing and for these techniques the materials may be processed from solution, emulsion, dispersion, suspension, powder or from the melt.

A preferred processing technique is melt spinning at temperatures below about 200° C., more preferably below than about 180° C., and most preferably below about 160° C.

Another particularly suitable and preferred technique to process the material of the invention is electrospinning. Electrospinning allows for the production of porous structures where material is processed from an organic solution into a mesh with micrometer sized fibres, as is known in the art. Electrospinning requires homogeneous and viscous but free flowing solutions (no gel or jelly mixtures), that are preferably clear (no haziness or other inhomogeneities). Preferably, the electro-spinning is performed with solutions comprising about 5-30 wt %, more preferably about 10-30 wt %, and most preferably about 15-25 wt % of the $[AB]_n$ biomaterial.

In another preferred embodiment of this specific embodiment, electrospinning is performed from organic solvents that comprise less than about 20% (v/v) of a fluorinated solvent, preferably less than about 10% (v/v) of a fluorinated solvent, more preferably less than about 5% (v/v) of a fluorinated solvent, more preferably less than about 1% (v/v) of a fluorinated solvent, and most preferred less than about 0.1% (v/v) of a fluorinated solvent. Preferably, electrospinning is performed from a solution comprising halogenated solvents, optionally in the presence of alcohols, which is free of fluorinated solvents such as hexafluoro-isopropanol. Variables in the electro-spinning process (e.g. solvent choice, concentration of material, applied voltage, other operating settings) can be used to optimise results. The electrospun fibers are preferably uniform in size, and preferably have diameters of at least about 1 micrometer, more preferably of at least about 2 micrometer, even more preferably of at least about 3 micrometer, and most preferably of diameters of at least about 5 micrometer. The fibres may be spun isotropically or anisotropically. Porosities of scaffold objects are preferably higher than about 40%, more preferably higher than about 60%, and most preferably higher than about 70%.

In a specific embodiment of this invention the implant is a cardiovascular implant preferably chosen from the group consisting of heart valve, blood vessel, vessel, valved conduit, cardiovascular patch, or arteriovenous shunt (AV-shunt). In another embodiment, the implant can be implanted using minimal invasive surgery in which only a small incision in the patient is needed to implant the implant. In this embodiment, the beneficial elastic behaviour of the $[AB]_n$ material is exploited to crimp the implant object and thereby significantly temporarily minimizing the volume of the implant. The implant may optionally comprise other (non-polymeric) structures to improve the strength of the implant.

The $[AB]_n$ materials may be used in combination with each other and with other materials, pharmaceutical active compounds, diagnostic agents, anti-oxidants (e.g. Vitamin C, or Vitamin C derivatives), and/or products of natural origin, such as peptides, proteins (such as collagen, gelatine, or fibrin), sugars, polysaccharides (such as hyaluronate, agar, agarose, xantham gums, alginate, chitosan or inulin), before, during, or after processing of the material into the desired form. Preferably, the $[AB]_n$ materials are not blended with any of said ingredients.

The Preparation of the $[AB]_n$ Polymer

The $[AB]_n$ polymer according to the invention is prepared by a chain extension polymerization reaction wherein:

a prepolymer according to formula (III-A) or (III-B):

(III-A) and (III-B)

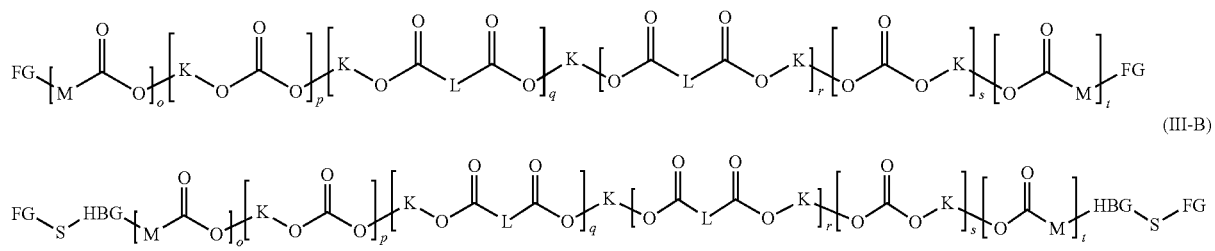

is reacted with a reactive compound according to formula (IV-A) or (IV-B):

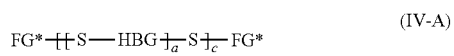 (IV-A)

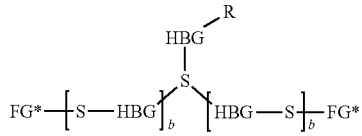 (IV-B)

wherein:

K is a $C_1$-$C_{36}$ alkylene group, a $C_6$-$C_{24}$ arylene group, a $C_7$-$C_{24}$ alkarylene group or a $C_7$-$C_{24}$ arylalkylene group;

L is a $C_1$-$C_{36}$ alkylene group, a $C_6$-$C_{24}$ arylene group, a $C_7$-$C_{24}$ alkarylene group or a $C_7$-$C_{24}$ arylalkylene group or L is absent;

M is a $C_1$-$C_{36}$ alkylene group, a $C_6$-$C_{24}$ arylene group, a $C_7$-$C_{24}$ alkarylene group or a $C_7$-$C_{24}$ arylalkylene group or M is absent;

o, p, q, r, s and t are independently 0-50;

provided that:

(a) when o, q, r and t are 0, then p and s are independently 1-50;

(b) when p and s are 0, then o, q, r and t are independently 1-50;

(c) when o and t are 0, then p, q, r and s are independently 1-50;

(d) when q and r are 0, then o, p, s and t are independently 1-50;
HBG is a simple hydrogen bonding unit independently selected from the group consisting of amide, urea and urethane groups;
S is a $C_1$-$C_{36}$ alkylene group, a $C_6$-$C_{24}$ arylene group, a $C_7$-$C_{24}$ alkarylene group or a $C_7$-$C_{24}$ arylalkylene group or S is absent;
R is hydrogen, a $C_1$-$C_{24}$ alkyl group, a $C_6$-$C_{24}$ aryl group, a $C_7$-$C_{24}$ alkaryl group or a $C_7$-$C_{24}$ arylalkyl group; and
a is 0, 1, 2, 3 or 4;
b is 0 or 1;
c is 0 or 1;
FG is a functional group selected from the group consisting of hydroxy, azide, activated hydroxy, carboxylic acid, activated carboxylic acid, isocyanate, activated amine, ester, alkenyl, alkynyl and amine; and
FG* is a complementary functional group selected from the group consisting of isocyanate, amine, activated amine, carboxylic acid, activated carboxylic acid, ester, hydroxy, activated hydroxy, azide, alkenyl and alkynyl.

Accordingly, structures of the prepolymer according to formulas (III-A) and (III-B) include:

part of the hard block B hydrogen bonding unit (HBU) in the $[AB]_n$ polymer. The complete HBU hard blocks B are thus formed as the chain extension polymerization reaction takes place.

In the embodiment for (IV-A) where c is 1, and a is 3 or 4, a reactive compound with 3 or 4 HBGs is reacted into the $[AB]_n$ polymer chain. Alcohol or azide FG groups in the prepolymer (III-A) are then preferred to be reacted with complementary ester (or activated carboxylic acid) or alkynyl FG* groups in (IV-A), respectively, resulting in ester and 1,2,3-triazine connections, respectively. Likewise, in the embodiment for (IV-B) where b is 1, the reactive compound has 3 HBG groups, and then these combinations of FG (alcohol or azide for (III-A)) and FG* (ester or alkynyl for (IV-B)) groups are also preferred.

Using click-type or reactions to prepare the $[AB]_n$ materials, by using FG and FG* groups that are alkynyl and azide, or azide and alkynyl, produces aromatic 1,2,3-triazine connective groups in these $[AB]_n$ materials that are otherwise preferably all-aliphatic and devoid of further aromatic groups or unsaturated alkylene groups.

In the specific embodiment for (IV-A) where c is 0, the remaining FG*-FG* reactive compound is a reactive phos-

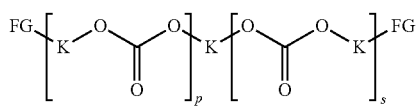
(VII-A)

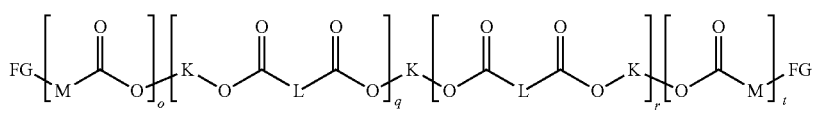
(VII-B)

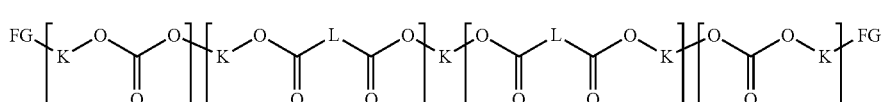
(VII-C)

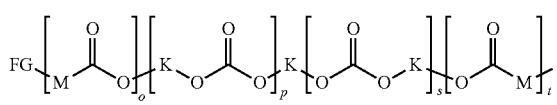
(VII-D)

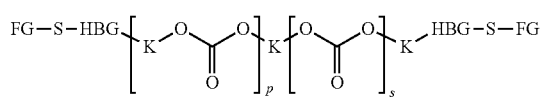
(VII-E)

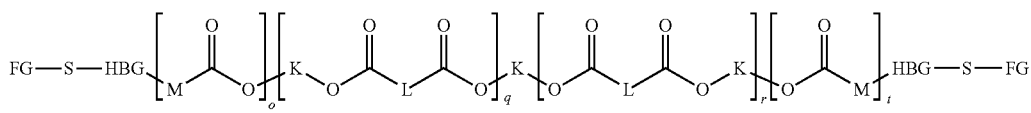
(VII-F)

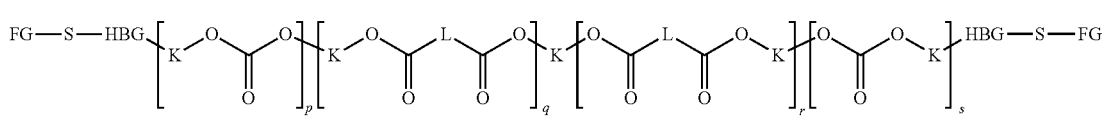
(VII-G)

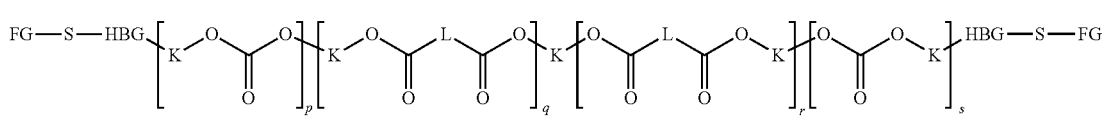
(VII-H)

In most embodiments of the invention, and also in the preferred embodiments of this invention, urea, amide or urethane groups are the reaction product upon reaction of the functional and complementary functional groups of the prepolymer and of the reactive compound (FG and FG*). The formed amide, urea or urethane groups then become gene derivative that upon reaction with two FG groups of the prepolymer, that are then amines, gives only one HBG group, a urea group.

In formulas (III) and (VII), the M-ester (i.e. the o and t monomers), the K-carbonate (i.e. the p and s monomers), and the K/L-ester (i.e. the q and r monomers) monomer groups may be arranged in any order or sequence in soft block A, where all M, K and L spacers can be selected independently for every M, K and L spacer in every monomer group. Accordingly, the o, p and q monomeric units may be arranged in any order or sequence, and also the r, s and t monomeric units may be arranged in any order or sequence in soft block A. For example, these sequences may be homo, random, alternate, block or combinations of these sequences.

According to the invention, preferably only one prepolymer building block (III) is reacted with only one reactive group building block (IV). Accordingly, preferably every A block in the [AB]$_n$ polymer chain is the same A block, i.e. it has the same prepolymer precursor origin (it stems from the same prepolymer precursor), and every B block in the [AB]$_n$ polymer chain is the same. Preferably, both A and B are therefore not independently selected along the [AB]$_n$ polymer chain.

The Prepolymer with Two Reactive Functional Groups

According to a preferred embodiment, the prepolymer according to formulas (III) is prepared from a (co)-polycarbonate diol (o, q, r and t are 0; FG is hydroxy; formula (VII-A)), a (co)-polyester diol (p and s are 0; FG is hydroxy; formula (VII-B)) or a co-poly(ester-carbonate) diol (none of o, p, q, r, s and t are 0; o and t are 0; q and r are 0; FG is hydroxy; formulas (III-A), (VII-C) and (VII-D)). Such prepolymer diols may be prepared by any procedure that is known in the art. A selection of such prepolymer diols are also commercially available.

The preferred groups for K, L, M, R, S and HBG are presented above where the structure of the [AB]$_n$ polymer is disclosed. The preferred ranges and numbers for o, p, q, r, s, t and x and y are also there presented. For formulas (III-B) and (VII-E) to (VII-G) HBG is preferably an amide or urethane group, most preferably a urethane group.

Preferred FG functional groups are amine, carboxylic acid, activated carboxylic acid and activated hydroxy groups. Preferred FG* complementary functional groups are isocyanate, amine, activated amine, activated hydroxy, carboxylic acid, and activated carboxylic acid groups. Preferably, the prepolymer diols used for the preparation of the prepolymer according to formula (III) are all-aliphatic prepolymer diols, where all the alkylene groups are preferably saturated.

In the below, building blocks that can for example be used for preparing the prepolymer diols are mentioned. In case isomers are possible, all are included (racemates, enantiomers, diastereomers and its mixtures, or any other type of isomers).

Aliphatic diols may include $C_2$-$C_{15}$ linear, branched or cyclic diols such as ethylene glycol, 1,2-propylene glycol, 1,3-propylene glycol, 2-methyl-1,3-propanediol, 1,4-butylene glycol, 1,2-butylene glycol, 1,3-butylene glycol, 2,3-butylene glycol, 1,5-pentanediol, 1,2-pentanediol, 2,2,4-trimethyl-1,3-pentanediol, 1,6-hexanediol, 1,2-hexanediol, 1,5-hexanediol, 2,4,4-trimethyl-1,6-hexanediol, 1,7-heptanediol, 1,8-octanediol, 1,9-nonanediol, 1,10-decanediol, 1,12-dodecanediol, cyclohexane diol, 1,4-bis-(hydroxymethyl)-cyclohexane, 4,8-bis-(hydroxymethyl)tricyclo[5.2.1.02,6]decane neopentyl glycol, fully hydrogenated bisphenol A, diethylene glycol, triethylene glycol, tetraethylene glycol, dipropyleneglycols such as the linear form or the branched bis(2-hydroxy-propyl)-ether forms, or dibutylene glycol. Fluorinated diols of the form $HO(CH_2)_n(CF_2)_m(CH_2)_nOH$ with n=1-3 and m=1-20 may also be considered. Oligo-ethylene glycols, oligo-propylene glycols and oligo-tetrahydrofurans with molecular weights ($M_n$) lower than about 450 Dalton may also be considered. Aliphatic $C_{36}$ diols as prepared from dimerization of fatty acids can also be used; preferably saturated $C_{36}$-diols are then used.

Aliphatic dicarboxylic acid and cyclic anhydride building blocks may include $C_2$-$C_{12}$ linear, branched or cyclic diacids such as oxalic acid, succinic acid, methyl succinic acid, glutaric acid and its 2-methyl and 3-methyl derivatives, adipic acid and its 3-methyl derivative, pimelic acid, suberic acid, azelaic acid, sebacic acid, 1,3-cyclohexane dicarboxylic acid, trans-1,4-cyclohexane dicarboxylic acid, diglycolic acid, thiodiglycolic acid, 3,6-dioxa-octanedioic acid, succinic anhydride, glutaric anhydride and diglycolic anhydride. Aliphatic $C_{36}$ di-carboxylic acids as prepared from dimerization of fatty acids can also be used; preferably saturated $C_{36}$ di-carboxylic acids are then used.

Cyclic esters (lactones) or hydroxy carboxylic acids may include ε-caprolactone, valerolactone, lactides, glycolide, glycolic acid, lactic acids, hydroxy butyric acids, caproic acid, hydroxy caproic acids.

Phosgene derivatives may include phosgene, dimethylcarbonate, diethylcarbonate, dipropylcarbonate, cyclic n-trimethylenecarbonate, carbonyl-diimidazole (CDI), disuccinimidyl carbonate (DSC), diphenylcarbonate. Dimethylcarbonate, diethylcarbonate and carbonyl-diimidazole are preferred.

The prepolymer diol that is used to prepare the reactive prepolymers according to formula (III), which is thereafter used to prepare the [AB]$_n$ materials of this invention, preferably has a $T_g$ that is lower than about 0° C., more preferably lower than about $-15°$ C., and most preferably it is lower than about $-30°$ C. The average molecular weight $M_n$ of the prepolymer diol is similar to that of the soft block A, and preferably it is in between about 500 and about 20.000 Dalton, more preferably in between about 700 and about 10.000 and most preferably it is in between about 1300 and about 5000 Dalton.

Poly-n-ethylene-carbonate or poly-n-trimethylene-carbonate (PTMC) prepolymer diols (PTMC) are in principle less preferred, as these are polar prepolymers with a relatively high $T_g$.

With respect to the above prepolymer diol preparations, the nature of the monomers as well as their applied molar ratios (diols, dicarboxylic acid derivatives, hydroxy-carboxylic acid derivatives, cyclic esters, phosgene derivatives, linear or cyclic carbonates), can be used to influence and tune the properties of the prepolymer diol product. This will translate into the properties of the [AB]$_n$ polymer, as only a single source of prepolymer is used for preparing the [AB]$_n$. Not only the $T_g$, $T_m$ and polarity of the [AB]$_n$ material can thus be tuned, but also the degradation properties of the [AB]$_n$ material.

According to the invention, tuning of the properties of [AB]$_n$ polymer via controlling the prepolymer composition may be achieved using various methods, where these non-limiting methods can be used and combined.

First, a monomer with a higher polarity may be used in the preparation of the prepolymer diol, in combination with another monomer that is more apolar. Examples of such polar monomers are $C_2$-$C_4$ diols such as ethylene glycol, n-propylene glycol, 1,2-propylene glycol and n-butylene glycol and the $C_4$-$C_6$ glycols diethylene glycol and triethylene glycol; corresponding apolar monomers are then $C_5$-$C_{12}$ diols, such as linear pentyl, hexyl, heptyl or octyl diols. Other examples of polar monomers are $C_4$-$C_6$ dicarboxylic acid derivatives, such as succinic acid, glutaric acid and adipic acid derivatives, where corresponding apolar monomers are $C_7$-$C_{12}$ dicarboxylic acid derivatives, such as sebacic acid derivatives.

Second, for co-poly(carbonate-ester) diols the ratio between the carbonate and the ester groups can be controlled by controlling the ratio of carbonate and ester building blocks. Accordingly, the percentage of carbonate groups relative to the total number of carbonyl moieties in soft block A can be controlled and tuned. This average percentage is higher than about 1%, preferably higher than about 30%, more preferably higher than about 60%, and most preferably it is higher than about 75%.

Third, branched monomers can be used in combination with linear monomers. Examples of branched monomers are branched diols or branched dicarboxylic acids (such as cyclohexane dicarboxylic acids). Branched diols are preferably those having CH-groups, and may then have a secondary alcohol group. Examples are 1,2-propylene glycol, 2-methyl-1,3-propanediol and 1,3-butanediol.

Fourth, monomers with ether groups in them may be used. Examples are diethyleneglycol, triethyleneglycol or tetraethylene glycol, dipropylene glycols such as the linear form or the branched bis(2-hydroxy-propyl)-ether forms, preferably diethyleneglycol. Low molecular weight poly-tetrahydrofuran may also be considered ($M_n$ lower than about 450 Dalton), but is not preferred.

Fifth, the prepolymer diol may be used as such, but may also be converted to another prepolymer with other reactive functional groups according to (III-A) or (III-B). Several conversion methods will be explained below, and these methods can also be employed to influence the properties of the final $[AB]_n$ product.

The prepolymer diol is preferably converted to a prepolymer according to formula (III-A) or (III-B) which has two functional groups. These preferred functional groups are azides, activated alcohols, carboxylic acids or amines. Introduction of these functional groups is possible via several methods known in the art, and also by a new method.

Azides may be prepared as follows. In a first step, the alcohol end groups are converted to tosylates (e.g. by reaction with tosylchloride in pyridine) or mesylates. These tosylate/mesylate groups are then converted into azide groups, e.g. by reaction with sodium azide.

Activated alcohols are in fact urethane groups or carbonates and may be prepared as follows. The alcohol end groups are reacted with phosgene or reactive derivatives thereof, e.g. carbonyl-diimidazole or 4-nitrophenyl chloroformate. Examples of activated alcohols are shown below, wherein R represents the residue of the alcohol and LG represents a leaving group. The first formula is a general example while the other five formulas show explicit examples of activated alcohols.

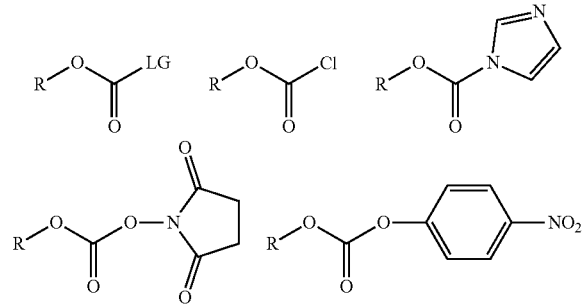

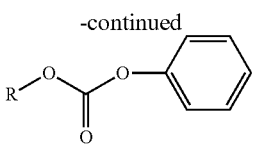

Carboxylic acids may be prepared by converting the alcohol end groups with an excess of cyclic anhydrides such as particularly succinnic anhydride, glutaric anhydride and diglycolic anhydride. This step implies that apart from the carboxylic acid end groups also an ester group is introduced; i.e. polycarbonates are converted to polycarbonates with ester-carboxylic acid end groups.

Amines may be prepared by cyano-ethylating the alcohol end groups using acrylonitrile, followed by reduction of the nitrile groups to amines. Another method is reduction of azides (see above). In a further method activated alcohols (see above) can be reacted with diamines or with a monoprotected diamine followed by deprotection. In another further method carboxylic acid end groups (see above) can be coupled to a diamine, that is optionally protected. In yet another further method the alcohol end groups can be reacted with a molecule that is an activated ester or an activated alcohol and that also bears a protected amine group, where after the protected amine is deprotected.

From the above, prepolymers with amine and carboxylic acids are preferred, most preferred are prepolymers with carboxylic acid reactive groups.

Several of the above methods are illustrated in the scheme below and they are versatile in the sense that the spacer between the amine end group and the urethane, amide, ester or carbonate group, respectively, can be selected, and thereby the spacer adjacent to the HBU, so the spacers flanking the HBU, can be selected. In the examples this spacer is an n-butylene spacer (while $R_1$ is the residue of the alcohol, $R_2$ is the residue of the carboxylic acid, LG is a leaving group, $P_1$ is the optionally used protective group, $P_2$ is an applied protective group). Preferred spacers are $C_1$-$C_{12}$ linear, branched or cyclic alkylenes, more preferred are $C_2$-$C_{12}$ branched or linear alkylenes, most preferred are $C_4$-$C_{12}$ linear alkylenes. Any spacer with aromatic groups are not preferred. In particular embodiments of this invention, the spacer contains one or two ester groups; by employing such spacers discrete numbers of esters can be introduced at the terminal ends of an otherwise (homo)-polycarbonate prepolymer.

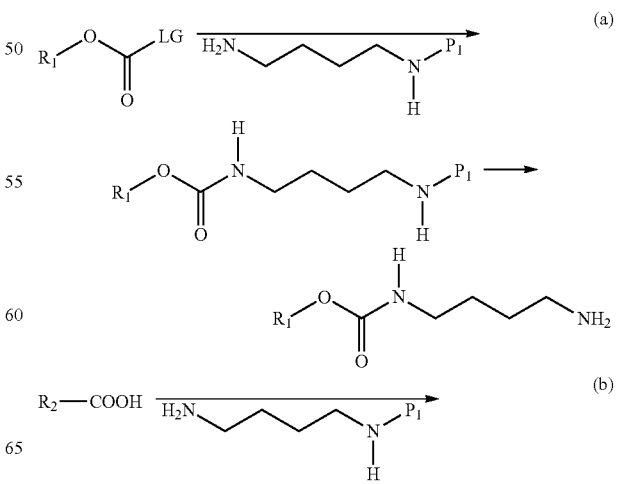

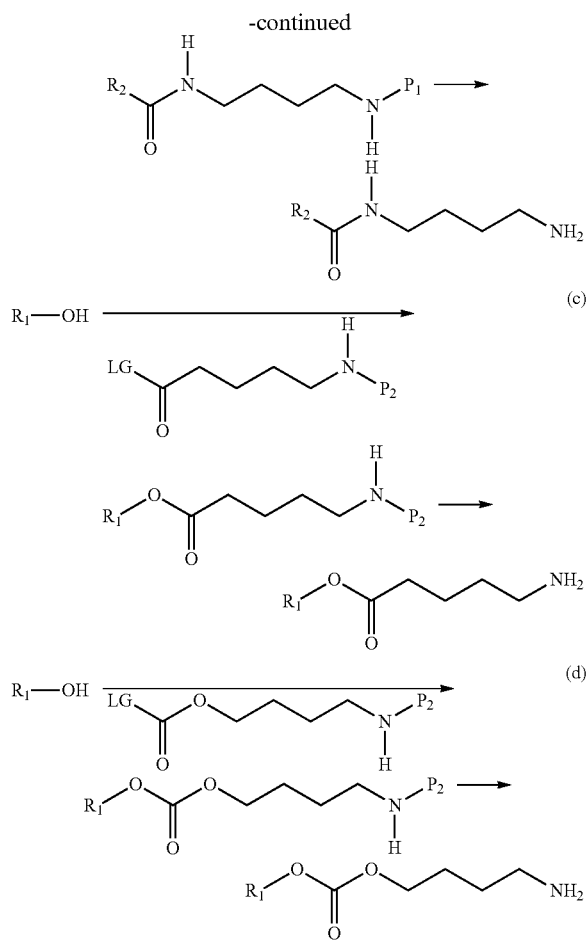

The prepolymer with reactive groups according to (III-A) or (III-B) can be purified by methods that are known in the art, such as precipitations, extractions, or combinations thereof. The selected synthetic route will also warrant that the prepolymer has a high molecular definition, for example because protective groups have been used, and because selective reactions have been employed.

The Compound with Two Reactive Functional Groups ('the Reactive Compound')

These are the reactive compounds according to formulas (IV-A) or (IV-B).

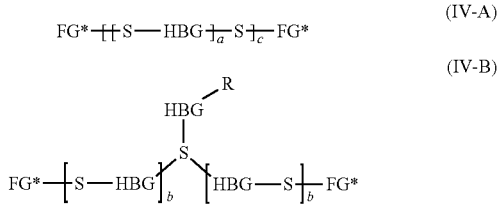

Some reactive compounds are simply routinely commercially available, while other reactive compounds can be prepared in a few synthetic steps optionally applying protective groups, and employing purifications (e.g. extractions, crystallizations, precipitations; e.g. diamines may be prepared and isolated in HCl salt forms, and diisocyanates may be distilled), so as to acquire these compounds in pure form.

Examples of routinely commercially available reactive compounds, according to (IV-A) with c is 1 and a is 0, are:
(i) diamines such as hydrazine, 1,2-ethylene diamine, 1,3-propylene diamine 1,4-butylene diamine, 1,2- and 1,4-trans-cyclohexylene diamine, 1,6-hexylene diamine, and oxylic, succinic or adipic dihydrazide;
(ii) di-isocyanates such as 1,4-butane-diisocyanate and 1,6-hexane-diisocyanate, the methyl or ethyl ester of D- or L-lysine diisocyanate;
(iii) dicarboxylic acids such as oxalic acid, succinic acid, glutaric acid, adipic acid, trans 1,2- or trans 1,4-cyclohexylene dicarboxylic acid; and
(iv) di-esters such as diethyloxalate and diethyloxalate;
and according to (IV-A) with c is 0:
(v) carbonyl compounds such as carbonyl-diimidazole, di-4-nitrophenyl-carbonate, diphenylcarbonate.

Reactive compounds that can be prepared synthetically, according to (IV-A) with c is 1 and a is 0, are for example:
(i) diactivated diamines (these are in fact di-urethane or di-urea derivatives, as both amine groups are activated with a carbonyl-LG moiety, with LG being a leaving group; this is analogous to the activated alcohols that have been shown above);
(ii) diactivated dicarboxylic acids (these are in fact diesters or diamides as the carboxylic acids are modified with a leaving group; diactivated dicarboxylic acids have the general structure R—CO-LG, with R being the residue of the carboxylic acid, and LG being the leaving group);
according to (IV-A) with c is 1 and a is 1 or 2,
(iii) diamines in which the linker between the two amine reactive groups contains one or two hydrogens bonding groups HBG, where these can be one amide, one urea, one amide and one urea, two amides or two ureas (less preferably two ureas);
(iv) dicarboxylic acids (or its diactivated derivatives) in which the linker between the two carboxylic acids (or the two activated carboxylic acids) contains one or two hydrogens bonding groups HBG, where these can be one amide, one urea, one amide and one urea, two amides or two ureas (less preferably two ureas).

Non limiting specific examples of reactive compounds that can be prepared by organic synthesis are the di-N-hydroxy succinimide activated esters of oxalic, succinic, glutaric and adipic acid, N-hexyl-(3,5-dicarboxylic acid 1-benzamide) or its di-N-hydroxy succinimide activated ester derivative, 2-amino-N-(2-aminoethyl)ethanamide, 6-amino-N-(5-aminopentyl)hexanamide, 1,3-bis(2-aminoethyl)urea, 1,3-bis(3-aminopropyl)urea, 1,3-bis(4-aminobutyl)urea, 1,3-bis(6-aminohexyl)urea, 2,2'-(carbonylbis (azanediyl))diacetic acid, 6,6'-(carbonylbis(azanediyl)) dihexanoic acid, N1,N2-bis(4-aminobutyl)oxalamide, N1,N2-bis(4-aminobutyl)succinamide, N1,N2-bis(4-aminobutyl)adipamide, N,N'-(butane-1,4-diyl)bis(6-aminohexanamide), dimethyl 2,2'-(butane-1,4-diylbis(azanediyl)) bis(2-oxoacetate), diethyl 2,2'-(butane-1,4-diylbis(azanediyl))bis(2-oxoacetate), 2,6-diamino-hexanamide (as derived from L-lysine), acetyl L-aspartic acid, acetyl L-glutamic acid.

Preferred reactive compounds are 1,4-butane-diisocyanate, 1,6-hexane-diisocyanate, 1,4-trans-cyclohexylene diamine, carbonyl-diimidazole, diphenylcarbonates, N-hexyl-(3,5-dicarboxylic acid 1-benzamide), 2-amino-N-(2-aminoethyl)ethanamide, 6-amino-N-(5-aminopentyl) hexanamide, 1,3-bis(3-aminopropyl)urea, 1,3-bis(4-aminobutyl)urea, 1,3-bis(6-aminohexyl)urea, N1,N2-bis(4-aminobutyl)adipamide and N,N'-(butane-1,4-diyl)bis(6-aminohexanamide), more preferred are 1,4-butanediisocyanate, 1,6-hexane-diisocyanate, 1,4-trans-cyclohexylene diamine, diphenylcarbonates, N-hexyl-(3,5-dicarboxylic acid 1-benzamide), 6-amino-N-(5-aminopentyl)hexanamide, 1,3-bis(4-aminobutyl)urea, 1,3-bis(6-aminohexyl)urea, N1,N2-bis(4-aminobutyl) adipamide, and N,N'-(butane-1,4-diyl)bis(6-aminohexanamide), most preferred are 1,4-butane-diisocyanate, 1,6-hexane-diisocyanate, 1,4-trans-cyclohexylene diamine, 1,3-bis(4-aminobutyl)urea, 1,3-bis(6-aminohexyl)urea, and N,N'-(butane-1,4-diyl)bis(6-aminohexanamide).

The reactive compounds are purified, or obtained in high purity, and the purity of the of reactive compound is preferably higher than about 90%, more preferably higher than about 95%.

The Chain Extension Polymerization Reaction

Finally, the two reactants, i.e. (i) the prepolymer with the two reactive end groups according to (III-A) or (III-B) and (ii) the reactive compound according to (IV-A) or (IV-B) is polymerized in a chain extension reaction.

Here, briefly, some examples are given of chain extension polymerization reactions that can be carried out to prepare the $[AB]_n$ materials of this invention.

Prepolymer diazides can be used to polymerize with the reactive acetylene compounds according to the Cu-catalyzed 'click' reaction which is applied here. To be used solvents for 'click' reaction have been reported in literature, and usually involve the use of polar solvents. The Cu-catalyst needs to be removed after reaction, and can for example be removed by using a Cu-scavenger, e.g. a ligand capable of binding effectively to copper.

Prepolymer diols can be used in polycondensations with reactive compounds that already have 2, 3 or 4 HBGs in their structure. These type of reaction are usually carried out in the melt at higher reaction temperatures, applying vacuum to remove volatiles and to drive the reaction to a high conversion.

Prepolymers with activated alcohols can be reacted with diamines that contain amide or urea HBGs to prepare $[AB]_n$ materials with e.g. bis-urethane-mono-amide, bis-urethane-bisamide, or bis-urethane-urea HBUs.

Prepolymer diamines are particularly versatile as they can e.g. be used to react
(i) with di-isocyanates to prepare $[AB]_n$ materials with bisurea HBUs;
(ii) with dicarboxylic acids or diactivated dicarboxylic acids to prepare $[AB]_n$ materials with bisamide HBUs. In the latter case, if the dicarboxylic acid (or the diactivated dicarboxylic acid) reactive compound already has amide or urea HBGs in its structure, $[AB]_n$ materials with e.g. mono-urea-bisamide, or triamide, or tetra-amide HBUs can be prepared. Likewise, if the prepolymer diamine already contains urethane of amide HBGs that are designed to end up in the HBU (see formula (III-B)), $[AB]_n$ materials with e.g. bis-urethane-mono-urea, bis-urethane-bisamide, mono-urea-bisamide, or tetra-amide HBUs can be prepared.

Prepolymer dicarboxylic acids are also versatile as they can be reacted with diamine reactive compounds, where these compounds may already have amide or urea HBGs in their structure. This will result in $[AB]_n$ materials e.g. with bisamide HBUs, or mono-urea-bisamide HBUs, or tri-amide HBUs.

Generally, the polymerization reactions may be executed in the bulk, so in the melt, or in solution. In the melt, the reaction temperature will be higher than about 120° C., more preferably higher than about 150° C., but the highest reaction temperature used in the polymerization procedure is lower than about 250° C., preferably lower than about 210° C., most preferably lower than about 185° C. Preferably, however, the chain extension polymerization is conducted in solution, using mild reaction conditions. In solution, the reaction temperatures preferably is lower than about 150° C., more preferably lower than about 100° C., even more preferably lower than about 75° C., and most preferably lower than about 50° C. As solvents, any organic solvent may be employed, such as chloroform, THF, dioxane, DMSO, NMP, dimethylacetate. Protic solvents such as alcohols and water are generally less preferred (except in the Huisgen Cu-catalysed 'click' type of reactions), but these solvents may be used as co-solvent at the end of the polymerization, or as an aid in the work-up.

Reagents or catalysts may be used in the chain extension polymerization reaction, and non-limiting examples are bases such as triethylamine, diisopropylethylamine, DBU, DMAP, salt catalysts such as pyridinium-p-toluene sulfonic acid, Lewis acid (metal) catalysts such as stannous catalysts, Cu-click type reaction catalysts, antioxidants, transesterification catalysts, activating agents that are well known from amide coupling chemistry such as dicyclohexylcarbodiimide (DCC), HATU, HBTU, HSTU, PyBOP and BOP.

The chain extension polymerization reaction is carried out such that the molecular weight of the $[AB]_n$ product is as high as possible. For this purpose the two reactants should preferably be molten or dissolved at the used reaction temperature and conditions, and stirring or mixing of the reaction mixture should be applied. Furthermore, the molar ratio in which the two bifunctional reactants are used is close to 1:1. A molar excess of one of the reactants may be used, but preferably this excess is less than about 10%, most preferably less than about 5%.

The concentration at which the polymerization is carried out may vary. In melt polymerizations, the solid weight content of the reaction mixture is 100 w/v % or close to 100 w/v %, as only the two reactants make up the reaction mixture, and possibly a minor amount of reagents and catalysts. For reactions in solutions, the solid weight content may be between about 1 w/v % and about 80 w/v %, preferably it is between about 3 w/v % and about 50 w/v %, more preferably it is between about 5 w/v % and about 25 w/v %. These percentages are therefore based on the cumulative weight of the reactants and the volume of the total reaction mixture (solution or melt).

In the embodiment where specific end group residues (EGRs) are deliberately introduced into the $[AB]_n$ polymer by an end capping reaction, the building block that is used to attach the EGRs onto the $[AB]_n$ polymer should have a reactive groups that is complementary to those used in the polymerization chain reaction, so it must be FG or FG*. Preferably, the building block has a FG* reactive group so it will react with the prepolymer with reactive groups FG in (III). The EGR building block is monofunctional, i.e. it has one complementary reactive group FG or FG*. Deliberately end capped EGRs may be residues that for example are highly fluorinated, that bear peptide functionalities, or that are dyes. Use of deliberately used EGR building blocks for end capping, are not preferred according to the invention.

Work up of the reaction melt or solution reaction mixture may be done using any method or combinations of methods that are known in the art. Use of precipitations and extractions, or a combination thereof, is preferred.

Prepolymer Building Blocks and Polymer Materials with Carboxylic Acid End Groups Furthermore, a simple synthetic route was surprisingly found to prepare prepolymers with carboxylic acid end groups, where these specific prepolymer diacids are very well suited to acquire the above mentioned strictly segmented thermoplastic elastomers $[AB]_n$. Particularly, polycarbonate diols, polyester diols or poly(carbonate-ester) copolymer, which may be tailor made or commercially available, can be converted to their corresponding prepolymer dicarboxylic acids in a single mild reaction step. Of course, the presented prepolymer diacids may be useful for a wide range of purposes and applications (e.g. as polymer surfactants, for biomaterial nano- and microparticles). The approach may also be used for non-biodegradable prepolymer alcohols, and the product may then be used for other applications as well (e.g. as polymer surfactants for coating dispersions). Particularly, it was found that prepolymers with primary alcohol end groups, and with main chains that can be of various chemical natures, can be oxidized and converted to prepolymers with carboxylic acid end groups ('prepolymer acids'). The mild conditions used for this conversion involve the use of an organic and stable nitroxyl radical (e.g. TEMPO, 2,2,6,6-tetramethyl-1-piperidinyloxyl), mostly in catalytic amounts, and a simple and easy to handle primary oxidizing agent, such as for example metachloroperoxybenzoic acid (m-CPBA), sodium hypochlorite, sodium bromite, N-chlorosuccinimidine, trichloroisocyanuric acid or [bis(acetoxy)-iodo]benzene (BAIB). Accordingly, toxic heavy metal oxidizing agents, such as chromium salts, are avoided.

The above mentioned oxidation conditions have been used previously already and have mostly been applied to convert small molecule alcohols to small molecule aldehydes, ketones or acids [e.g. Anelli, P. L. et al., J. Org. Chem. 52, 5259, 1987]. Several reports exist that describe the oxidation of synthetic non-biodegradable materials, i.e. polyethylene oxides [Masson, C. et al., J. Pol. Sci. A: Pol. Chem. 39, 4022, 2001 and Araki, J. et al., Macromolecules 38, 7524, 2005] and silicon based polymers [WO 2005/103060] have been reported on, while molecularly ill-defined natural products such as cellulose [Bragd, P. L. et al., Top. Catal. 27, 49, 2004] have also been oxidized.

Surprisingly, however, it was found that polyester primary alcohols and polycarbonate primary alcohols, i.e. prepolymers having a multitude of labile ester and/or carbonate groups in their constitution, can conveniently be converted to their prepolymer carboxylic acid derivatives without significantly affecting, degrading or scissing the polyester or polycarbonate main chain, despite the presence of the multitude of labile groups. Products can be acquired with a high molecular integrity and definition, as virtually all alcohol end groups are converted to carboxylic acid groups.

Alternatively, polyester prepolymers with carboxylic acid end groups are accessible by polycondensation of dicarboxylic acids with diols, using an excess of dicarboxylic acid and applying vacuum to remove the excess of dicarboxylic acid. However, such polyester materials are not routinely prepared or available, as polyester prepolymers with alcohol end groups are routinely targeted (with the diols being used in excess and removed by vacuum, and with the more conveniently applicable dicarboxylic esters being used instead of dicarboxylic acids). Furthermore, polyester prepolymers can also be prepared by ring opening polymerization (ROP) of cyclic ester monomers (e.g. caprolactones, lactides, glycolides or combinations of these monomers). ROP is a simple polymerization procedure that is routinely, if not exclusively, executed using an alcohol initiator (typically a diol), and it therefore results in polyester prepolymer products with alcohol end groups. ROP can not be adapted easily, if at all, to reliably acquire polyester prepolymers with carboxylic acid end groups. Also, the products then acquired may lack molecular definition, as a relative high percentage of the end groups may in fact not be carboxylic acid end groups, but alcohol or other type of end groups.

Polycarbonate prepolymers with carboxylic acid end groups are not routinely available, as polycarbonate prepolymer syntheses always result in products with alcohol (—OH) and/or alkyl carbonate (e.g. R—O—CO—OMe end groups) due to their synthesis by ROP of cyclic carbonates using alcohol initiators, or by polycondensations of diols with phosgene or phosgene derivatives such as dimethyl carbonate or diethyl carbonate.

Polymers with alcohol end groups can be converted with cyclic anhydrides to arrive at polymers with carboxylic acid end groups, but applying this method will also introduce ester groups into the polymer.

According to the above, the preparation of polyesters, polycarbonates or poly(ester-carbonate)s with carboxylic acid end groups from their readily available alcohol functionalized precursors, as performed in a single and mild oxidation step, constitutes a particularly valuable method to acquire such carboxylic acid functionalized polyester, polycarbonate or poly(ester-carbonate) materials. The acquired materials may indeed be used 'as such' as materials, for example as (biodegradable) surfactants, as (bio)materials to prepare nanometer or micrometer sized objects, as drug delivery vehicles, etc., or they may be used as building blocks for further chemical modification and manipulation. With respect to the latter, the introduced prepolymers with carboxylic acid end groups are particularly suitable to synthesize $[AB]_n$ strictly segmented thermoplastic elastomers.

A general reaction procedure for the synthesis of prepolymers with carboxylic acid end groups is as follows: the prepolymer with primary alcohol end groups, for example and preferably a prepolymer diol, is dissolved in dichloromethane (or another organic solvent, e.g. ethyl acetate) together with TEMPO (or 4-MeOTEMPO), that is preferably being used in catalytic amounts (about 1 to about 10 mol % relative to the amount of alcohol groups. The mixture is kept under an argon atmosphere. Optionally, a phase-transfer catalyst, e.g. Aliquat 336 (about 0.05 to about 0.2 molar equivalents), can be added to speed up the reaction to the carboxylic acid. A 1M aqueous solution of sodium bicarbonate (about 10 to about 20 molar eq. relative to the polymer end groups), optionally and preferably charged with sodium bromide (about 0.5 molar eq. relative to the polymer end groups), is subsequently added to the organic phase, which is then stirred vigorously and cooled to about 0° C. An aqueous solution of sodium hypochlorite oxidant (about 13 w/w %, approx. 3.7 M, 20 molar equivalents relative to the polymer end groups) is added slowly to the stirring reaction mixture. The reaction mixture is subsequently allowed to warm to room temperature and stirred for another 90 minutes. The resulting dispersion is again cooled to about 0° C. and acidified with a concentrated hydrochloric acid solution to pH about 1-2. The organic phase is separated and the aqueous phase is extracted with dichloromethane two more times. The combined organic phases are washed with water, dried with a drying agent (sodium sulfate or magnesium sulfate), and evaporated to yield the carboxylic acid terminated polymer as an oil or solid. This product is subsequently triturated with an appropriate non-solvent (e.g.

water, methanol, acetonitrile, diethyl ether, diisopropyl ether, heptane) to wash away and remove possible traces of impurities.

The above oxidation reaction is preferably performed in a two-phase system (e.g. a dichloromethane/water or an ethyl acetate/water system), but reactions in one-phase aqueous systems are also possible. The reaction is usually and preferably performed at moderately basic pH (about 7 to about 10, more preferably about 8 to about 9), where this is the pH of the water phase (in the two-phase system), or of the one-phase aqueous reaction mixture. Reaction conditions can be optimized, however, from moderately acidic to basic conditions. Addition of sodium bromide leads to a marked increase in the reaction speed, through the formation of sodium hypobromite as an intermediate oxidant; therefore, the use of NaBr or other simple bromide salts (e.g. KBr, ammonium bromides) is preferred. The reaction is initially preferably performed at about 0° C., in order to suppress side-reactions, but may also be performed at higher temperatures where temperatures below 50° C. are preferred, and those at ambient or lower temperatures are even more preferred. The excess of the sodium hypochlorite is large, but may be reduced to about 2 molar eq. per alcohol, at the expense of a higher reaction time. The nitroxyl radical is present in catalytic amounts, which may range from as low as about 0.001 molar eq. to about 1 molar eq. per alcohol. In the preferred embodiment, the amount of nitroxyl radical is below about 0.05 molar eq. per alcohol. The reaction may be performed with a suitable phase transfer catalysts, improving the phase transfer of the active oxidizing agent. The phase transfer catalyst may also be omitted, simplifying purification at the cost of reaction speed. Conversion of the end groups is generally about >90% and the degradation of the polymer is below about 20%. However, in the preferred application the conversion of the end groups is about >95% and the degradation of the polymer is below about 10%, or even well below about 5%. Scission of the polymer may take place, but is lower than about 25%, more preferably below about 10%.

By tweaking and optimization of the reaction conditions, the reaction may stop at the aldehyde intermediate state. In this case —$CH_2OH$ alcohol end groups are converted to —COH aldehyde end groups. Accordingly, aldehyde functionalized polymer products can be attained. Aldehyde functionalized polymers may be useful as a platform for further modifications, as aldehydes are functional groups with a wide variety of possibilities for reaction.

By using secondary alcohol functionalized prepolymer substrates, ketone functionalized polymer products may be attained. Ketone functionalized polymers may also be useful as a platform for further modifications, as also ketones are functional groups with a wide variety of possibilities for reaction.

The above described reaction procedure can be used for prepolymer mono-alcohol, diol, triol, tetra-ol, oligo-ol or multi-ol substrates to provide mono-, di-, tri-, tetra-, oligo- and multi-carboxylic acid terminated polymers that can be used as a platform for further modification, or that can be used as products as such. The alcohols need to be primary alcohols (—$CH_2OH$ type of alcohols), so that conversion from —$CH_2OH$ groups to —COOH groups can take place. Accordingly, prepolymers with primary alcohols are preferred over prepolymers with secondary alcohol groups (the latter will yield polymers with ketone functionalities).

Prepolymers with (on average) one, two, three or four alcohol groups are preferred as substrates. More preferred are prepolymers with (on average) two or three alcohol groups. Even more preferred are prepolymers with (on average) two alcohol groups. Most preferred are telechelic prepolymers, so prepolymers with two alcohol groups, one at each of the two ends of the polymer chain. Then, the functionality level may be somewhat lower then about 2.0, so levels between about 1.75 and about 2.0 can be accepted, but levels between about 1.9 and about 2.0 are preferred, and levels between about 1.95 and about 2.0 are most preferred.

The oxidative method can be applied to prepolymer alcohols having a variety of molecular architectures, and can therefore be used for linear polymers, star polymers (i.e. polymers with one central branching point so that a material with multiple end groups is created), branched polymers (i.e. polymers with more branching points), hyperbranched polymers (i.e. polymers with multiple branching points, such as the HYBRANE polyester-amide polyols as marketed by DSM; the Boltorn polyester polyols as marketed by Perstorp; the glycidol/epoxide based polyether polyglycerols as introduced by Haag and Frey, see Adv. Mater. 12, 235, 2000), or dendrimers (e.g. polyglycerol dendrimers). For all these architectures, homo-polymers, random-co-polymers and block-co-polymers (e.g. diblock or triblock co-polymers) may be used; preferred are homo-polymers or random copolymers. Preferred architectures are linear polymers (homo-polymers, random-copolymers or block-copolymers), star polymers and hyperbranched polymers. More preferred are linear polymers and hyperbranched polymers. Even more preferred are linear polymers. Most preferred are linear homo-polymers or linear random-co-polymers, where preferably these are then telechelic.

The prepolymer alcohols may contain alkylene, arylene, alkylarylene and arylalkylene groups, or combinations thereof. Herein, the alkyl and alkylene groups may be linear, branched and cyclic, or may be combinations thereof, where the linear groups may also be of mixed lengths, the branched groups may be of mixed (differently branched) types, and the cyclic groups may be of mixed sizes. Preferred are prepolymers with alkylene groups and prepolymers with a combination of alkylene groups and arylene, alkylarylene and/or arylalkylene groups. Most preferred are alkylene (or all-aliphatic) polymers, wherein all alkylene groups are saturated. Herein, the alkylene groups may be linear, branched and cyclic, or may be combinations thereof. Preferred are alkylene groups that are linear or branched or that are a combinations of these; most preferred are linear alkylene groups.

The oxidation methodology can be used for prepolymer alcohols of various chemical natures. For example, the method can be applied to polyethers (such as e.g. poly-n-trimethyleneoxides, poly-n-tetramethyleneoxides (or poly-THF), poly-olefines (such as polyethylenes, polypropylenes, poly(ethylene-co-butylene)s, hydrogenated polybutadienes), polyvinyl polymers (such as poly(meth)acrylates, poly (meth)acrylamides, polystyrenes, polyvinylacetates), polyfluorinated polymers (such as fluoropolyethers such as the Fomblin series of perfluoropolyethers), polyesters, polycarbonates and poly(carbonate-ester)s. The method is preferred to be used for poly-n-trimethyleneoxides, poly-n-tetramethyleneoxides, polyesters, polycarbonates and copolymers thereof, even more preferred are polycarbonates and poly (carbonate-ester)s Most preferred are polycarbonates.

The (pre)polymer alcohol substrates may be of various molecular weights. If the materials are going to be used as building blocks for subsequent chemical reactions and manipulations, these molecular weights are preferably between about 100 and about 100.000 Dalton, more preferably between about 300 to about 25.000 Dalton, even more preferably between about 600 and about 10.000, and most preferably between about 1.300 and about 5.000 Dalton. If the materials are going to be used as materials, 'as such', these molecular weights are preferably between about 100 and about 250.000 Dalton, more preferably between about 500 and about 100.000 Dalton, even more preferably between about 1.000 and about 80.000, even more preferably between about 2.000 and about 50.000 Dalton, and most preferably between about 3.000 and about 25.000 Dalton.

The most preferred pre-polymer substrates for the oxidation reaction are prepolymer diols, and are polycarbonates, polyesters and copolymers thereof, of the general form as shown in (III-A) with FG representing an alcohol group, and are preferably of the following telechelic forms, according to (VIII-A), (VIII-B), (VIII-C), (VIII-D) and (VIII-E):

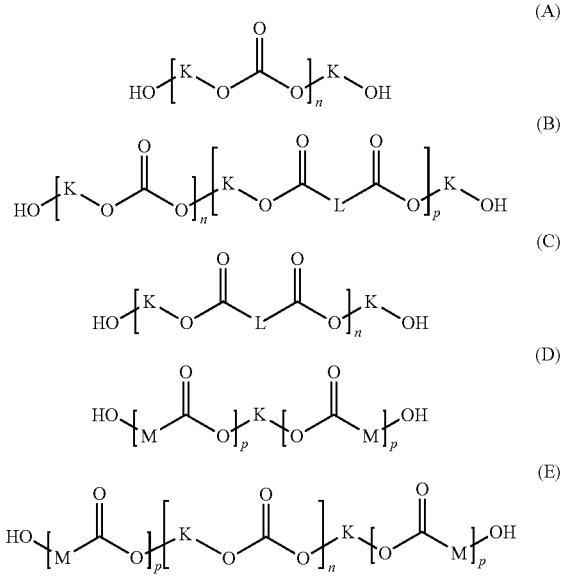

wherein:
K is a $C_1$-$C_{36}$ alkylene group, a $C_6$-$C_{24}$ arylene group, a $C_7$-$C_{24}$ alkarylene group or a $C_7$-$C_{24}$ arylalkylene group;
L is a $C_1$-$C_{36}$ alkylene group, a $C_6$-$C_{24}$ arylene group, a $C_7$-$C_{24}$ alkarylene group or a $C_7$-$C_{24}$ arylalkylene group or L is absent;
M is a $C_1$-$C_{36}$ alkylene group, a $C_6$-$C_{24}$ arylene group, a $C_7$-$C_{24}$ alkarylene group or a $C_7$-$C_{24}$ arylalkylene group or is absent;
n and p are independently 0-500;
provided that:
(a) when n is 0, then p is independently 1-500;
(b) when p is 0, then n is independently 1-500;
K, L and M can be independently selected along the polymer chain; and
the n and p units can be sequenced in any sequence along the polymer chain.

In (VIII-A), (VIII-B), (VIII-C) and (VIII-D) and (VIII-E), the end groups are preferably primary alcohol end groups.

In (VIII-A), (VIII-B), (VIII-C) and (VIII-D), (VIII-E) K is preferably selected from linear, branched or cyclic $C_3$-$C_{13}$ alkylenes, optionally, but not preferably containing 1-3 heteroatoms from the groups of N, O and S, more preferably K is selected from linear or branched $C_3$-$C_{13}$ alkylenes, most preferably from $C_4$-$C_{10}$ linear alkylenes.

In one embodiment of the invention, K is selected from two different K spacers for (VIII-A), (VIII-B) and (VIII-C) and (VIII-E).

In another embodiment of the invention, all K spacers are the same for (VIII-A), (VIII-B) and (VIII-C) and (VIII-E).

In (VIII-B) and (VIII-C) spacer L is selected from a radical and linear, branched or cyclic $C_1$-$C_{16}$ alkylenes, optionally, but not preferably containing 1-3 heteroatoms from the groups of N, O and S, more preferably L is selected from linear or branched $C_2$-$C_{12}$ alkylenes, most preferably from $C_2$-$C_{10}$ linear alkylenes.

In one embodiment of the invention, L is selected from two different L spacers for (VIII-B) and (VIII-C).

In another embodiment of the invention, all L spacers are the same for (VIII-B) or (VIII-C).

In (VIII-D) and (VIII-E) M is preferably selected from linear, branched or cyclic $C_1$-$C_{12}$ alkylenes, optionally, but not preferably containing 1-3 heteroatoms from the groups of N, O and S, more preferably M is selected from linear or branched $C_1$-$C_{11}$ alkylenes, most preferably from $C_1$-$C_5$ linear or branched alkylenes.

In one embodiment of the invention, M is selected from two different M spacers for (VIII-D) and (VIII-E).

In another embodiment of the invention, all M spacers are the same for (VIII-D) and (VIII-E).

Applications of polymers with carboxylic acid end-groups include but are not limited to: building blocks for thermoplastic elastomers, buffering systems, surfactants or emulsifiers, preparation of carboxylic acid functionalized surfaces or nanoparticles, interaction with positively charges surfaces, such as amine or ammonium functionalized surfaces, as components for layer-by-layer deposition of polyelectrolytes.

Applications of polymers with aldehyde end-groups include but are not limited to: scavengers for e.g. amines, immobilization of amine-functionalized molecules, e.g. on surfaces or particles, and polymers with secondary amine functions in the main chain. Polymers with ketone end-groups have similar applications as those with aldehyde end-groups.

EXAMPLES

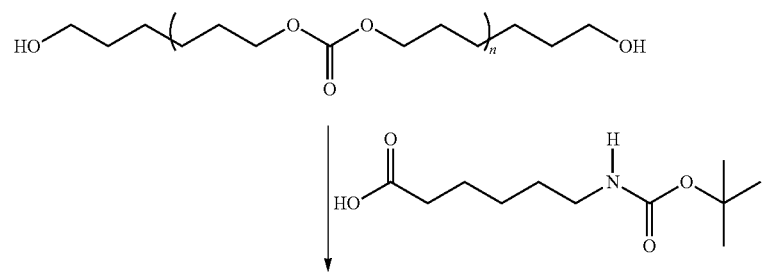

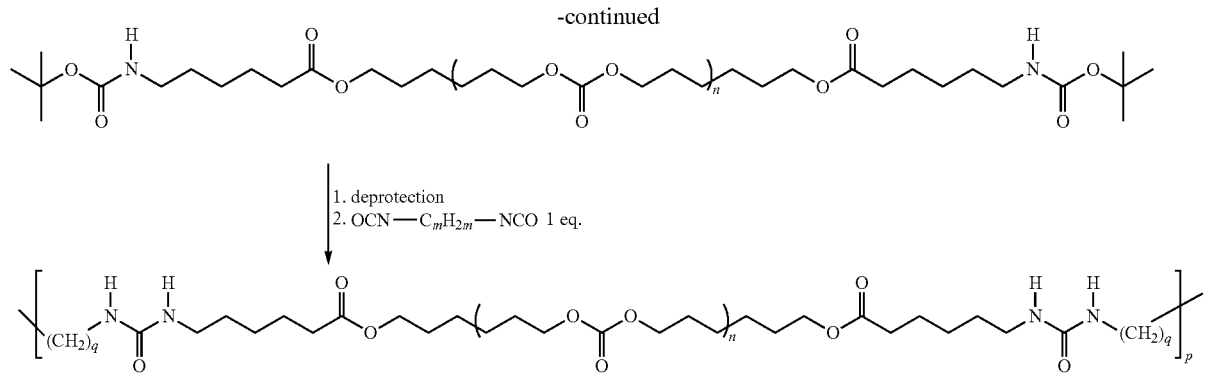

Synthesis Scheme for Examples 1 and 2. Example 1 (q=2, m=4), and Example 2 (q=3, m=6). Starting Material (PHC2000-Diol Prepolymer).

Example 1

Preparation of the poly-hexylene carbonate di-BOC prepolymer. Polyhexylene carbonate diol, PHC2000-diol (39.2 g, 19.6 mmol) was dissolved in chloroform (50 ml) under argon. DPTS (4-(dimethylamino)-pyridinium-4-toluene sulfonate) (0.277 g, 0.981 mmol) and BOC-6-aminohexanoic acid (11.33 g, 48.50 mmol) were added. The mixture was cooled in an ice bath and diisopropylcarbodiimide (7.7 ml, 50 mmol) was added. The mixture was stirred overnight at room temperature. Toluene (100 ml) and water (2 ml) were added and the mixture was filtered after stirring to give a residue and a filtrate. The residue was washed with toluene and the combined filtrates were evaporated, subsequently mixed in toluene and filtered to give a residue and a filtrate. The residue was washed with toluene and the filtrates were evaporated, mixed in toluene and filtered to give a little white residue and a filtrate. The residue was washed with toluene and the combined filtrates were evaporated to yield a beige syrup which solidified into a solid. This was heated to 70° C. with methanol (140 ml) and water (40 ml) was added to give a white precipitate, which was filtered to give a residue and a filtrate. The residue was mixed with methanol (140 ml) and water (40 ml) and stirred to get a suspension, which was filtered to give a residue and a filtrate. The residue was washed with a water-methanol mixture (40 and 140 ml). Yield after drying: 40.1 g. The filtrates were combined and evaporated to yield a residue, which was washed and decanted with a water-methanol mixture (10 ml and 30 ml) to give another residue, 1.85 g. Total yield polymer: 41.95 g, 88%. $^1$H-NMR, $^{13}$C and IR analysis were in accordance with the structure.

Preparation of the poly-hexylene carbonate di-ammonium prepolymer. The poly-hexylene carbonate di-BOC prepolymer was dissolved in chloroform (45 ml) under argon, which was placed in an ice-bath. Trifluoroacetic acid (45 ml) was added and the mixture was stirred for 2 hours. The solvents were removed under vacuum yielding an oil. Diethyl ether (250 ml) was added to give a suspension. The ether phase was decanted and placed in a refrigerator to yield more solid. The solids were combined and washed with diethyl ether (2 times 200 ml) giving a waxy residue (40.2 g/96%) which was the product. $^1$H-NMR, $^{13}$C and IR analysis were in accordance with the structure.

Example 1, the chain extension polymerization reaction. The poly-hexylene carbonate di-ammonium prepolymer (10.07 g, 3.45 mmol) was dissolved in chloroform (40 ml) under argon. 1,4-Diisocyanatobutane (0.496 g, 3.43 mmol) mixed with chloroform (4 ml) and then DIPEA (2.4 ml, 14 mmol) were added to the solution. The reaction mixture was stirred for 5.5 h after which chloroform (40 ml) was added. Then, the mixture was poured into methanol (0.9 L) inducing the precipitation of polymer. The methanol phase was decanted, the polymer was squeezed and cut into pieces, which were mixed with methanol (250 ml). The methanol phase was decanted, the polymer mixed with methanol (250 ml). The methanol phase was decanted and the polymer was dried in a vacuum oven. Yield: a white, tough polymer: 9.65 g, 91%. $^1$H-NMR, $^{13}$C NMR and IR analysis were in accordance with the structure. SEC (DMF with 10 mM LiBr, 50° C., RI): $M_n$=47 kDa, PDI=2.1.

Example 2

Example 2, the chain extension polymerization reaction. The poly-hexylene carbonate di-ammonium polymer, see Example 1 for its preparation (10.02 g, 3.43 mmol) was dissolved in chloroform (40 ml) under argon. 1,6-Diisocyanatohexane (0.593 g, 3.49 mmol) mixed with chloroform (2 ml) and then DIPEA (2.2 ml, 13 mmol) were added to the solution. The reaction mixture was mechanically stirred overnight after which chloroform (20 ml) and methanol (10 ml) were added. Then, the mixture was poured into stirred methanol (1 L) inducing the precipitation of polymer. The methanol phase was decanted, the polymer was squeezed, soaked in methanol (50 ml), squeezed again and cut into pieces. The polymer was mixed with methanol (100 ml) for 1.5 h after which the methanol phase was decanted. This was repeated two times, after which the polymer was dried in a vacuum oven. Yield white, tough polymer: 9.46 g, 89%. $^1$H-NMR, $^{13}$C NMR and IR analysis were in accordance with the structure. SEC (DMF with 10 mM LiBr, 50° C., RI): $M_n$=28 kDa, PDI=2.3.

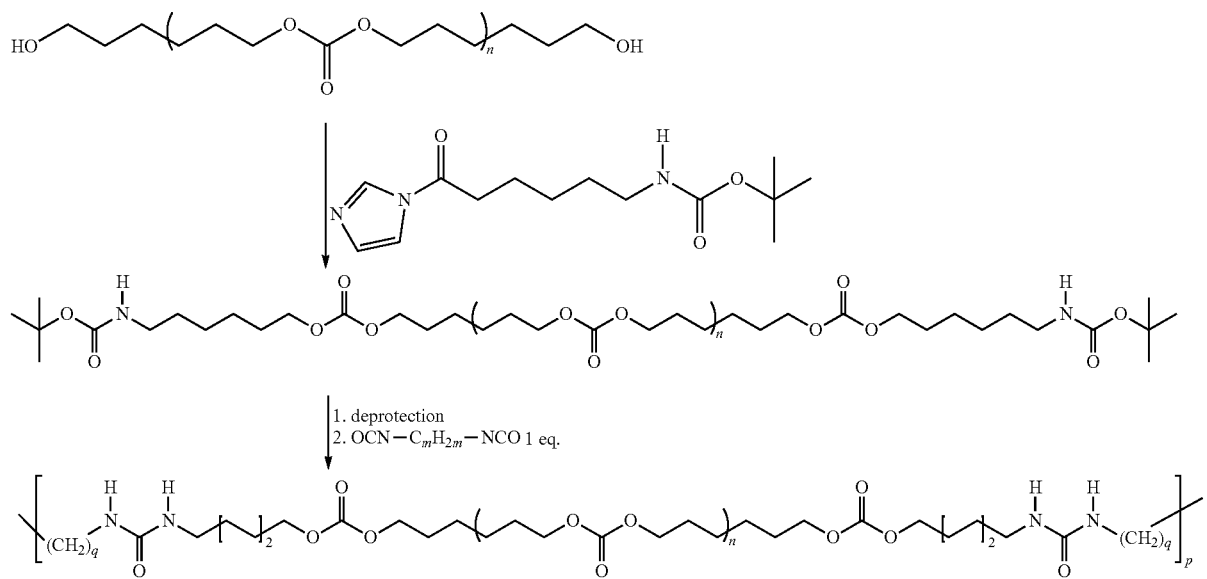

Synthesis Scheme for Examples 3 and 4. Example 3 (q=2, m=4), and Example 4 (q 2, m=4). Starting Material PHC2000-Diol Prepolymer (Example 3), and PHC1000-Diol Prepolymer (Example 4).

Example 3

BOC protected amine-terminated polyhexylenecarbonate. Boc-protected 6-aminohexanol was activated with carbonyl diimidazole (CDI) to the corresponding imidazolide. This imidazolide (19 g, 61 mmol) was added to dried poly (hexamethylene carbonate) diol, PHC2000-diol ($M_n$=2000, 50 g, 25 mmol) and DBU (0.2 g, 1.3 mmol) in dioxane (40 mL). The resulting mixture was stirred at 80° C. for 16 hours. The reaction mixture was subsequently quenched with amine-terminated silica. The resulting dispersion was filtered and concentrated to afford crude product as a thick oil. This material was stirred twice with n-heptane (250 mL) and subsequently precipitated from iPr$_2$O (100 mL) at −20° C. to afford the BOC protected prepolymer as a white solid. This material was dried in vacuo and dissolved in 150 mL chloroform, charged with flash silica and MgSO4, stirred and filtered (2x) to remove the last impurities. The product was collected as a white solid by evaporation of the chloroform and precipitation with n-pentane. After drying in vacuo this afforded 39.9 gram (64%) of the BOC protected amine-terminated polyhexylenecarbonate. IR and $^1$H-NMR were in accordance with the proposed structure.

Poly(hexamethylene carbonate) diamine prepolymer. The BOC protected amine-terminated polyhexylenecarbonate (26.2 g) was deprotected with TFA/DCM (80 mL 1:1) for 90 minutes. The resulting reaction mixture was concentrated and precipitated with diethyl ether, affording 25.2 g. (96%) of the deprotected poly(hexamethylene carbonate) diamine prepolymer. IR and $^1$H-NMR were in accordance with the proposed structure.

Example 3, the chain extension polymerization. Poly(hexamethylene carbonate) diamine prepolymer (11.2 g, 4 mmol) was dissolved in chloroform (50 mL) with butane diisocyante (BDI) (0.58 g, 1.025 eq.) and DiPEA (2.6 mL, 3.7 eq.) and stirred for 16 hours at room temperature. The resulting viscous solution was diluted with 25 mL methanol and 25 ml chloroform and precipitated in 750 mL methanol. The resulting rubbery mass was dried in vacuo to afford 10.5 g of Example 3 product (94%). IR and $^1$H-NMR were in accordance with the proposed structure. SEC (DMF with 10 mM LiBr, 50° C., RI): $M_n$=39.2, D=1.8.

Example 4

As Example 3, but instead of PHC2000-diol, PHC1000 diol was used as the starting prepolymer diol. IR and $^1$H-NMR were in accordance with the proposed structure. SEC (DMF with 10 mM LiBr, 50° C., RI): $M_n$=19.4 kg/mol, D=1.7.

Comparative Example 5

Polyhexyl (PHC) carbonate urethane urea (PCUU) polymer, as based on PHC2000-diol, and as according to Y. Hong et al., Biomaterials 31, 4249-4258, 2010, was prepared according to the reported procedure in this article.

Example 6: Thermal and Mechanical Properties

The following tables show the superior thermal and mechanical properties of the polymers according to this invention when compared to the state of the art.

TABLE 1

Thermal transitions of the Polymers of the Examples

| Polymer No | $T_g$ (° C.) | $T_{m1}$ (° C.) | $T_{m2}$ (° C.) |
|---|---|---|---|
| 1 | −39 | 3 | 131 |
| 2 | −37 | 4 | 116 |
| 3 | −38 | 4 | 135 |
| 4 | −38 | none | 144 |
| C5 | −37 | 22 | none |

Thermal data were obtained using Differential Scanning calorimetry (DSC) from the melt; so in the second heating run (10° C./min), for $T_m$; and in the third heating run (40° C./min) for $T_g$.

TABLE 2

Mechanical data of the Polymers of the Examples

| Example | $E_{mod}$ (MPa) | Toughness (kJ/kg) | E' @20° C. (MPa) | E' @80° C. (MPa) |
|---|---|---|---|---|
| 1 | 14 | 112 | 18 | 16 |
| 2 | 17 | 85 | n.d. | n.d. |
| 3 | 11 | 191 | 18 | 17 |
| 4 | 73 | 95 | 77 | 59 |
| C5 | 27 | 66 | 52 | 25 |
| C41 | 13.6 | not reported | 28 | 17 |

Tensile testing was performed on dog bones cut from solvent casted films, at ambient temperatures, using an elongation rate of 20 mm/min with a preload of 0.02 N. E' values were obtained from DMTA measurements.

Furthermore, the comparative example C5 gave a T(flow) of 254° C., while the Examples 1, 3 and 4 had T(flow) values of around 132° C., 145° C. and 152° C., respectively.

Example 7: Solubility and Viscosities

The $[AB]_n$ polymers as according to Examples 1, 2 and 4 were dissolved in chloroform/methanol (10 v/v % methanol), at a concentration of 10 (w/v) %, in weight sample per volume of solvent. The solutions were clear, homogeneous and low viscous and dynamic viscosities of 0.21 Pa·s (Example 1), 0.16 Pa·s (Example 3), and 0.11 Pa·s (Example 4) were measured. Free flowing solutions were easily obtained, simply by stirring the material and solvent at room temperature, or by spontaneous dissolution without stirring. The polymer of Example 1 was dissolved by stirring in chloroform/methanol (10 v/v % methanol), at concentrations of 10 (w/v) %, 20 (w/v) %, 30 (w/v) % and 40 (w/v) % giving clear solutions that flowed, albeit more viscous with increasing concentrations.

Comparative Example 8: Lack of Solubility

The material according to Comparative Example 5 could not be dissolved in chloroform/methanol (10 v/v % methanol), at a concentration of 10 (w/v) % as this gave a solid hazy inhomogeneous gel, also after heating and cooling back down to room temperature. At no point a free flowing clear and homogeneous solution was obtained. At a concentration of 1 (w/v) % in the same solvent mixture, a hazy mixture with undissolved species and particles was obtained, also after heating. At no point a free flowing clear homogeneous solution was obtained. In DMSO, DMF and DMAc the material did not dissolve, not even after heating, at the tested concentration of 1 mg/mL; at no point a clear homogeneous solution was obtained.

Prepolymer Precursors as According to the Invention

For these materials, SEC has been performed at RT using THF as eluent and applying RI-detection; the SEC-data are relative to polystyrene standards, and are in kDa (kg/mol).

Example 9: Poly(hexamethylene carbonate) diol 1,6-Hexanediol (10.1 g, 85.5 mmol) was stirred and dried at 110° C. under vacuum for 90 minutes. The resulting material was allowed to cool to 80° C. and charged with dioxane (6 mL) and CDI (12.9 g, 79.6 mmol). The resulting mixture was stirred for 2.5 h at 80° C., at which point NMR showed complete conversion. The solvent was removed by evaporation and the resulting oil was stirred with demineralized water (50 mL), and then with 1:1 MeOH/water (50 mL) to remove imidazole, affording the title material as a fine white powder (11 g, 90%). IR and $^1$H-NMR data were in accordance with the proposed structure. $^1$H NMR shows that n (the number of repeating units)=ca. 15.9 ($M_n$=ca. 2.5 kDa). SEC: $M_n$=4.6 kDa; PDI=1.6.

This material can be employed to be reacted with e.g. the imidazolide of 6-azido-hexan-1-ol or the imidazolide of 5-hexyn-1-ol to arrive at azide or alkynyl functional prepolymers, where this can be done in an analogous fashion as shown in Example 3 where an imidazolide is reacted with a poly(hexylene carbonate) diol. The resulting azide or alkynyl prepolymers can be chain extended with e.g. the reactive compounds shown in Examples 26F and 26G, respectively, using copper catalyzed 'click' type of chemistry.

Example 10: Poly(hexamethylene-random-co-pentamethylene carbonate) diol

A mixture of 1,6-hexanediol (9.8 g, 83 mmol) and 1,5-pentanediol (8.5 g, 82 mmol) was heated to 100° C. and dried under vacuum for 70 minutes. The resulting oil was allowed to cool to 90° C., diluted with 25 mL dioxane. CDI (25 g, 154 mmol) was added to the reaction mixture, which was stirred at 90° C. for an additional 16 hours. The dioxane was subsequently removed by distillation. The resulting oil was stirred twice with 150 mL water to remove impurities, and dried in vacuum to afford 20.7 grams (92%) of the desired material (yellowish oil). IR and $^1$H-NMR data were in accordance with the proposed structure. $^1$H NMR shows that n=ca. 10 ($M_n$=ca. 1.5 kDa). DSC: $T_g$=−53° C. SEC: $M_n$=2.6 kDa; PDI=1.7.

Example 11: Poly(hexamethylene-random-co-pentamethylene carbonate) diamine

In a similar fashion as shown in Examples 3 and 4, poly(hexylene-random-co-pentylene carbonate) diol (ex Example 10) was converted to an amine-terminated prepolymer. Briefly, N-BOC-protected 6-aminohexan-1-ol was activated with CDI to the corresponding imidazolide, and poly (hexylene-random-co-pentylene carbonate) diol was reacted with an excess of this imidazolide to achieve complete conversion of the alcohol end groups. The mixture was evaporated, dissolved in ethyl acetate, washed with water and brine, and concentrated to give an oil. This oil was stirred in methanol/water (9/1), the supernatant was decanted and the product was dried. After this work up, the N-BOC end groups of the resulting prepolymer were deprotected by stirring in a TFA/DCM solution. The solvents were removed by evaporation, and by co-evaporation with chloroform. Accordingly, poly(hexylene-random-co-pentylene carbonate) diamine prepolymer, as its TFA-salt, was isolated. End group analysis in $^1$H NMR shows an n of ca. 13.9 ($M_n$ of ca. 2.3 kDa).

Example 12: Poly(hexamethylenecarbonate-random-co-ε-caprolactone) diol

A mixture of 1,6-hexanediol (9.5 g, 80 mmol) and ε-caprolactone (2.3 g, 20 mmol) was dried at 80° C. under reduced pressure for 3.5 h. The dried reaction mixture was charged with DBU (0.1 mL) and stirred for another hour at 80° C., after which the full conversion of ε-caprolactone was confirmed. The reaction mixture was subsequently charged with CDI (12.2 g, 75 mmol) and stirred at 80° C. for 16 hours. The reaction mixture was diluted with 250 mL ethyl acetate, extracted with a mixture of 100 mL 2M HCl and 100 mL brine, dried with MgSO$_4$ and evaporated to afford the crude prepolymer diol. This oil was co-evaporated with dichloromethane (or DCM) (2×50 mL), toluene (2×50 mL), DCM (2×50 mL), and subsequently dissolved in toluene and filtered. The resulting turbid oil was co-evaporated with chloroform (3×50 mL) and dried under high vacuum to afford 11.4 g of the desired product as a turbid oil. IR and $^1$H-NMR data were in accordance with the proposed structure. $^1$H NMR shows that n=ca. 11.9 and m=ca. 3.0 ($M_n$=ca. 2.1 kDa), with n and m representing the average repeating units of hexyl carbonate and caprolactone ester, respectively. DSC: $T_g$=−57° C., $T_{m1}$=−21° C., $T_{m2}$=16° C., $T_{m3}$=29° C. SEC: 4.2 kDa; PDI=1.9.

Example 13: Poly(hexamethylenecarbonate-random-co-ε-caprolactone) diamine

In a similar fashion as shown in Example 1, poly(hexamethylenecarbonate-random-co-ε-caprolactone) diol was converted to an amine terminated prepolymer. Briefly, this poly(carbonate-co-ester) diol (ex Example 12; 8.3 g, 3.9 mmol), DPTS (4-(dimethylamino)-pyridinium-4-toluene sulfonate; 0.055 g, 0.20 mmol) and N-BOC-6-amino-hexanoic acid (2.25 g, 9.65 mmol) were dissolved in chloroform (50 mL) under argon. The mixture was cooled in an ice bath and diisopropylcarbodiimide (1.5 mL, 10 mmol) was added. The mixture was stirred overnight. The solvent was evaporated, toluene (100 mL) was added to the residue, and after stirring, the obtained suspension was filtered. The filtrate was concentrated in vacuo and the evaporated residue was stirred and precipitated in water (40 mL) with added methanol (60 mL); after decantation of the supernatant, this precipitation procedure was repeated. Drying gave a white product (9.6 g; 91%). NMR and IR analysis was in accordance with the structure of the N-BOC protected prepolymer. This material was dissolved in chloroform (12 mL) at 0° C., and trifluoroacetic acid (TFA; 12 mL) was added. The mixture was stirred for several hours, and the solvents were removed under vacuum yielding an oil. Stirring in diethyl ether, followed by settling of the product and decantation of the solvents gave the product that was further dried in vacuo. NMR analysis was in accordance with the TFA-salt of the molecular structure.

Example 14: Poly(hexamethylene carbonate) di-imidazolide

In a flask, PHC2000-diol (63.72 g, 31.86 mmol) and CDI (25.0 g, 0.15 mol) were dissolved in THF (70 mL). The suspension was stirred at RT under argon for several hours, until full conversion of the alcohol end groups was assessed (NMR). The mixture was precipitated in chilled water (0.7 L at 4° C.). The solvents were decanted, and the residue was mixed with more water (0.7 L) and was stirred for 0.5 h. This procedure was repeated twice, after which the residue was filtered and washed with water (2 times 0.3 L) and was dried to yield 67.4 g (97%) product. NMR and IR analytical data were in accordance with the given molecular structure.

This material can be employed to be reacted with e.g. with 3-azido-1-propanamine or 4-pentyn-1-amine to arrive at azide or alkynyl functional prepolymers. These prepolymers can then be chain extended with e.g. the reactive compounds shown in Examples 26F and 26G, respectively, using copper catalyzed 'click' type of chemistry.

Example 15: Poly(hexamethylene carbonate) di-(urethane-amine)

Di-imidazolide polymer (ex Example 14; 21.5 g, 9.3 mmol) and mono-N-BOC-diaminobutane (4.5 g, 23.9 mmol) were dissolved in THF (30 mL) at RT under argon. The mixture was stirred overnight after which the mixture was heated at 50° C. under argon for 4 h to force the reaction to completion. The mixture was poured in stirred and chilled water (0.5 L at 4° C.). The solvents were decanted and the residue was stirred in water (2×200 mL) for 2 h after which the solvents were decanted. The residue was filtered, washed with water and dried to yield a white solid product (23.1 g, 97%). NMR and IR analysis was in accordance with the molecular structure. This N-BOC protected prepolymer (21.9 g, 8.73 mmol) was dissolved in chloroform (25 mL) and TFA (25 mL) at 0° C. under argon. The mixture was stirred for 2.5 h, after which the solvents were removed in vacuo, without heating. Diethyl ether (200 mL) was added to the residue, the mixture was stirred for 1 h, and after settling of the mixture, the solvents were decanted; this procedure was repeated. The suspension was filtered and the residue was washed with ether (4×50 mL). The residue was dried yielding a white product (21.5 g, 97%). NMR and IR data were in accordance with the molecular structure.

Example 16: Poly(hexamethylene carbonate) di-(ester glutaryl-acid)

PHC2000 diol ($M_n$=2000 g/mol; 11.2 g) was dried at 100° C. under reduced pressure for 3 hours, allowed to cool to room temperature and dissolved in 20 mL chloroform. The resulting solution was charged with glutaric anhydride (2.35 eq, 1.5 g) and DBU (0.1 mL) and stirred at room temperature for 40 hours under an argon atmosphere. The solution was subsequently charged with an additional portion of glutaric anhydride (0.15 g) and stirred at 50° C. until full conversion was observed (by NMR) of the alcohol end groups to the ester glutaryl acid end groups. The resulting mixture was precipitated in 250 mL diisopropyl ether at −20° C., dissolved in 150 mL toluene, extracted with 2M HCl (2×50 mL) and brine (50 mL), dried with MgSO$_4$ and evaporated to dryness to afford the 9.8 g of the prepolymer di-acid (77%). IR and $^1$H-NMR data were in accordance with the proposed structure. SEC: $M_n$=3.8 kDa; PDI=1.7.

Example 17: Poly(hexyl C36-diacid) diol; a polyester diol

Pripol (a $C_{36}$-dicarboxylic acid product that is prepared by dimerization of unsaturated fatty carboxylic acids followed by hydrogenation and distillation) polymerized with 1,6-hexane diol gives the poly(hexyl $C_{36}$-diacid) polyester diol as a thick oil. MALDI-TOF MS and $^1$H-NMR were in accordance with the proposed structure. $^1$H NMR shows that n=ca. 4.4 ($M_n$=ca. 3.0 kDa). DSC: $T_g$=−56° C., =−33.3 (recrystallization upon heating), $T_m$=−21° C.

Example 18: Poly(hexyl C36-diacid) diamine; a polyester with Two amine End Groups In a similar fashion as shown in Examples 1 and 2, the prepolymer diol as according to Example 17 was converted to an amine terminated prepolymer. In this Example 18, N-BOC-11-amino-undecanoic acid is employed, and not N-BOC-6-aminohexanoic acid. Briefly, N-BOC-11-amino-undecanoic acid (4.0 g, 13.3 mmol) was dissolved in dichloromethane (50 mL) under argon. DMAP (1.6 g, 13.3 mmol), PPTS (pyridinium p-toluenesulfonate; 0.11 g, 0.44 mmol) and DCC (dicyclohexylcarbodiimide; 2.74 g, 13.27 mmol)

were added. The mixture was stirred for 30 minutes and poly(hexyl C36-diacid) diol (ex Example 17; 12.0 g, 4.4 mmol) dissolved in dichloromethane (50 mL) was added. The mixture was stirred overnight. The formed DCU precipitate was removed by filtration, and the filtrate was concentrated under reduced pressure. Heptane (150 mL) was added, the resulting precipitate was filtered off, and heptane was removed under reduced pressure yielding an oil. Yield: (14 g; 95%). NMR and IR analysis were in accordance with the structure. Next, this N-BOC protected prepolymer (1.5 g, 0.46 mmol) was dissolved in dichloromethane (5 mL) and the flask was placed in an ice-bath. TFA (2 mL) was added to the mixture that was kept under argon and that was stirred overnight at RT. The solvents were removed under vacuum yielding an oil. Acetonitrile (15 mL) was added and stirred to give a suspension; after settling of the mixture, the acetonitrile supernatant phase was decanted. This procedure was repeated twice giving an oil (1.34 g/95%). NMR and IR analysis were in accordance with the structure of the deprotected TFA-salt of the amine terminated polyester.
Prepolymer Precursors as Prepared by Oxidation of —OH Endgroups to —COOH Endgroups, as According to the Invention Example 19: Poly(hexylene carbonate) diol to poly(hexylene carbonate) di-carboxylic acid Telechelic poly(hexamethylene carbonate) diol ($M_n$=2.0 kDa; 30 g, 15 mmol) was dissolved in 150 mL dichloromethane. MeO-TEMPO (0.1 g, 0.5 mmol) was added to this DCM solution, as well as a solution of NaBr (0.7 g, 7 mmol) in 200 mL 1M NaHCO$_3$. The resulting two-phase system was stirred vigorously and cooled in an ice bath. Aqueous NaClO (13%; approx. 3.7 M, 60 mL) was added slowly to the reaction mixture, which was allowed to warm to room temperature after addition of the hypochlorite. Stirring was continued for 1 hour, after which $^1$H NMR confirmed full conversion of the alcohol end groups. The reaction mixture was subsequently cooled in an ice-bath and adjusted to pH=1-2 with a concentrated aqueous HCl solution. The organic phase was separated from the aqueous phase, which was subsequently extracted with CHCl$_3$ (2×100 mL). The combined organic phases were washed with water (150 mL), dried with MgSO$_4$, and evaporated to yield the crude product (colorless oil). This oil was stirred vigorously with di-isopropyl ether (iPr$_2$O; 100 mL), after which the product was allowed to settle at −20° C. overnight. The supernatant was removed and the resulting white solid was dried in vacuo to yield 30.8 g (95%) of the desired material. $^1$H-NMR (400 MHz, CDCl$_3$): δ 4.1 (t, n*4H), 2.2 (t, 4H, CH$_2$COOH), 1.2-1.8 (br.m, CH$_2$) ppm. No CH$_2$OH protons were detectable by NMR, confirming full conversion. $^1$H NMR shows that n=ca. 15.4 ($M_n$=ca. 2.4 kDa). SEC: $M_n$=4.7 kDa; PDI=1.8.

Example 20: Poly(hexamethylene carbonate) di-(tetra-fluorophenol active ester)

Telechelic PHC2000 di-acid (8 g, 3.2 mmol), as prepared according to Example 19, was dissolved in DCM (35 mL) with 2,3,5,6-tetrafluorophenol (1.27 g, 7.6 mmol) and DMAP (40 mg). The solution was cooled 0° C., and diisopropylcarbodiimide (DiC; 1.3 mL, 8.1 mmol) was added to the reaction mixture, which was stirred at 0° C. for another 5 minutes, before allowing the mixture to heat to room temperature. After 4 hours, NMR confirmed full conversion of the two carboxylic acid end groups to active ester end groups. The reaction mixture was filtered, evaporated to dryness, stirred with n-pentane and decanted (2×) to afford crude product as a white solid. This solid was dissolved in chloroform, stirred with a mixture of flash silica and MgSO$_4$ to remove impurities, filtered and evaporated to dryness; this procedure was repeated using toluene as the solvent. Evaporation of the solvents and drying in vacuo yielded 7 g (78%) of the prepolymer product. IR and $^1$H-NMR data were in accordance with the proposed molecular structure. $^1$H-NMR showed n=ca. 16.2 ($M_n$=ca. 2.8 kDa).

This material can be employed to be reacted with e.g. with 3-azido-1-propanamine or 4-pentyn-1-amine to arrive at azide or alkynyl functional prepolymers. These prepolymers can then be chain extended with e.g. the reactive compounds shown in Examples 26F and 26G, respectively, using copper catalyzed 'click' type of chemistry.

Example 21: Poly-ε-caprolactone diol to poly-ε-caprolactone di-carboxylic acid

Telechelic poly-ε-caprolactone diol (PCL2000 diol; $M_n$=2.0 kDa; 10.6 g, 5.3 mmol) and MeO-TEMPO (50 mg) in DCM were stirred vigorously with NaBr (0.26 g) in 100 mL 1M NaHCO$_3$ at 0° C. (two-phase system). Aqueous NaOCl (27 mL, approx. 3.7 M) was added slowly, after which the solution was stirred at room temperature for 1 hour. After confirmation of full conversion of the CH$_2$OH alcohol end groups by $^1$H-NMR analysis (no CH$_2$OH detectable), the reaction mixture was acidified with a concentrated HCl solution (pH<2). The organic phase was separated and the water phase extracted with chloroform (2×50 mL). The combined organic phases were washed with water (75 mL), dried with MgSO$_4$, and evaporated to dryness to afford the crude product as a viscous oil. This product was stirred with di-isopropyl ether (75 mL), collected by filtration, and dried at a reduced pressure to afford 9 grams (84%) of a white solid product. IR and $^1$H-NMR data were in accordance with the proposed structure. $^1$H-NMR showed n=ca. 22.3 ($M_n$=ca. 2.9 kDa). SEC: $M_n$=4.5 kDa; PDI=1.4.

Example 22: Poly(hexylene-random-co-pentylene carbonate) diol to poly(hexylene-random-co-pentylene carbonate) di-carboxylic acid Telechelic poly(hexylene-random-co-pentylene carbonate) diol (ex Example 10; 10 g of a batch with an $M_n$ of ca. 2.1 kDa) and MeO-TEMPO (55 mg) were dissolved in DCM. NaBr (0.26 g) in 100 mL 1M NaHCO$_3$ was added, and the two-phase system was stirred vigorously at 0° C. Aqueous NaOCl (28.5 mL, approx. 3.7 M) was added slowly, after which the solution was stirred at room temperature for 2 hours. After confirmation of full conversion of the alcohol end groups to carboxylic acid end groups using $^1$H-NMR, the reaction mixture was acidified with concentrated HCl (pH<2). The mixture was diluted with 50 mL water and 100 mL chloroform, after which the organic phase was separated. The water phase was subsequently extracted with chloroform (2×50 mL). The combined organic phases were washed with water (2×100 mL), brine (100 mL), dried with MgSO$_4$, and evaporated to dryness to afford 9.8 gram (98%) of the product as a viscous oil. IR and $^1$H-NMR were in accordance with the proposed structure. $^1$H-NMR showed n=ca. 15.8 ($M_n$=ca. 2.3 kDa). No CH$_2$OH was detectable by NMR. SEC: $M_n$=3.9 kDa; PDI=1.8.

Examples 23

Telechelic poly(hexyl C$_{36}$-diacid) diol (i.e. the polyester diol from Example 17) and telechelic poly(hexamethylenecarbonate-random-co-ε-caprolactone) diol (i.e. the polycarbonate/ester diol from Example 12) were oxidized in a similar fashion as shown in Example 22 for poly(hexylene-random-co-pentylene carbonate) diol. Full conversion of the alcohol end groups to carboxylic acid end groups was confirmed by ¹H-NMR analysis (no C$\underline{H}_2$OH detectable). Accordingly, telechelic poly(hexyl C36-diacid) di-carboxylic acid and telechelic poly(hexamethylenecarbonate-random-co-ε-caprolactone) di-carboxylic acid were produced. NMR and IR analyses were in accordance with the proposed molecular structures.

Example 24: Poly(tetrahydrofuran) diol to poly(tetrahydrofuran) di-carboxylic acid Telechelic poly-THF2000 ($M_n$=2.0 kDa) was oxidized in a two-phase system in a similar fashion as done for poly(hexylene-random-co-pentylene carbonate) diol (see the oxidation in Example 22). Full conversion of the alcohol end groups to carboxylic acid end groups was confirmed by ¹H-NMR analysis (no C$\underline{H}_2$OH detectable). NMR and IR analyses were in accordance with the proposed molecular structure.

Reactive Compounds as According to the Invention

Examples 25: Diamine or diol Reactive Compound Building Blocks carboxylic acid functionalized polymers (or such polymers where both carboxylic acid end groups have been activated, e.g. to active esters). The amines can be in their free base form or in their salt form. Compounds A and B are derived from L-lysine; A is commercially available, and B can be prepared according to literature procedures. Diamines comprising hydrogen bonding groups have been synthesized employing protective group chemistry. Compound C was prepared by amide coupling of mono-N-BOC protected 1,5-pentyldiamine with N-BOC protected 6-aminohexanoic acid, with subsequent BOC-deprotection using HCl. Bisamide D and bisurea F were synthesized by reacting mono-N-BOC protected 1,4-butyldiamine with di-2,3,5,6-tetrafluorophenyl adipate (using an excess of pyridine base) and 1,4-butanediisocyanate, respectively. Subsequent BOC-deprotection using HCl gave molecules D and F as their HCl-salts. Molecule E was synthesized by reaction of CDI with a high excess of 1,6-diaminohexane, and purification of the diamine product. Finally, bisurea-diol G was prepared by reacting a slight excess of 6-amino-hexan-1-ol with 1,4-butanediisocyanate. Recorded analytical NMR, IR and LC-MS data were in accordance with the proposed structures.

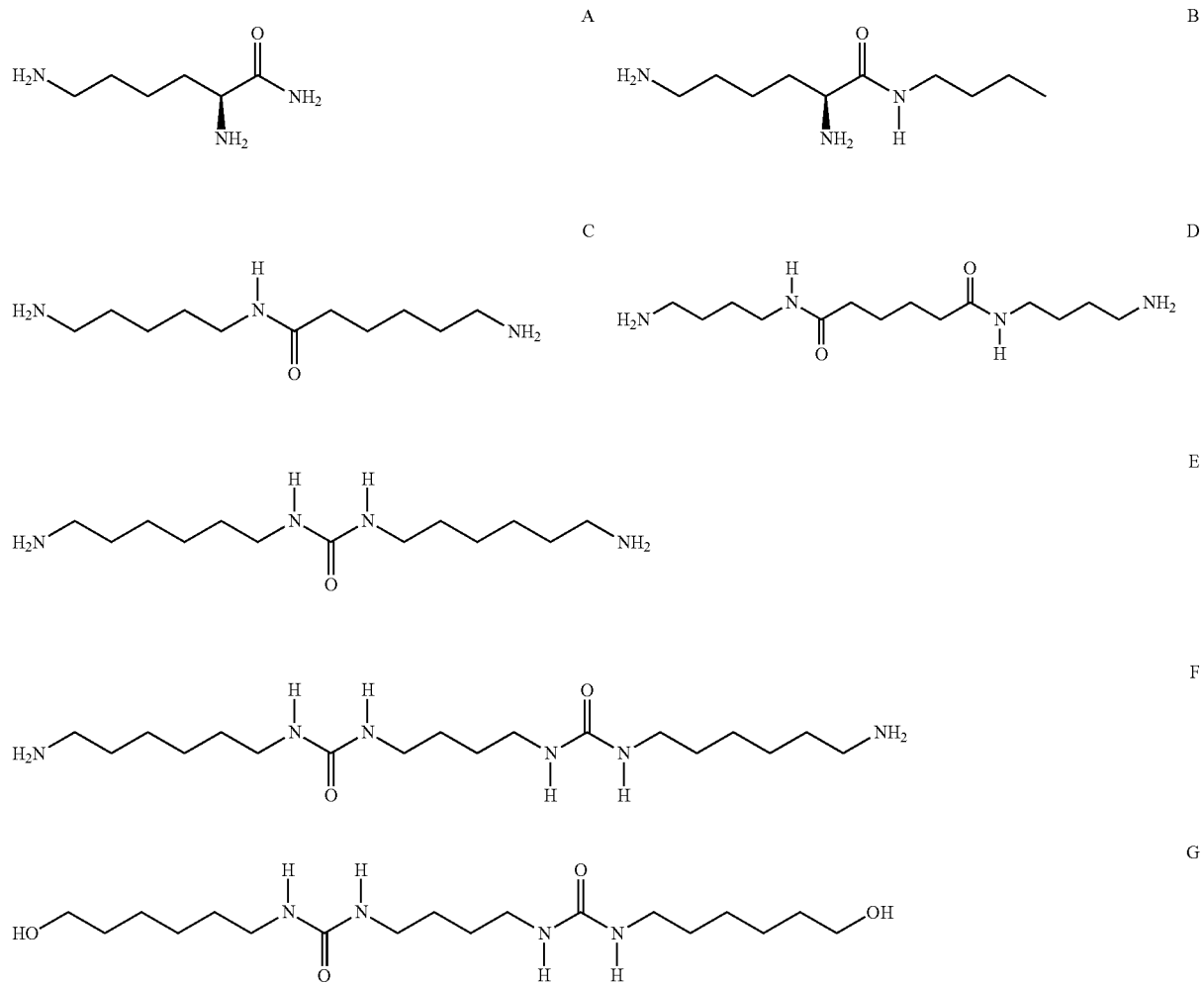

The above Scheme shows a selection of diamines and one diol that are suitable for chain-extension with e.g. telechelic carboxylic acid functionalized polymers.

Analytical data for molecule C were according to those in literature (Keul et al., Eur. Pol. J. 49, 853, 2013).

Examples 26: Di-carboxylic acid and Other Reactive Compound Building Blocks

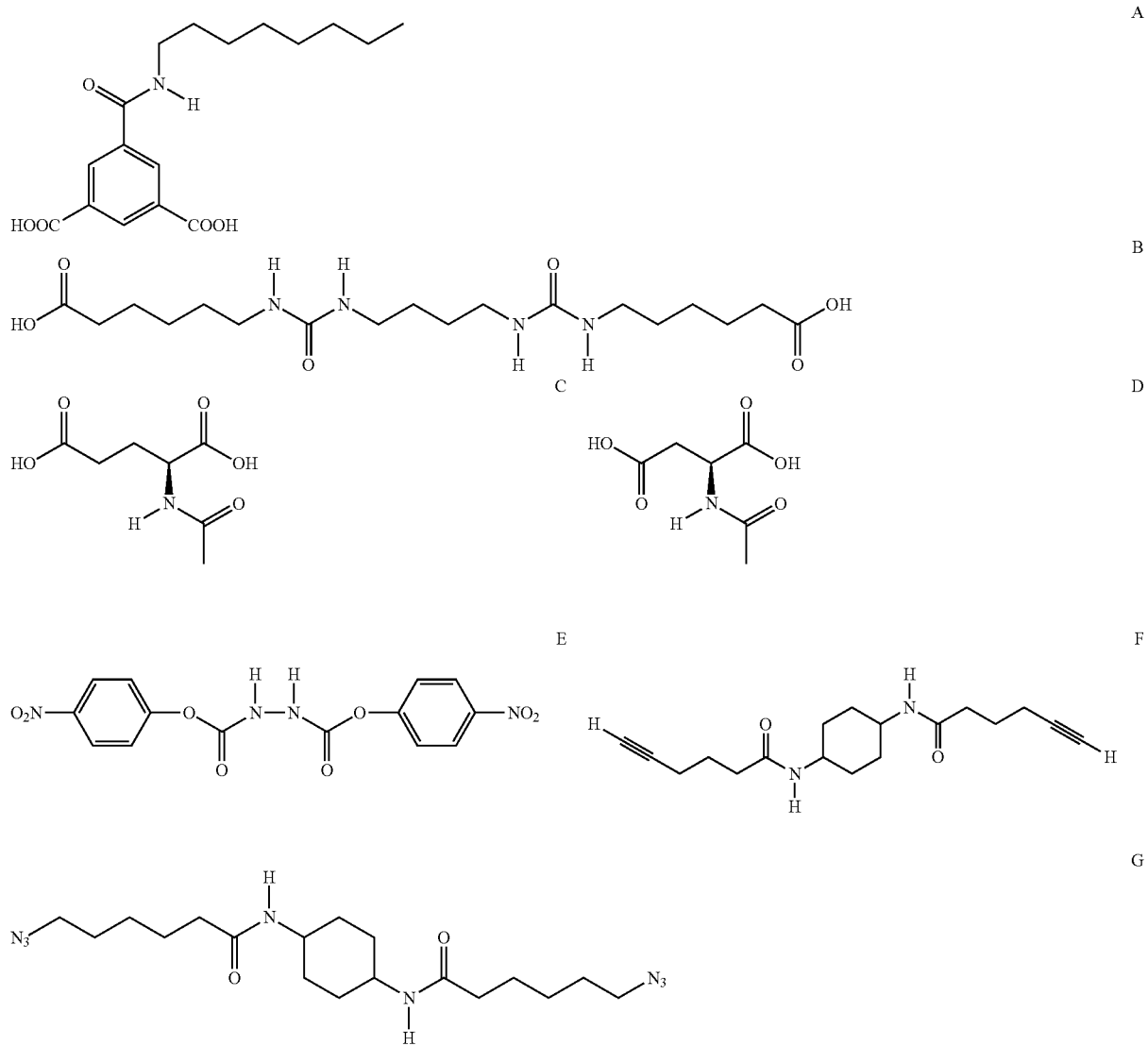

The above Scheme shows a selection of di-carboxylic acids suitable for chain-extension with telechelic amine functionalized polymers (thereby applying coupling activating reagents such as e.g. dicyclohexyl carbodiimide (DCC) in combination with DMAP). Alternatively, the above di-carboxylic acids can be activated to produce and isolate di-active esters, and these activated esters can then be chain extended with amine terminated telechelic prepolymers. 5-[(Octylamino)carbonyl]isophthalic acid (molecule A) was prepared according to literature data; molecule B was prepared by reacting the tert-butyl ester of 6-aminohexanoic acid with 1,4-butyldiisocyanate, and subsequent deprotection of the tert butyl ester groups; molecules C and D are the N-acylated derivatives of the glutamic and aspartic amino acids, respectively. Molecule E was prepared by reacting hydrazine with the chloroformate of p-nitrophenol in dichloromethane with simultaneous addition of an aqueous $Na_2CO_3$ solution to keep the mixture neutral; E is a white solid material that can be reacted with e.g. amine functional telechelics. Finally, F and G are prepared by amide coupling of trans-1,4 cyclohexylene diamine with 5-hexynoic acid and 6-azidohexanoic acid, respectively. Recorded analytical NMR, IR and LC-MS data were in accordance with the proposed structures for these molecules.

Biodegradable $[AB]_n$ Polymers According to the Invention

Polymerizations as according to the below examples 27 to 39 was usually executed at room temperature. Isolation and purification was achieved by precipitation into an excess of methanol, optionally with some added water to efficiently remove salts (in any present), and optionally executed two times consecutively. Drying of the product gives tough and elastic materials. SEC has been performed at 50° C. using DMF with 10 mM LiBr as eluent and applying RI-detection; the SEC-data are relative to PEG-standards, and are given in kDa (kg/mol).

Example 27. A poly(hexyl carbonate) bisamide-mono-urea Biomaterial

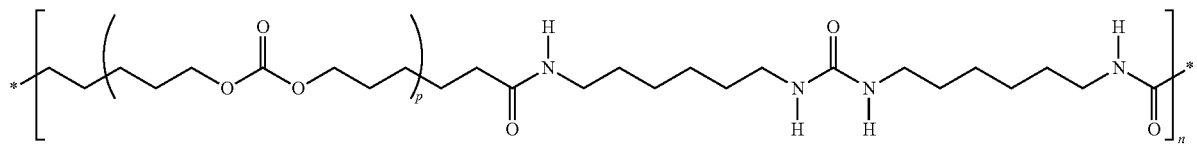

This material was synthesized by chain extension of PHC2000 di-carboxylic acid (ex Example 19) with an equimolar amount of 1,3-bis-(6-aminohexyl)urea (ex Example 25E), using the diisopropyl carbodiimide/DMAP reagent in DCM solvent. After reaction at room temperature for several hours, the mixture was slightly heated to run the reaction to completion. IR and $^1$H-NMR data were in accordance with the proposed structure. SEC: $M_n$=20 kDa, PDI=2.7.

Example 28. A poly(hexyl carbonate) bisurea Biomaterial

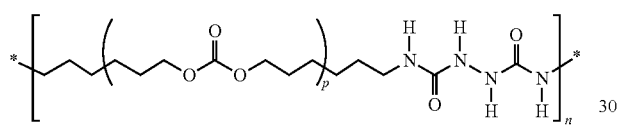

This material was synthesized by chain extending PHC2000 diamine (TFA salt; ex Example 3) with an equimolar amount of bis(4-nitrophenyl) hydrazine-1,2-dicarboxylate (Example 26E), and applying TEA base in dioxane. IR and $^1$H-NMR data were in accordance with the proposed structure. SEC: $M_n$=13.1 kDa; PDI=2.0.

Example 29. A poly(hexyl-random-co-pentyl carbonate) bisurea Biomaterial

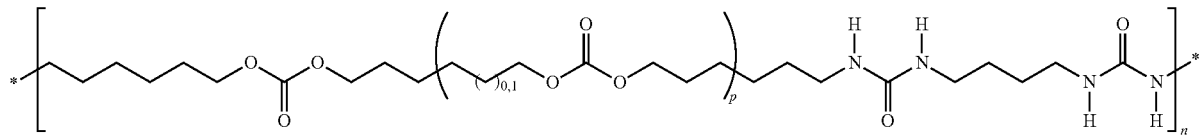

This material was prepared by chain extension polymerization from equimolar amounts of 1,4-diisocyanatobutane and the TFA salt of poly(hexylene-random-co-pentylene carbonate) diamine (ex Example 11) in DCM applying DIPEA as base. IR and $^1$H-NMR data were in accordance with the proposed structure. SEC: $M_n$=12.8 kDa; D=1.7.

Example 30. A poly(hexyl carbonate) tetra-amide Biomaterial

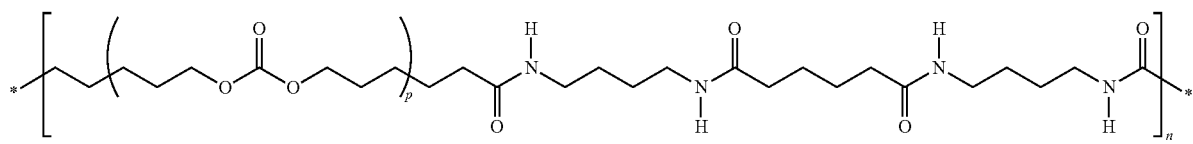

This material was synthesized by chain extension of PHC2000 di-carboxylic acid (ex Example 19) with an equimolar amount of N$^1$,N$^6$-bis(4-aminobutyl)adipamide.2HCl (ex Example 25D) using diisopropylcarbodiimide (DiC) and NHS/DMAP reagents to activate the acid groups of the prepolymer, DIPEA as base and DMSO as solvent. The mixture was slightly heated to run the reaction to completion. IR and $^1$H-NMR data were in accordance with the proposed structure; NMR indicates n=ca. 6. SEC: M$_n$=9.6 kDa; PDI=1.8.

Example 31. A poly(hexyl carbonate) tri-amide Biomaterial

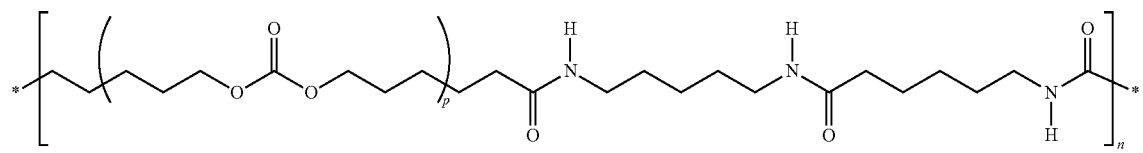

This material was synthesized from equimolar amounts of poly(hexamethylene carbonate) di-(tetra-fluorophenol active ester), ex Example 20, and 6-amino-N-(5-aminopentyl)hexanamide. 2HCl (ex Example 25C) using DIPEA as base and DCM as solvent. After reaction at room temperature for several hours, the mixture was slightly heated to run the reaction to completion. IR and $^1$H-NMR data were in accordance with the proposed structure. SEC: M$_n$=18.4 kDa; PDI=1.7.

Example 32. A poly(hexyl carbonate-random-co-ε-caprolactone) bisurea Biomaterial

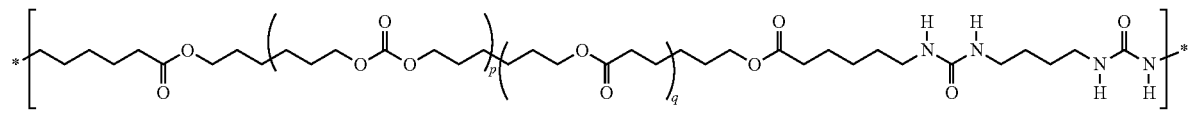

This material was synthesized from the TFA-salt of the amine terminated poly(ester/carbonate) (ex Example 13; 9.2 g, 3.3 mmol), 1,4-diisocyanatobutane (0.5 g, 3.4 mmol) and DIPEA (2.0 mL, 11 mmol) in chloroform, thereby performing a chain extension polymerization. Yield: 8.50 g (88%). IR and NMR data were in accordance with the proposed structure. SEC: M$_n$=22 kDa; PDI=2.1.

Example 33. A poly(hexyl carbonate) bisurethane-bisurea Biomaterial

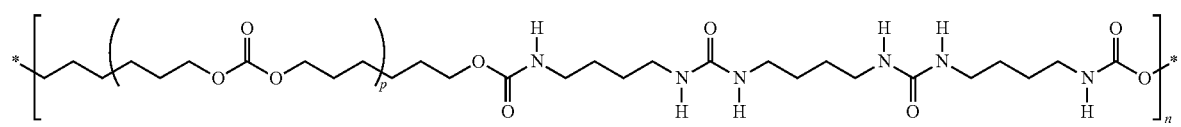

This material was synthesized from the TFA-salt of the polycarbonate di-(urethane amine) ex Example 15 (10.4 g, 4.0 mmol), 1,4-diisocyanatobutane (0.598 g, 4.1 mmol) and DIPEA (2.5 mL, 14 mmol) in chloroform, thereby performing a chain extension polymerization. Yield: 9.2 g (92%). IR and NMR data were in accordance with the proposed structure. SEC: $M_n$=25 kDa; PDI=2.6.

Example 34. A poly(hexyl carbonate) bisurethane-bisamide Biomaterial

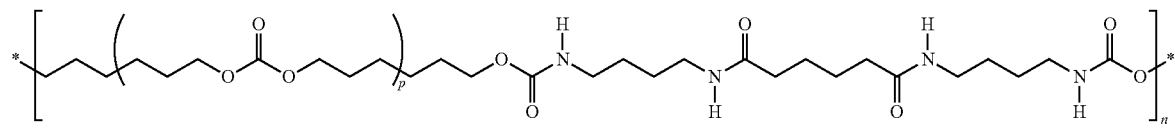

This material was synthesized from the TFA-salt of the polycarbonate di-(urethane amine) ex Example 15 (10.7 g, 4.3 mmol), the 2,3,5,6-tetrafluorophenol activated ester of adipic acid (1.9 g, 4.3 mmol) and DIPEA (5.2 mL, 30 mmol) in chloroform, thereby performing a chain extension polymerization. Yield: 9.8 g (96%). IR and NMR data were in accordance with the proposed structure. SEC: $M_n$=21 kDa; PDI=2.6.

Example 35. A poly(hexyl carbonate) bisamide Biomaterial

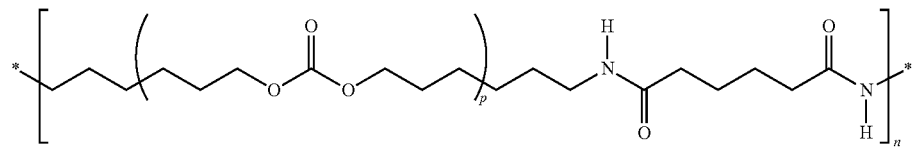

This material was synthesized from PHC2000 diamine (TFA salt; ex Example 3) and an equimolar amount of adipoyl chloride using DIPEA as base in chloroform solvent. IR and $^1$H-NMR data were in accordance with the proposed structure. SEC: $M_n$=25.7 kDa; PDI=1.7.

Example 36. A poly(hexyl carbonate) bisamide Biomaterial

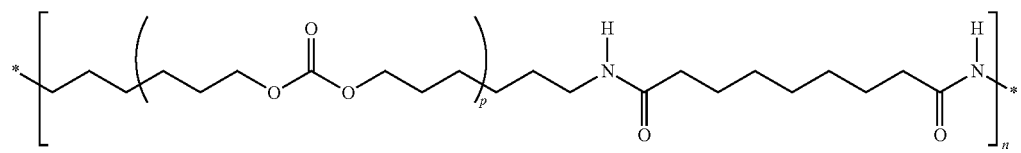

This material was synthesized from PHC2000 diamine (TFA salt; ex Example 3) and an equimolar amount of azelaoyl chloride applying DIPEA as base in DCM solvent. IR and $^1$H-NMR data were in accordance with the proposed structure. SEC: $M_n$=22.5 kDa; PDI=2.4.

Example 37. A poly(hexyl carbonate) bisamide Biomaterial

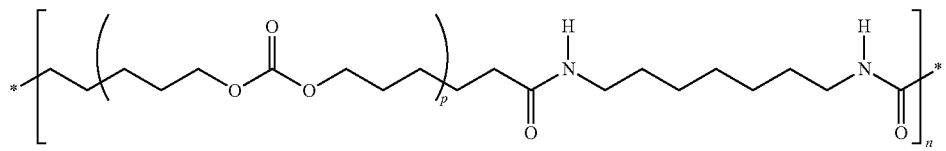

This material was synthesized by chain extension of PHC2000 di-carboxylic acid (ex Example 19) with an equimolar amount of 1,7-diaminoheptane using the HBTU/DIPEA amide coupling reagents in DMF solvent. IR and $^1$H-NMR data were in accordance with the proposed structure. SEC: $M_n$=14.3 kDa; PDI=1.7.

Example 38. A poly(hexyl carbonate) bisamide Biomaterial

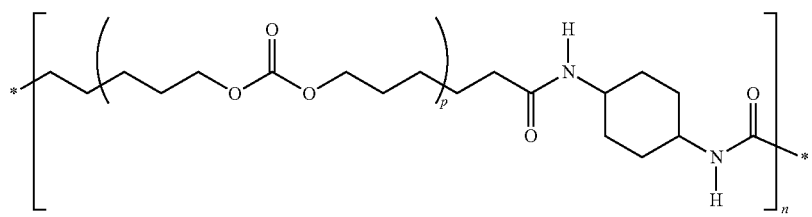

This material was synthesized from equimolar amounts of poly(hexamethylene carbonate) di-(tetra-fluorophenol active ester), ex Example 20, and an equimolar amount of trans-1,4-diaminocyclohexane using DIPEA base and DCM solvent. IR and $^1$H-NMR data were in accordance with the proposed structure. SEC: $M_n$=19.8 kDa, PDI=1.9.

Example 39. A poly(hexyl C36-diacid)ester bisurea Biomaterial

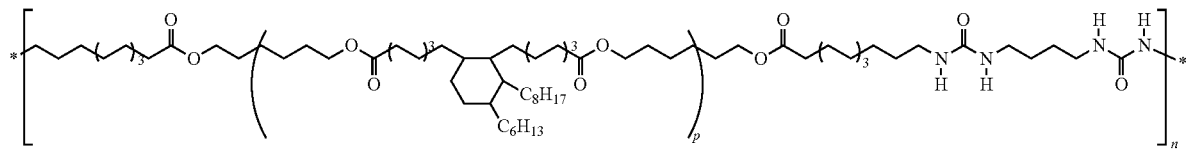

The TFA salt of the poly(hexyl C36)ester diamine prepolymer ex Example 18 (0.6 g, 0.21 mmol) was dissolved in dichloromethane (3 mL) under argon. 1,4-Diisocyanatobutane (0.03 g, 0.21 mmol) mixed with dichloromethane (1 mL) and DIPEA (0.11 mL, 0.62 mmol) were added to the solution. The reaction mixture was stirred overnight. IR-analysis showed no isocyanate absorbance, indicating completion of the chain extension polymerization. Yield after precipitation (MeOH) and drying: 0.6 g. NMR and IR analytical data were in accordance with the proposed structure. SEC: $M_n$=47 kDa; PDI=2.1.

The Properties of the [AB]$_n$ Materials and their Processing

Example 40. Apolarity Levels

All the shown [AB]$_n$ polycarbonate, poly(ester/carbonate) and polyester examples (see Examples 1 to 4, and Examples 27 to 39) have a high level of apolarity for the soft blocks. Polycarbonate Example 29 has on average about 5.5 carbons per spacer K, L and/or M, while the cumulative carbons in the soft block of this material divided by the number of carbonate plus ester moieties in the soft block gives an apolarity ratio of about 5.9. Accordingly, the apolarity levels for Example 29 are 5.5/5.9, for the two definitions, respectively. Such or higher apolarity levels are preferred, as according to the invention. Indeed, all other examples give higher apolarity numbers (about 5.7/6.2 for poly(ester/carbonate) Example 32; about 18/20 for polyester Example 39; and about 5.9-6.0/6.4-6.5 for the other Examples).

Comparative Example 41

The PCL2000-bisurea polyester material as according to Wisse et al. (Biomacromolecules 6, 3385-3395, 2006) was synthesized according to the described procedure. The levels of apolarity for this material are lower than 5, with apolarity levels of 4.9/4.9.

Comparative Examples 42

In a similar way as in Comparative Example 5, poly (hexylene carbonate) urethane urea (PCUU) polymers were prepared. For the PCUU-polymer of Comparative Example 5, PHC2000-diol, BDI and BDA are reacted in a 1:2:1 molar ratio. For comparative Example 42A, PHC2000-diol, 1,6-hexylene diisocyanate (HDI) and BDA were used in a 1:2:1 molar ratio, while for Comparative Example 42B, PHC2000-diol, HDI and 1,6-hexanediamine (HDA) were used in a 1:2:1 molar ratio. Additionally, the poly(hexylene carbonate/ε-caprolactone) urethane urea PECUU25/75 was prepared, as according to Y. Hong et al., Biomaterials 31, 4249-4258, 2010. For this Comparative Example material 42C, PHC2000-diol and PCL2000-diol are used in a 3:1 ratio, where the prepolymer diol combination is used together with BDI and BDA in a 1:2:1 ratio.

The Comparative Example materials 5, 42A, 42B and 42C are in fact $[(A)_p(B)_q)]_n$ materials, as every soft block A and every hard block B in one polymer chain can be of a different nature (p and q can be 0, 1, 2, etc. throughout the polymeric chain). Accordingly, these comparative materials will be mixtures composed of a wide variety of macromolecular architectures. In addition, for 42C, the soft blocks are of a different chemical nature as well (polyester or polycarbonate).

Example 6 (see Table 2, the E-modulus and the $U_T$ toughness data therein). All tensile tests on the example materials show a monotonous increase of the stress versus the strain.

| Example # Material | E-modulus (MPa) | Stress at break (MPa) | Strain at break (%) | Toughness ($U_T$) (kJ/kg) | UTS (MPa) |
|---|---|---|---|---|---|
| #1 | 14 | 30 | 749 | 112 | 30 |
| #2 | 17 | 22 | 546 | 85 | 22 |
| #3 | 11 | 40 | 952 | 191 | 40 |
| #4 | 73 | 26 | 548 | 95 | 26 |
| #27 | 28 | 21 | 518 | 65 | 21 |
| #32 | 14 | 22 | 1048 | 135 | 22 |
| #34 | 36 | 33 | 767 | 156 | 33 |

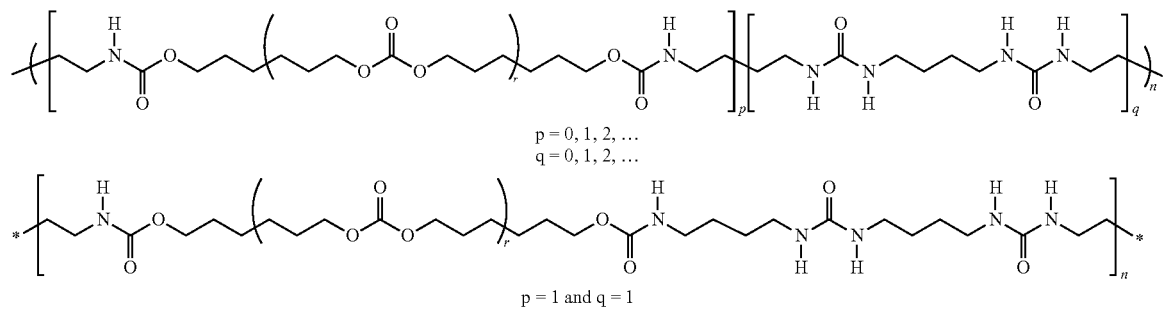

p = 0, 1, 2, ...
q = 0, 1, 2, ...

p = 1 and q = 1

In the above Scheme, one can compare and see the difference between the molecular structures of the polycarbonate of Comparative Example 5 (top structure) and the polycarbonate of Example 33 (bottom structure). For Example 33 (p=1 and q=1) one has a strictly segmented $[AB]_n$ material. All polymeric molecules will have the same macromolecular architecture, with all soft blocks of one type A only, and all hard blocks of one type B only. A molecularly well-defined biomaterial is prepared.

Example 43. Tensile Stress-Strain Mechanical Testing

The following Table compiles data on uniaxial stress-strain tensile tests, further to those already shown in Examples 44. DMTA Mechanical Testing The following Table compiles DMTA-data, further to those DMTA-data already shown in Example 6 (Table 2; the storage moduli E' at 20° C. and 80° C. shown therein). The data below indicate that the Example materials are more elastic than the material of Comparative Example 5, given their lower tan δ values and their nearly temperature independent storage moduli E' between 20° C. and 80° C. Furthermore, the Example materials can be processed from the melt at lower temperatures, given their lower flow temperatures.

| Ex# | E' @20° C. (MPa) | E' @30° C. (MPa) | E' @37° C. (MPa) | E' @50° C. (MPa) | E' @80° C. (MPa) | $T_{flow}$ (° C.) | Tan δ @37° C. (—) | T tan$δ_{min}$ (° C.) |
|---|---|---|---|---|---|---|---|---|
| #1 | 18 | 18 | 17 | 17 | 16 | 132 | 0.03 | 65 |
| #2 | 19 | 19 | 19 | 18 | 15 | 120 | 0.03 | 65 |
| #3 | 18 | 17 | 18 | 18 | 17 | 145 | 0.03 | 65 |
| #4 | 77 | 73 | 72 | 69 | 59 | 152 | 0.04 | 60 |
| #29 | 42 | 41 | 41 | 41 | 37 | 139 | 0.03 | 47 |
| #31 | 61 | 61 | 61 | 61 | 45 | 93 | 0.03 | 48 |
| #32 | 14 | 14 | 13 | 14 | 14 | 136 | 0.03 | 62 |
| #33 | 29 | 28 | 27 | 26 | 23 | 192 | 0.04 | 42 |
| #38 | 33 | 32 | 32 | 32 | 30 | 154 | 0.03 | 47 |
| #C5 | 52 | 39 | 36 | 32 | 25 | 254 | 0.07 | 46 |

Example 45. Thermal Properties

The following Table compiles thermal properties of the materials of the invention as determined by DSC, and are further to those DSC data already shown in Example 6 (Table 1).

| Ex# | $T_g$ (° C.) | $T_m$ (SB) (° C.) | $T_c$ (SB) (° C.) | $\Delta H_{cr}$ ($T_c$ SB) (J/g) | $T_m$ (HB) (° C.) | $T_c$ (HB) (° C.) | $\Delta H_{cr}$ ($T_c$ HB) (J/g) |
|---|---|---|---|---|---|---|---|
| #1  | −39 | 3    | −29  | 8.3  | 131 | 100 | 10.8 |
| #2  | −37 | 4    | −26  | 8.2  | 116 | 78  | 11.9 |
| #3  | −38 | 4    | −18  | 6.1  | 135 | 113 | 14   |
| #4  | −38 | n.d. | n.d. | n.d. | 144 | 123 | 25.3 |
| #27 | −38 | 13   | −32  | 3.6  | 123 | 77  | 6.6  |
| #29 | −37 | n.d. | n.d. | n.d. | 129 | 103 | 19.6 |
| #32 | −43 | −9   | −35  | 4.9  | 138 | 108 | 13.8 |
| #33 | −35 | 6    | −37  | 5.8  | 182 | 123 | 3.4  |
| #34 | −37 | 4    | −30  | 6.5  | 144 | 116 | 15.3 |
| #38 | −43 | 10   | −24  | 5.5  | 138 | 107 | 7.3  |
| #39 | −52 | n.d. | n.d. | n.d. | 140 | 128 | 4.8  | n.d. = not detected

Example 46. Solubility

The materials of the invention can be solubilized at room temperature in a range of organic solvents or solvent combinations (see also Example 7). For example, the materials of Examples 1, 2, 32 and 38 could be dissolved in toluene/ethanol (20 v/v % ethanol), DMF and THF/acetic acid (5 v/v % acetic acid), while the materials of Examples 30, 33, 35 and 39 were dissolved in CHCl$_3$/MeOH (10 v/v % methanol). Furthermore, the materials of the Examples 3, 29 and 34 were soluble in CHCl$_3$, and the materials of the Examples 27, 31 and 37 were soluble in acetic acid. In all these examples, 10 (w/v) % concentration solutions were prepared, where in all cases stable, homogeneous, clear, free flowing low viscous solutions were obtained. Finally, the materials of Examples 27, 29, 30 and 31 were dissolved in CHCl$_3$/MeOH (25 v/v % methanol) at a concentration of 20 (w/v) %, producing clear and homogeneous, free flowing, viscous solutions.

These examples do not show the maximum levels of solubility for any material in the given solvent. Also, the solubility of a certain material is not restricted to the mentioned solvent(s) for this material.

Comparative Example 47. Lack of Solubility

The materials of Comparative Examples 5, 42A, 42B and 42C were tested with respect to their solubility in a range of organic solvents or solvent combinations. None of these four polycarbonate or poly(carbonate/ester) materials could be dissolved in CHCl$_3$, CHCl$_3$/MeOH (25 v/v % MeOH), CHCl$_3$/MeOH (10 v/v % MeOH), toluene/EtOH (20 v/v % EtOH), DMF, acetic acid (HAc), THF/HAc (5 v/v % HAc) or methyl isobutyl ketone/HAc (20 v/v % HAc), at the tested 1 (w/v) % concentration, not after overnight stirring at room temperature and not after heating and subsequent cooling down. Inhomogeneous hazy mixtures with undissolved particles and/or gels were obtained, and at no point and in none of the cases, clear, homogeneous, free flowing solutions were obtained.

Examples 48. Electrospinning

Electrospinning was performed in an in-house built setup at room temperature. The poly(carbonate ester) bisurea of Example 1 and the polycarbonate bisurethane-bisamide of Example 34 were dissolved in CHCl$_3$ at a concentration of 12.5 (w/v) % (Example 1) and in CHCl$_3$/MeOH (99/1) at a concentration of 20 (w/v) % (Example 34). Clear, homogeneous, and viscous solutions were obtained, as is required for effective processing by electrospinning (i.e. no haziness, no gels, no jellies, no inhomogeneities). The polymer solutions were fed by a syringe pump at a flow of 0.02 mL/min through a stainless steel needle. The needle to surface distance was 12 cm and 20 cm, and the applied voltages were 11.25 kV and 10 kV, for the experiments using Example 1 and Example 34 solutions, respectively. Fibers were collected on a 12×12 cm grounded metal plate. Fiber diameters were found to be of quite homogeneous diameters: 3 to 4 micrometer (Example 1 biomaterial) and about 5 micrometer (Example 34 biomaterial).

Comparative Examples 49. Electrospinning

The Comparative Examples 5, 42A, 42B and 42C could not be electrospun from chloroform or chloroform/MeOH solutions as these materials could not be dissolved in these solvents.

Example 50. In Vitro Degradation Tests by Use of NaOH

Thin films of the biomaterial were cut in small samples (ca. 6×6 mm; ca. 70 micrometer thick). The samples were individually weighed and were immersed in 2M NaOH at 20° C. or 37° C. for specific periods of time. The samples were subsequently rinsed with demineralized water (3×) and dried at 40° C. for (at least) 12 hours, and were then weighed again. Accordingly, the stability of the biomaterials towards NaOH treatment could be assessed. The below Tables list the weight losses after NaOH treatment, given as percentages of the original weight. As assessed in this test, the materials of the invention are relatively stable and are much more stable than the Comparative Example 41, as weight losses are at least ca. 30 times lower in the measured time frame (Table A). The materials of the invention can also be tailored with respect to their stability (Table B).

TABLE A

Weight loss of biomaterial after 2M NaOH treatment at 20° C. (in percentages; t = 0 days is 0%).
Every time point is an average value for three film samples.

| Example # Material | t = 0 days | t = 1 days | t = 2 days | t = 5 days | t = 9 days |
|---|---|---|---|---|---|
| #1  | 0% | 0% | 0% | 0%  | 1%  |
| #3  | 0% | 0% | 0% | 0%  | 0%  |
| #33 | 0% | 0% | 0% | 0%  | 0%  |
| #34 | 0% | 0% | 0% | 0%  | 1%  |
| #C41 | 0% | 1% | 3% | 12% | 29% |

TABLE B

Weight loss of biomaterial after 2M NaOH treatment at 37° C. (in percentages; t = 0 days is 0%).
Every time point is an average value for three film samples.

| Example # Material | t = 0 days | t = 7 days | t = 14 days | t = 28 days |
|---|---|---|---|---|
| #1  | 0% | 4% | 10% | 24% |
| #3  | 0% | 2% | 6%  | 13% |
| #33 | 0% | 3% | 6%  | 16% |
| #34 | 0% | 6% | 17% | 31% |

Example 51. In Vitro Degradation Tests by Use of Lipase

Thin films of the biomaterials were cut in small samples (ca. 6×6 mm; ca. 70 micrometer thick). These samples were individually weighed, and were immersed in a PBS lipase solution (1000 Units/mL lipase from *Thermomyces lanuginosus*) for specific periods of time, either at 20° C. or at 37° C. The samples were subsequently rinsed with demineralized water (3×), dried at 40° C. for (at least) 12 hours, and were then weighed again. Accordingly, the stability of the biomaterials towards lipase treatment could be assessed. The below Tables list the weight losses after lipase treatment, given as percentages of the original weight. As assessed in this test, the materials of the invention are relatively stable and are much more stable than the Comparative Example 41, as weight losses are at least a factor 40 lower in the measured time frame (Table A). The materials of the invention can be tailored with respect to their stability (Table B).

TABLE A

Weight loss of biomaterial after lipase treatment at 20° C. (in percentages; t = 0 days is 0%).
Every time point is an average value for three film samples.

| Example# Material | t = 0 days | t = 1 days | t = 2 days | t = 5 days | t = 9 days |
|---|---|---|---|---|---|
| #1  | 0% | 1%  | 1%  | 1%  | 2%   |
| #3  | 0% | 0%  | 0%  | 0%  | 0%   |
| #33 | 0% | 0%  | 0%  | 0%  | 0%   |
| #34 | 0% | 0%  | 0%  | 0%  | 0%   |
| #C41 | 0% | 30% | 43% | 71% | >85% |

TABLE B

Weight loss of biomaterial after lipase treatment at 37° C. (in percentages; t = 0 days is 0%).
Every time point is an average value for three film samples.

| Example# Material | t = 0 days | t = 7 days | t = 14 days | t = 28 days |
|---|---|---|---|---|
| #1  | 0% | 5% | 10% | 17% |
| #3  | 0% | 0% | 0%  | 0%  |
| #29 | 0% | 1% | 1%  | 3%  |
| #32 | 0% | 7% | 14% | 28% |
| #33 | 0% | 0% | 0%  | 0%  |
| #34 | 0% | 0% | 0%  | 0%  |
| #38 | 0% | 4% | 7%  | 15% |

Example 52. Cytotoxicity

The materials of the Examples 1, 3, 30 and 32 were tested with respect to their cytotoxicity by using the MTT cytotoxicity assay applying 3T3 mouse fibroblasts. In the MTT-test, the cell viability of cells that have been treated with medium that has been exposed to a certain material is presented relative to the cell survival as observed for cells that have been maintained in untreated medium. The tested materials are not cytotoxic as cell viabilities are high and around 100% (values of 60% to 116% have been measured). A Triton X-100 surfactant reference showed no cell viability (0%).

Example 53. Biodegradation

The variety of the biodegradation products of the $[AB]_n$ materials of this invention is limited, where this is due to the simple and defined molecular structures of the $[AB]_n$ materials with only one type of soft block A and only one type of hard block B for a particular $[AB]_n$ material. The presented materials are envisioned to have biodegradation products from the soft block that are for example 1,6-hexylene diol, 1,5-pentylene diol, or their oxidized species, such as e.g. 6-hydroxy caproic acid or adipic acid. Degradation products from the hard block are lower molecular weight molecules such as the molecules shown in Examples 25 and 26 (not: molecules 26E, 26F, 26G). These molecules have a certain solubility in PBS, and can therefore be efficiently cleared from the body (e.g. molecules 25C, 25D, 25E, 25F have solubilities in PBS>5 mg/mL, and 26B has a solubility in PBS>1 mg/mL, respectively).

In contrast, it is unclear what the fate may be of the extended higher molecular weight hard blocks in the Comparative Example materials 5, 42A, 42C and 42C. The extended hard blocks (p=2, 3, 4, etc., see the Scheme in Comparative Example 42) presumably give biodegradation products insoluble in PBS.

The invention claimed is:

1. A thermoplastic elastomer according to the formula [AB]n, wherein:
   n represents the number of repeats of the AB segment and is an integer of 2 to 100;
   A represents a soft block according to formula (I):

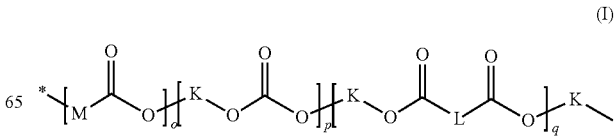

(I)

-continued

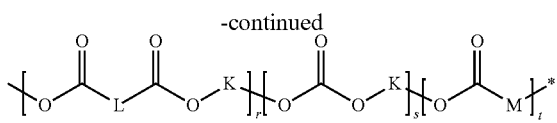

B represents a hard block according to formula (II-A) or formula (II-B):

(II-A)

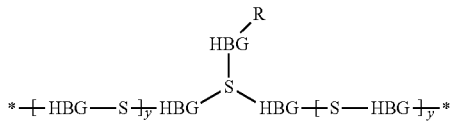
(II-B)

wherein:
every soft block A in the formula [AB]$_n$ is the same soft block A and every hard block B in the formula [AB]$_n$ is the same hard block B;
the morphology of the [AB]$_n$ material is characterized by displaying a T$_g$ for the soft block A;
K is independently selected from C$_1$-C$_{36}$ alkylene groups, C$_6$-C$_{24}$ arylene groups, C$_7$-C$_{24}$ alkarylene groups, and C$_7$-C$_{24}$ arylalkylene groups, wherein at least one K is a C$_1$-C$_{36}$ alkylene group;

(V)

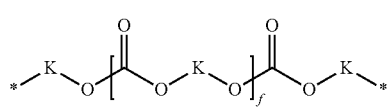
(A)

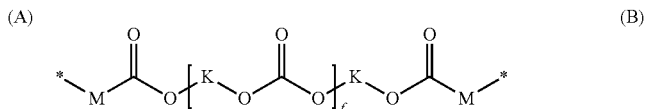
(B)

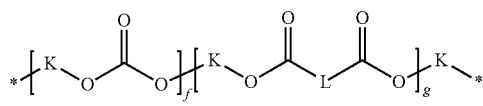
(C)

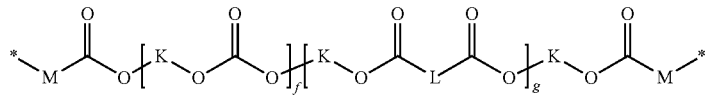
(D)

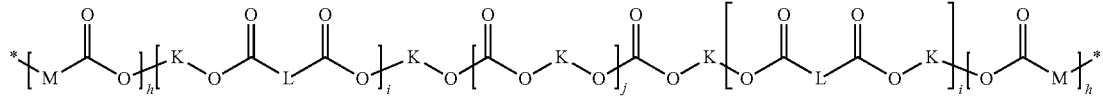
(E)

L is independently selected from a C$_1$-C$_{36}$ alkylene group, a C$_6$-C$_{24}$ arylene group, a C$_7$-C$_{24}$ alkarylene group or a C$_7$-C$_{24}$ arylalkylene group or L is absent;
M is independently selected from a C$_1$-C$_{36}$ alkylene group, a C$_6$-C$_{24}$ arylene group, a C$_7$-C$_{24}$ alkarylene group or a C$_7$-C$_{24}$ arylalkylene group or M is absent;
o, p, q, r, s and t are independently 0-50;
provided that:
(a) when o, q, r and t are 0, then p and s are independently 1-50;
(b) when p and s are 0, then o, q, r and t are independently 1-50;
(c) when o and t are 0, then p, q, r and s are independently 1-50;
(d) when q and r are 0, then o, p, s and t are independently 1-50;
HBG is a simple hydrogen bonding unit independently selected from the group consisting of amide, urea and urethane groups;
S is independently selected from a C$_1$-C$_{36}$ alkylene group, a C$_6$-C$_{24}$ arylene group, a C$_7$-C$_{24}$ alkarylene group or a C$_7$-C$_{24}$ arylalkylene group or, and only if B represents a hard block according to the formula (II-A), S can also be absent so that it represents a bond between two HBGs;
R is hydrogen, a C$_1$-C$_{24}$ alkyl group, a C$_6$-C$_{24}$ aryl group, a C$_7$-C$_{24}$ alkaryl group or a C$_7$-C$_{24}$ arylalkyl group;
x is 1, 2 or 3; and
y is 0 or 1.

2. The thermoplastic elastomer according to claim 1, wherein A is a (co)polycarbonate, a (co)polyester or a copoly(ester-carbonate).

3. The thermoplastic elastomer according to claim 1, wherein K is independently selected from the group consisting of cyclic, linear or branched C$_2$-C$_{18}$ alkylene groups.

4. The thermoplastic elastomer according to claim 1, wherein L independently is absent or an alkylene selected from the group of cyclic, linear or branched C$_2$-C$_{18}$ alkylene groups.

5. The thermoplastic elastomer according to claim 1, wherein M is independently selected from the group of cyclic, linear or branched C$_1$-C$_{17}$ alkylene groups.

6. The thermoplastic elastomer according to claim 1, wherein soft blocks A are selected from the group consisting of:

wherein f, g and j are independently in the range of 1-500; and
h is 0 (then i is 1) or 2 (then i is 0).

7. The thermoplastic elastomer according to claim 1, wherein soft block A has the formula (VI-A) or (VI-B)

(VI)

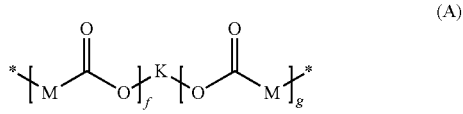
(A)

-continued (B)

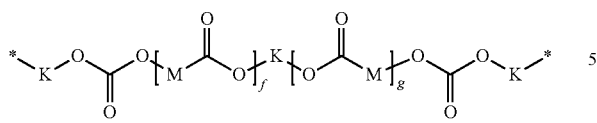

wherein f is in the range of 1-500 and g is in the range of 1-500.

8. The thermoplastic elastomer according to claim 1, wherein x is 1 or 2.

9. The thermoplastic elastomer according to claim 1, wherein S is independently selected from, a 1,3,5-phenylene or an alkylene selected from the group of cyclic, linear or branched $C_1$-$C_{12}$ alkylene groups, or, and only if B represents a hard block according to the formula (II-A), S can also be absent so that it represents a bond between two HBGs.

10. The thermoplastic elastomer according to claim 1, wherein hard block B is selected from the group consisting of bisurea hard blocks, bisamide hard blocks, triamide hard blocks, mono-urea-bisamide hard blocks, bisurethane-bisamide hard blocks and tetraamide hard block.

11. The thermoplastic elastomer according to claim 1, wherein the average molecular weight $M_n$ of thermoplastic elastomer according to the formula $[AB]_n$ is about 500 to about 500,000.

12. The thermoplastic elastomer according to claim 1, wherein the $M_n$ of soft block A is about 250 to about 50,000.

13. The thermoplastic elastomer according to claim 1, wherein the molecular weight of hard block B is about 85 to about 1000.

14. The thermoplastic elastomer according to claim 1, wherein the amount of hard block B in thermoplastic elastomer according to the formula $[AB]_n$ is about 1 to about 60 wt. %, based on the total weight of the thermoplastic elastomer.

15. A process for the preparation of a thermoplastic elastomer according to claim 1 and having the formula $[AB]_n$, n representing the number of repeats of the AB segment and being an integer of 2 to 100; wherein:

a prepolymer according to formula (III-A) or (III-B):

(III-A) and (III-B)

(III-A)

(III-B)

is reacted with a reactive compound according to formula (IV-A) or (IV-B):

$$FG^*\text{---}(\text{---}S\text{---}HBG\text{---})_a\text{---}S\text{---})_c\text{---}FG^*$$ (IV-A)

(IV-B)

wherein;
K is independently selected from $C_1$-$C_{36}$ alkylene groups, $C_6$-$C_{24}$ arylene groups, $C_7$-$C_{24}$ alkarylene groups, and $C_7$-$C_{24}$ arylalkylene groups, wherein at least one K is a $C_1$-$C_{36}$ alkylene group;
L is independently selected from a $C_1$-$C_{36}$ alkylene group, a $C_6$-$C_{24}$ arylene group, a $C_7$-$C_{24}$ alkarylene group or a $C_7$-$C_{24}$ arylalkylene group or L is absent;
M is independently selected from a $C_1$-$C_{36}$ alkylene group, a $C_6$-$C_{24}$ arylene group, a $C_7$-$C_{24}$ alkarylene group or a $C_7$-$C_{24}$ arylalkylene group or M is absent;
o, p, q, r, s and t are independently 0-50;
provided that:
(a) when o, q, r and t are 0, then p and s are independently 1-50;
(b) when p and s are 0, then o, q, r and t are independently 1-50;
(c) when o and t are 0, then p, q, r and s are independently 1-50;
(d) when q and r are 0, then o, p, s and t are independently 1-50;
HBG is a simple hydrogen bonding unit independently selected from the group consisting of amide, urea and urethane groups;
S is independently selected from a $C_1$-$C_{36}$ alkylene group, a $C_6$-$C_{24}$ arylene group, a $C_7$-$C_{24}$ alkarylene group or a $C_7$-$C_{24}$ arylalkylene group or, and only if B represents a hard block according to the formula (II-A), S can also be absent so that it represents a bond between two HBGs;
R is hydrogen, a $C_1$-$C_{24}$ alkyl group, a $C_6$-$C_{24}$ aryl group, a $C_7$-$C_{24}$ alkaryl group or a $C_7$-$C_{24}$ arylalkyl group;

FG is a functional group selected from the group consisting of hydroxy, azide, activated hydroxy, carboxylic acid, activated carboxylic acid, isocyanate, activated amine, ester, alkenyl, alkynyl and amine; and
FG* is a complementary functional group selected from the group consisting of isocyanate, amine, activated amine, carboxylic acid, activated carboxylic acid, ester, hydroxy, activated hydroxy, azide, alkenyl and alkynyl;

a is 0, 1, 2, 3 or 4;
b is 0 or 1; and
c is 0 or 1.

16. The process according to claim 15, wherein the reaction between the prepolymer according to formula (III-A) or (III-B) and the reactive compound according to formula (IV-A) or (IV-B) is a chain extension polymerization reaction.

17. A method of preparing a biomaterial comprising incorporating the thermoplastic elastomer according to claim 1 into the biomaterial.

18. The method according to claim 17, wherein the biomaterial is a scaffolding material.

19. A method of preparing a biomedical implant comprising incorporating the thermoplastic elastomer according to claim 1 into the biomedical implant.

20. The method according to claim 17, further comprising incorporating the biomaterial in to a biomedical implant.

21. The thermoplastic elastomer according to claim 1, wherein K is a $C_1$-$C_{36}$ alkylene group.

22. The thermoplastic elastomer according to claim 1, wherein the soft block A does not show a melting transition, or shows a melting transition $T_m$ that is lower than 50° C.

* * * * *